United States Patent
Zhou et al.

(10) Patent No.: US 12,157,411 B1
(45) Date of Patent: Dec. 3, 2024

(54) STEERING WHEEL INSTRUMENT ASSEMBLY

(71) Applicant: Zestek Racing LLC, Troy, MI (US)

(72) Inventors: Zheng Zhou, West Bloomfield, MI (US); Haoyu Wang, Zhengzhou (CN); Shen Li, Zhengzhou (CN)

(73) Assignee: Zestek Racing LLC, Troy, MI (US)

( * ) Notice: Subject to any disclaimer, the term of this patent is extended or adjusted under 35 U.S.C. 154(b) by 0 days.

(21) Appl. No.: 18/676,993

(22) Filed: May 29, 2024

(51) Int. Cl.
*B60Q 1/00* (2006.01)
*B60R 16/027* (2006.01)
*B62D 1/04* (2006.01)

(52) U.S. Cl.
CPC .......... *B60Q 1/0082* (2013.01); *B60R 16/027* (2013.01); *B62D 1/046* (2013.01)

(58) Field of Classification Search
CPC ...... B60Q 1/0082; B60R 16/027; B62D 1/046
See application file for complete search history.

(56) References Cited

U.S. PATENT DOCUMENTS

2013/0165226 A1* 6/2013 Thorner .................. A63F 13/54
463/37

FOREIGN PATENT DOCUMENTS

| CN | 117087745 A | * 11/2023 |
| CN | 221090959 U | *  6/2024 |

* cited by examiner

*Primary Examiner* — Daniel Cavallari
(74) *Attorney, Agent, or Firm* — Reising Ethington PC

(57) ABSTRACT

A steering wheel instrument assembly includes a button assembly having a microprocessor and a push-button switch. A function table has a unified format code associated with the push-button switch and indicates a desired vehicle operation. The assembly includes a vehicle protocol adapter module having another microprocessor with a second function table having the unified format code associated with an OEM format code. The microprocessor of the button assembly retrieves the unified format code when the push-button switch is activated and sends the unified format code to the vehicle protocol adapter module. The vehicle protocol adapter module retrieves the OEM format code from the second function table in response to receiving the unified format code and sends the OEM format code to an engine control unit.

20 Claims, 37 Drawing Sheets

Function Table of Button Assembly — 240

| Type | Index | Trigger Type | Unified Format Code | General | |
|---|---|---|---|---|---|
| Push-Button Switch | 1 | Press | 1 | Horn | 251 |
| | 2 | Press | 29 | Return | 252 |
| | 3 | Press | 34 | LIM | 253 |
| | 4 | Press | 44 | Line Keep Assist | 254 |
| | 5 | Press | 47 | Drive Mode | 255 |
| | 6 | Press | 1 | Horn | 256 |
| Toggle Switch | 1 | Up | 10 | Answer the Phone | 257 |
| | | Down | 11 | Hang Up | 258 |
| | 2 | Up | 10 | Answer the Phone | 259 |
| | | Down | 11 | Hang Up | 260 |
| Paddle Shifter Sensor | 1 | Pull | 2 | Gear Up | 261 |
| | 2 | Pull | 3 | Gear Down | 262 |
| Push Button Rotary Encoder | 1 | Clockwise | 35 | Cruise Control Set- | 263 |
| | | Counterclockwise | 36 | Cruise Control Res+ | 264 |
| | | Press | 32 | Cruise Control ON | 265 |
| | 2 | Clockwise | 41 | Cruise +10km/h | 266 |
| | | Counterclockwise | 42 | Cruise -10km/h | 267 |
| | | Press | 33 | Cruise Control OFF | 268 |
| Joystick Sensor | 1 | Up | 24 | Up | 269 |
| | | Down | 25 | Down | 270 |
| | | Left | 26 | Left | 271 |
| | | Right | 27 | Right | 272 |
| | | Clockwise | 28 | Left | 273 |
| | | Counterclockwise | 29 | Right | 274 |
| | | Press | 30 | Ok | 275 |
| | 2 | Up | 4 | Volume+ | 276 |
| | | Down | 5 | Volume- | 277 |
| | | Left | 7 | Previous Song | 278 |
| | | Right | 8 | Next Song | 279 |
| | | Clockwise | 4 | Volume+ | 280 |
| | | Counterclockwise | 5 | Volume- | 281 |
| | | Press | 12 | Source | 282 |

FIG. 10

FUNCTION TABLE OF VEHICLE PROTOCOL ADAPTER MODULE — 920

| UNIFIED FORMAT CODE | GENERAL | OEM FORMAT CODE | |
|---|---|---|---|
| 1 | HORN | COUNTER 00 00 01 | LINA (HEX) |
| 2 | GEAR UP | COUNTER 00 00 04 | |
| 3 | GEAR DOWN | COUNTER 00 00 08 | |
| 4 | VOLUME + | 3000Ω | |
| 5 | VOLUME - | 1000Ω | |
| 6 | PLAY/PAUSE | COUNTER 00 01 00 | LINA (HEX) |
| 7 | PREVIOUS SONG | COUNTER 00 02 00 | |
| 8 | NEXT SONG | COUNTER 00 08 00 | |
| 9 | TALK | COUNTER 00 04 00 | |
| 10 | ANSWER THE PHONE | COUNTER 00 0A 00 | |
| 11 | HANG UP | COUNTER 00 0E 00 | |
| 12 | SOURCE | COUNTER 00 10 00 | |
| 13 | NAV UP | COUNTER 00 00 01 | LINB (HEX) |
| 14 | NAV DOWN | COUNTER 00 00 02 | |
| 15 | NAV LEFT | COUNTER 00 00 04 | |
| 16 | NAV RIGHT | COUNTER 00 00 08 | |
| 17 | NAV OK | COUNTER 00 00 0A | |
| 18 | NAV BACK | COUNTER 00 00 10 | |
| 19 | HOME | COUNTER 00 01 00 00 00 00 00 | CANB (HEX) |
| 20 | MENU | COUNTER 00 02 00 00 00 00 00 | |
| 21 | VIEW | COUNTER 00 08 00 00 00 00 00 | |
| 22 | FAVORITES | COUNTER 00 04 00 00 00 00 00 | |
| 23 | MUTE | 330Ω | |
| 24 | UP | COUNTER 00 0E 00 00 00 00 00 | |
| 25 | DOWN | COUNTER 00 10 00 00 00 00 00 | |
| 26 | LEFT | COUNTER 00 20 00 00 00 00 00 | |
| 27 | RIGHT | COUNTER 00 30 00 00 00 00 00 | |
| 28 | OK | COUNTER 00 40 00 00 00 00 00 | |
| 29 | RETURN | COUNTER 00 80 00 00 00 00 00 | |
| 30 | HOME | COUNTER 00 A0 00 00 00 00 00 | |
| 31 | MENU | COUNTER 01 00 00 00 00 00 00 | |
| 32 | CRUISE CONTROL ON | COUNTER 02 00 00 00 00 00 00 | |
| 33 | CRUISE CONTROL CNCL | COUNTER 04 00 00 00 00 00 00 | CANB (HEX) |
| 34 | LIM | COUNTER 08 00 00 00 00 00 00 | |
| 35 | CRUISE +1KM/H | COUNTER 0A 00 00 00 00 00 00 | |
| 36 | CRUISE -1KM/H | COUNTER 10 00 00 00 00 00 00 | |
| 37 | RESUME CANCEL | COUNTER 20 00 00 00 00 00 00 | |
| 38 | RESUME | COUNTER 40 00 00 00 00 00 00 | |
| 39 | SET | COUNTER 80 00 00 00 00 00 00 | |
| 40 | SET- | COUNTER A0 00 00 00 00 00 00 | |
| 41 | CRUISE +10KM/H | COUNTER 00 00 01 00 00 00 00 | |
| 42 | CRUISE -10KM/H | COUNTER 00 00 02 00 00 00 00 | |
| 43 | DISTANCE | COUNTER 00 00 04 00 00 00 00 | |
| 44 | LINE KEEP ASSIST | COUNTER 00 00 08 00 00 00 00 | |
| 45 | ACC+ | COUNTER 00 01 00 | LINB (HEX) |
| 46 | ACC- | COUNTER 00 02 00 | |
| 47 | DRIVE MODE (OTHER) | COUNTER 00 08 00 | |

FIG. 40

First push-button switch ⎯1200

First push-button switch of the button assembly is activated when the first push-button switch has a first operational position thereof, the microprocessor of the button assembly has a first function table with a first unified format code associated with the first operational position of the first push-button switch, the first unified format code indicating a first desired vehicle operation

⎯1202

Microprocessor of the button assembly retrieves the first unified format code from the first function table when the first push-button switch has the first operational position and sends the first unified format code to the microprocessor of the vehicle protocol adapter module

⎯1204

Microprocessor of the vehicle protocol adapter module has a second function table having the first unified format code associated with a first OEM format code; the first OEM format code indicating the first desired vehicle operation, the microprocessor of the vehicle protocol adapter module retrieves the first OEM format code from the second function table in response to receiving the first unified format code from the microprocessor of the button assembly, and sends the first OEM format code to an engine control unit

⎯1206

Engine control unit generates a control signal to close a relay to induce a vehicle horn to emit sound in response to receiving the first OEM format code (A)

FIG. 41

First Push-button switch

1300 — User selects a first selection icon on a first GUI of a programming computer to select the first unified format code associated with the first push-button switch, the first unified format code indicating the first desired vehicle operation 1302 — Programming computer sends the first unified format code associated with the first push-button switch through the communication port to the microprocessor of the button assembly 1304 — Microprocessor of the button assembly receives the first unified format code associated with the first push-button switch and stores the first unified format code in the first function table, the first unified format being associated with the first desired vehicle operation

First paddle shifter

1306 — Use selects a second selection icon on a second GUI of the programming computer to select the second unified format code associated with the first paddle shifter, the second unified format code indicating the second desired vehicle operation 1308 — Programming computer sends the second unified format code associated with the first paddle shifter through the communication port to the microprocessor of the button assembly

FIG. 47

STEERING WHEEL INSTRUMENT ASSEMBLY

BACKGROUND

In vehicle track racing, to enhance the driving experience, drivers often replace the original factory steering wheels with professional racing steering wheels. However, such replacement steering wheels can lead to a loss of the multifunctional features of the original steering wheel such as instrument control, cruise control, etc. To address this issue, racing steering wheels have been equipped with a "button hub with factory function" (BHFF) devices. One BHFF device has button switches that are directly wired to an engine control system to implement the original factory functions. However, because there are numerous vehicles with varying electrical wiring configurations, the BHFF will not work with many types of vehicles.

Accordingly, the inventors herein have recognized a need for an improved steering wheel instrument assembly that can be operably coupled to a steering wheel and that transmits unified format codes and OEM format codes for controlling desired vehicle operations which is adaptable to work with many types of vehicles.

SUMMARY

A steering wheel instrument assembly in accordance with an exemplary embodiment is provided. The steering wheel instrument assembly includes a button assembly having a microprocessor and a first push-button switch operably coupled to the microprocessor thereof. The first push-button switch is activated when the first push-button switch has a first operational position thereof. The first function table has a first unified format code associated with the first operational position of the first push-button switch and indicating a first desired vehicle operation. The steering wheel instrument assembly includes a quick release female assembly that is coupled to the button assembly. The quick release female assembly has a first electrical connector with first pogo pin. The first electrical connector is electrically coupled to the button assembly. The steering wheel instrument assembly further includes a quick release male assembly that is removably coupled to the quick release female assembly. The quick release male assembly has a second electrical connector with a first pin. The first pin contacting the first pogo pin when the quick release male assembly is coupled to the quick release female assembly. The first pogo pin and the first pin route an operational voltage to the button assembly. The steering wheel instrument assembly further includes a vehicle protocol adapter module that is coupled to the quick release male assembly. The vehicle protocol adapter has a microprocessor with a second function table. The second function table has the first unified format code associated with a first OEM format code. The first OEM format code indicates the first desired vehicle operation. The microprocessor of the button assembly retrieves the first unified format code from the first function table when the first push-button switch is activated and sends the first unified format code through the first and second electrical connectors to the microprocessor of the vehicle protocol adapter module. The microprocessor of the vehicle protocol adapter module retrieves the first OEM format code from the second function table in response to receiving the first unified format code and sends the first OEM format code to an engine control unit.

BRIEF DESCRIPTION OF THE DRAWINGS

FIG. 10 is a block diagram of a first function table utilized in the button assembly of FIG. 9;

FIG. 40 is a schematic of a second function table utilized by the vehicle protocol adapter module of FIG. 37;

FIGS. 41-46 are flowcharts of a method for operating the steering wheel instrument assembly of FIG. 6 in accordance with another exemplary embodiment;

FIG. 47-49 are flowcharts of a method for programming the button assembly in the steering wheel instrument assembly of FIG. 6 to create the first function table used therein;

DETAILED DESCRIPTION

Figure 1:
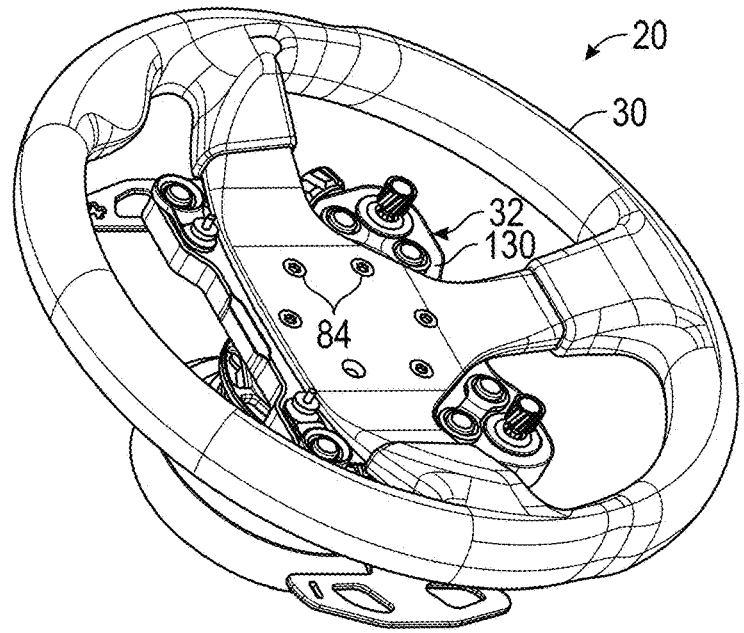
FIG. 1 is a schematic of a steering wheel, a steering wheel hub adapter, and a steering wheel instrument assembly in accordance with an exemplary embodiment that is coupled to the steering wheel and the steering wheel hub adapter.

Referring to FIGS. 1-8, a vehicle 20 that is operably coupled to a programming computer 22 is illustrated. The vehicle 20 includes a steering wheel 30, a steering wheel instrument assembly 32 in accordance with an exemplary embodiment, a steering wheel hub adapter 34 (shown in FIG. 2), an engine control unit 36 (shown in FIG. 5), a power supply 50, a relay 52, a horn 54, a transmission 56, a vehicle entertainment system 62, a controller area network (CAN) bus 71, a CAN bus 72, a Local Interconnect Network (LIN) bus 81, a LIN bus 82, a plurality of bolts 84 (shown in FIG. 1), and a plurality of bolts 85 (shown in FIG. 2).

The term "unified format code" means a code that corresponds to a desired vehicle operation that is not an OEM format code. In an exemplary embodiment, a unified format code comprises a number associated with a desired vehicle operation.

The term "OEM format code" means an original equipment manufacturer code that corresponds to a desired vehicle operation. In an exemplary embodiment, an OEM format code comprises a number provided by an original equipment manufacturer of a vehicle that is associated with a desired vehicle operation.

The term "OEM" means an original equipment manufacturer of a vehicle.

The term "pogo pin" means a spring loaded pin.

The term "operational voltage" means a voltage that is either directly used to power an electrical component, or a voltage that is received by a voltage regulator or other circuit that outputs another lower voltage to power an electrical component.

The term "electrical component" means any component that utilizes a voltage to function as desired. For example, an electrical component can comprise at least one of a microprocessor, a CAN transceiver, a LIN transceiver, a voltage regulator, an LED, a switch, a sensor, an encoder, a resistor, a transistor, and a capacitor.

Steering Wheel

The steering wheel 30 allows a user to steer the vehicle 20. The steering wheel 30 is operably coupled to the steering wheel instrument assembly 32.

Steering Wheel Instrument Assembly

Figure 2:
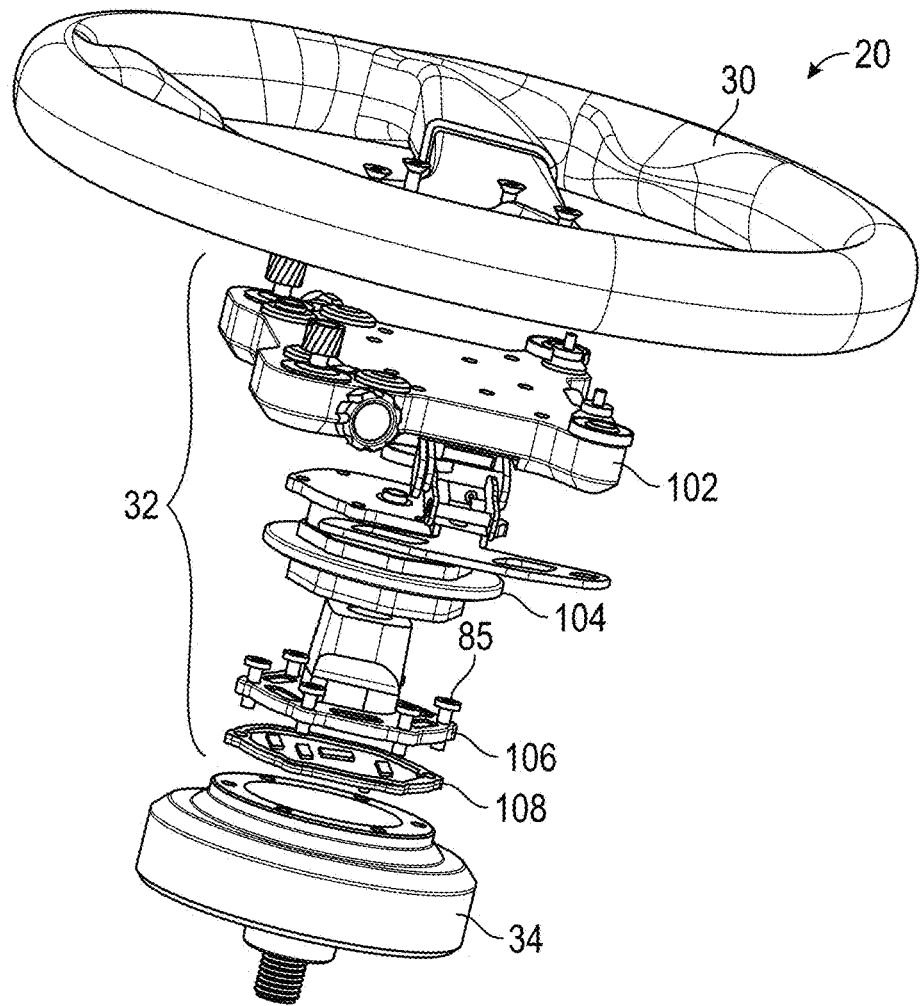
FIG. 2 is an exploded view of the steering wheel, the steering wheel hub adapter and the steering wheel instrument assembly of FIG. 1.
Figure 3:
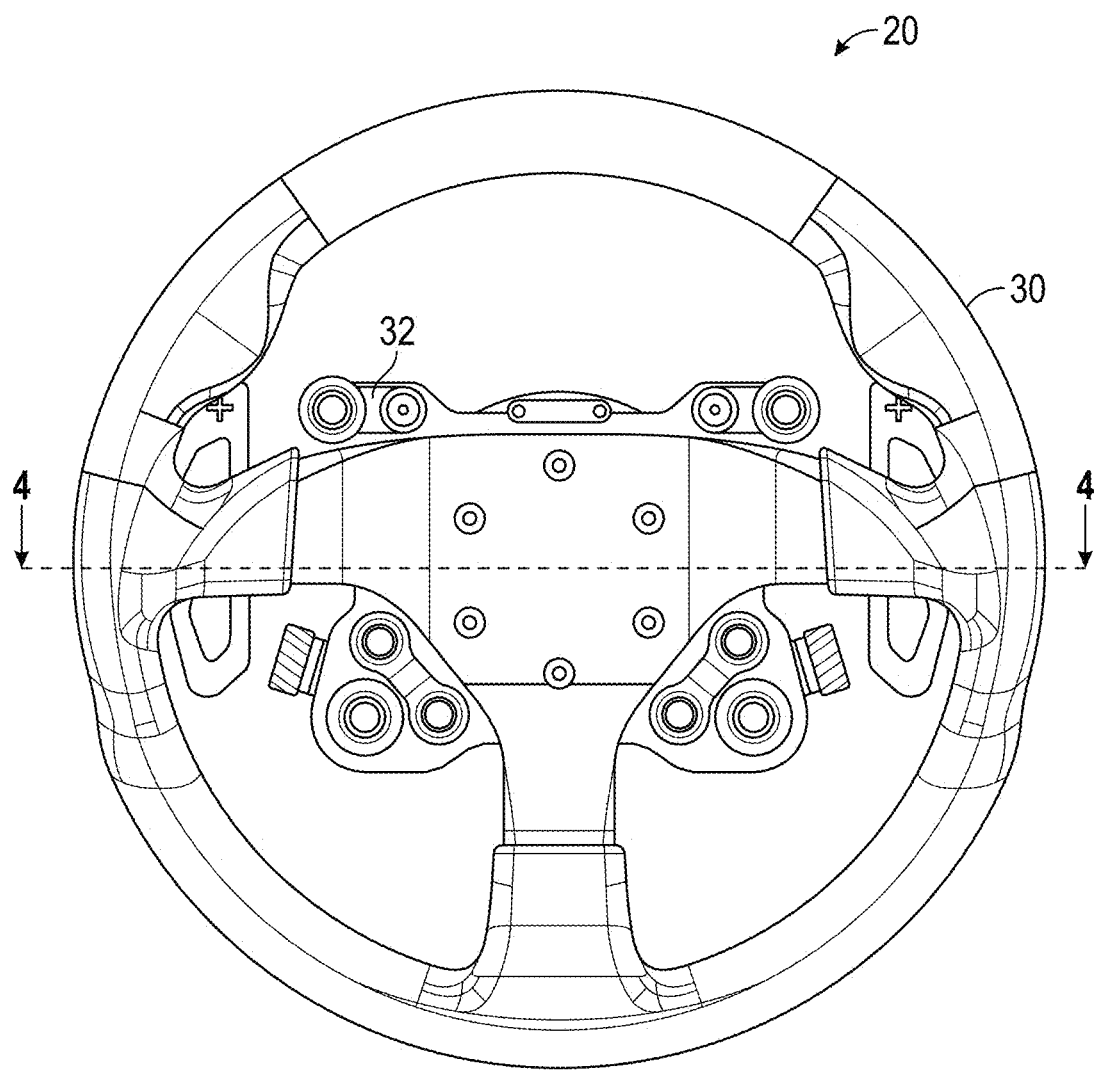
FIG. 3 is a top view of the steering wheel and the steering wheel instrument assembly of FIG. 1.
Figure 4:
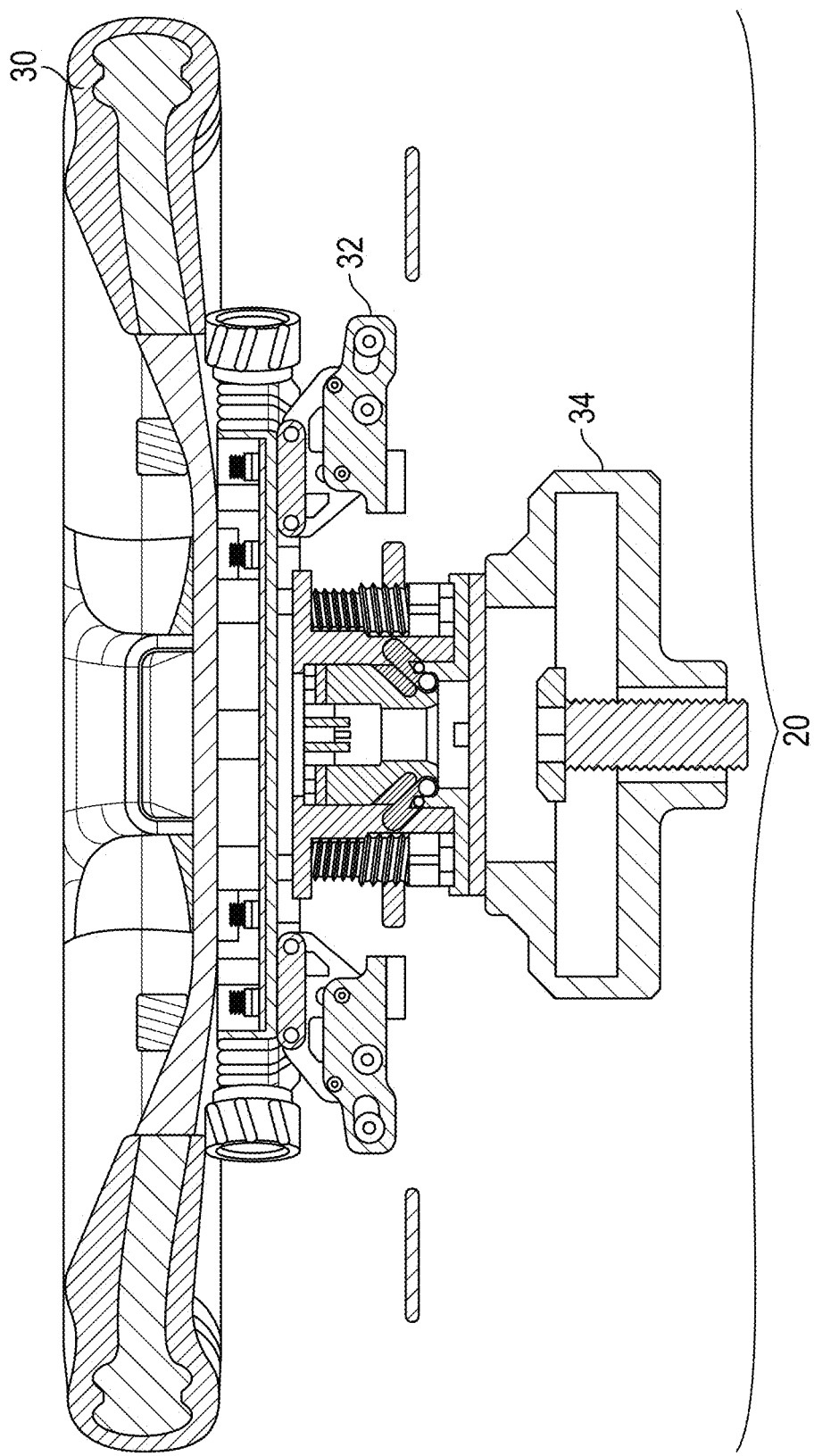
FIG. 4 is a cross-sectional view of the steering wheel, the steering wheel instrument assembly, and the hub adapter taken along lines 4-4 in FIG. 3.

Referring to FIG. 2, the steering wheel instrument assembly 32 is provided to allow users to control vehicle operations therefrom. The steering wheel instrument assembly 32 includes a button assembly 102, a quick release female assembly 104, a quick release male assembly 106, and a vehicle protocol adapter module 108.

An advantage of the steering wheel instrument assembly 32 is that the button assembly 102 has push-button switches, toggle switches, paddle shifters, joysticks, and push-button rotary encoders that are associated with unified format codes that indicate desired vehicle operations. Further, the button assembly 102 is programmable such that a user can associate a unified format code and a desired vehicle operation with a respective push-button switch, toggle switch, paddle shifter, joystick, or push-button rotary encoder. Thus, the user can configure the button assembly 102 to operate in a user-defined way. The button assembly 102 sends unified format codes to the vehicle protocol adapter module 108, which subsequently sends corresponding OEM format codes that are acceptable to in-vehicle systems for performing desired vehicle operations. By using the unified format codes and the OEM format codes, the steering wheel instrument assembly 32 can be utilized with almost any vehicle with no hardware changes.

Button Assembly

Referring to FIGS. 6-9, the button assembly 102 provided to receive user inputs and to send associated unified format codes to the vehicle protocol adapter module 108 that outputs associated OEM format codes for controlling the vehicle 20. The button assembly 102 includes a housing 130, first, second, third, fourth, fifth, sixth push-button switches 141, 142, 143, 144, 145, 146, a first paddle shifter 151, a second paddle shifter 152, a first paddle shifter sensor 161, a second paddle shifter sensor 162, a first toggle switch 171, a second toggle switch 172, a first push-button rotary encoder 181, a second push-button rotary encoder 182, a first joystick 191, a second joystick 192, a first joystick sensor 201, a second joystick sensor 202, a first LED 211, a second LED 212, a microprocessor 220, a CAN transceiver 222, a USB-C communication port 224, a voltage regulator 226, and a voltage regulator 228.

Referring to FIG. 1, the housing 130 is coupled to the steering wheel 30 utilizing a plurality of bolts 84 extending through the steering wheel 30 and into the housing 130.

Referring to FIGS. 5, 6, 9 and 10 the first, second, third, fourth, fifth, sixth push-button switches 141, 142, 143, 144, 145, 146 are coupled to the housing 130 and are operably coupled to the microprocessor 220.

First Push-Button Switch

The first push-button switch 141 is activated when the switch 141 has a first operational position (e.g., depressed operational position) thereof. In response, the microprocessor 220 accesses a record 251 in the function table 240 that is stored in the microprocessor 220 to retrieve a unified format code "1" indicating a desired vehicle operation (e.g., horn activation), and sends the unified format code to the vehicle protocol adapter module 108.

Second Push-Button Switch

The second push-button switch 142 is activated when the switch 142 has a first operational position (e.g., depressed operational position) thereof. In response, the microprocessor 220 accesses a record 252 in the function table 240 that is stored in the microprocessor 220 to retrieve a unified format code "29" indicating a desired vehicle operation (e.g., return function), and sends the unified format code to the vehicle protocol adapter module 108.

Third Push-Button Switch

The third push-button switch 143 is activated when the switch 143 has a first operational position (e.g., depressed operational position) thereof. In response, the microprocessor 220 accesses a record 253 in the function table 240 that is stored in the microprocessor 220 to retrieve a unified format code "34" indicating a desired vehicle operation (e.g., LIM activation), and sends the unified format code to the vehicle protocol adapter module 108.

Fourth Push-Button Switch

The fourth push-button switch 144 is activated when the switch 144 has a first operational position (e.g., depressed operational position) thereof. In response, the microprocessor 220 accesses a record 254 in the function table 240 that is stored in the microprocessor 220 to retrieve a unified format code "44" indicating a desired vehicle operation (e.g., line keep assist activation), and sends the unified format code to the vehicle protocol adapter module 108.

Fifth Push-Button Switch

The fifth push-button switch 145 is activated when the switch 145 has a first operational position (e.g., depressed operational position) thereof. In response, the microprocessor 220 accesses a record 255 in the function table 240 that is stored in the microprocessor 220 to retrieve a unified format code "47" indicating a desired vehicle operation (e.g., drive mode activation), and sends the unified format code to the vehicle protocol adapter module 108.

First Paddle Shifter

The first paddle shifter 151 is coupled to the housing 130 and is operably coupled to the first paddle shifter sensor 161. The first paddle shifter sensor 161 operably communicates with the microprocessor 220. The first paddle shifter sensor 161 detects when the first paddle shifter 151 has a first operational position thereof. In response, the microprocessor 220 accesses a record 261 in the function table 240 that is stored in the microprocessor 220 to retrieve a unified format code "2" indicating a desired vehicle operation (e.g., gear up), and sends the unified format code to the vehicle protocol adapter module 108.

Second Paddle Shifter

The second paddle shifter 152 is coupled to the housing 130 and is operably coupled to the second paddle shifter sensor 162. The second paddle shifter sensor 162 operably communicates with the microprocessor 220. The second paddle shifter sensor 162 detects when the second paddle shifter 152 has a first operational position thereof. In response, the microprocessor 220 accesses a record 262 in the function table 240 that is stored in the microprocessor 220 to retrieve a unified format code "3" indicating a desired vehicle operation (e.g., gear down), and sends the unified format code to the vehicle protocol adapter module 108.

First Toggle Switch

The first toggle switch 171 is coupled to the housing 130 and is operably coupled to the microprocessor 220. The first toggle switch 171 has first and second operational positions (e.g., up and down). When the first toggle switch 171 is transitioned to the first operational position (e.g., up), the microprocessor 220 accesses a record 257 in the function table 240 that is stored in the microprocessor 220 to retrieve a unified format code "10" indicating a desired vehicle operation (e.g., answer the phone), and sends the unified format code to the vehicle protocol adapter module 108. Alternately, when the first toggle switch 171 is transitioned to the second operational position (e.g., down), the microprocessor 220 accesses a record 258 in the function table 240 that is stored in the microprocessor 220 to retrieve a unified format code "11" indicating a desired vehicle operation (e.g., hang up phone), and sends the unified format code to the vehicle protocol adapter module 108.

Second Toggle Switch

The second toggle switch 172 is coupled to the housing 130 and is operably coupled to the microprocessor 220. The second toggle switch 172 has first and second operational positions (e.g., up and down). When the second toggle switch 172 is transitioned to the first operational position (e.g., up), the microprocessor 220 accesses a record 259 in the function table 240 that is stored in the microprocessor 220 to retrieve a unified format code "10" indicating a desired vehicle operation (e.g., answer the phone), and sends the unified format code to the vehicle protocol adapter module 108. Alternately, when the second toggle switch 172 is transitioned to the second operational position (e.g., down), the microprocessor 220 accesses a record 260 in the function table 240 that is stored in the microprocessor 220 to retrieve a unified format code "11" indicating a desired vehicle operation (e.g., hang up phone), and sends the unified format code to the vehicle protocol adapter module 108.

First Push-Button Rotary Encoder

A first knob 174 is operably coupled to a first push-button rotary encoder 181. The first push-button rotary encoder 181 is coupled to the housing 130 and is operably coupled to the microprocessor 220. The first push-button rotary encoder 181 has first, second, and third operational modes. When the first push-button rotary encoder 181 has the first operational mode (e.g., clockwise rotation), the microprocessor 220 accesses a record 263 in the function table 240 that is stored in the microprocessor 220 to retrieve a unified format code "35" indicating a desired vehicle operation (e.g., cruise control set −), and sends the unified format code to the vehicle protocol adapter module 108. When the first push-button rotary encoder 181 has the second operational mode (e.g., counterclockwise rotation), the microprocessor 220 accesses a record 264 in the function table 240 that is stored in the microprocessor 220 to retrieve a unified format code "36" indicating a desired vehicle operation (e.g., cruise control set +), and sends the unified format code to the vehicle protocol adapter module 108. Further, when the first push-button rotary encoder 181 has the third operational mode (e.g., press), the microprocessor 220 accesses a record 265 in the function table 240 that is stored in the microprocessor 220 to retrieve a unified format code "32" indicating a desired vehicle operation (e.g., cruise control on), and sends the unified format code to the vehicle protocol adapter module 108.

Second Push-Button Rotary Encoder

A second knob 176 is operably coupled to a second push-button rotary encoder 182. The second push-button rotary encoder 182 is coupled to the housing 130 and is operably coupled to the microprocessor 220. The second push-button rotary encoder 182 has first, second, and third operational modes. When the second push-button rotary encoder 182 has the first operational mode (e.g., clockwise rotation), the microprocessor 220 accesses a record 266 in the function table 240 that is stored in the microprocessor 220 to retrieve a unified format code "41" indicating a desired vehicle operation (e.g., cruise+10 km/h), and sends the unified format code to the vehicle protocol adapter module 108. When the second push-button rotary encoder 182 has the second operational mode (e.g., counterclockwise rotation), the microprocessor 220 accesses a record 267 in the function table 240 that is stored in the microprocessor 220 to retrieve a unified format code "42" indicating a desired vehicle operation (e.g., −10 km/h), and sends the unified format code to the vehicle protocol adapter module 108. Further, when the second push-button rotary encoder 182 has the third operational mode (e.g., press), the microprocessor 220 accesses a record 268 in the function table 240 that is stored in the microprocessor 220 to retrieve a unified format code "33" indicating a desired vehicle operation (e.g., cruise control off), and sends the unified format code to the vehicle protocol adapter module 108.

First Joystick

A first joystick 191 is operably coupled to a first joystick sensor 201. The first joystick sensor 201 is coupled to the housing 130 and is operably coupled to the microprocessor 220. The first joystick sensor 201 has first, second, third, fourth, fifth, sixth, and seventh operational modes.

When the first joystick sensor 201 has the first operational mode (e.g., up position), the microprocessor 220 accesses a record 269 in the function table 240 that is stored in the microprocessor 220 to retrieve a unified format code "24" indicating a desired vehicle operation (e.g., up movement of a display icon of the vehicle entertainment system 62), and sends the unified format code to the vehicle protocol adapter module 108.

When the first joystick sensor 201 has the second operational mode (e.g., down position), the microprocessor 220 accesses a record 270 in the function table 240 that is stored in the microprocessor 220 to retrieve a unified format code "25" indicating a desired vehicle operation (e.g., down movement of a display icon of the vehicle entertainment system 62), and sends the unified format code to the vehicle protocol adapter module 108.

When the first joystick sensor 201 has the third operational mode (e.g., left position), the microprocessor 220 accesses a record 271 in the function table 240 that is stored in the microprocessor 220 to retrieve a unified format code "26" indicating a desired vehicle operation (e.g., left movement of a display icon of the vehicle entertainment system 62), and sends the unified format code to the vehicle protocol adapter module 108.

When the first joystick sensor 201 has the fourth operational mode (e.g., right position), the microprocessor 220 accesses a record 272 in the function table 240 that is stored in the microprocessor 220 to retrieve a unified format code "27" indicating a desired vehicle operation (e.g., right movement of a display icon of the vehicle entertainment system 62), and sends the unified format code to the vehicle protocol adapter module 108.

When the first joystick sensor 201 has the fifth operational mode (e.g., clockwise rotation), the microprocessor 220 accesses a record 273 in the function table 240 that is stored in the microprocessor 220 to retrieve a unified format code "28" indicating a desired vehicle operation (e.g., left movement of a display icon of the vehicle entertainment system 62), and sends the unified format code to the vehicle protocol adapter module 108.

When the first joystick sensor 201 has the sixth operational mode (e.g., counterclockwise rotation), the microprocessor 220 accesses a record 274 in the function table 240 that is stored in the microprocessor 220 to retrieve a unified format code "29" indicating a desired vehicle operation (e.g., right movement of a display icon of the vehicle entertainment system 62), and sends the unified format code to the vehicle protocol adapter module 108.

When the first joystick sensor 201 has the seventh operational mode (e.g., pressed position), the microprocessor 220 accesses a record 275 in the function table 240 that is stored in the microprocessor 220 to retrieve a unified format code "30" indicating a desired vehicle operation (e.g., ok selection of a display icon of the vehicle entertainment system 62), and sends the unified format code to the vehicle protocol adapter module 108.

Second Joystick

A second joystick 192 is operably coupled to a second joystick sensor 202. The second joystick sensor 202 is coupled to the housing 130 and is operably coupled to the microprocessor 220. The second joystick sensor 202 has first, second, third, fourth, fifth, sixth, and seventh operational modes.

When the second joystick sensor 202 has the first operational mode (e.g., up position), the microprocessor 220 accesses a record 276 in the function table 240 that is stored in the microprocessor 220 to retrieve a unified format code "4" indicating a desired vehicle operation (e.g., volume+ associated with a speaker in the vehicle entertainment system 62), and sends the unified format code to the vehicle protocol adapter module 108.

When the second joystick sensor 202 has the second operational mode (e.g., down position), the microprocessor 220 accesses a record 277 in the function table 240 that is stored in the microprocessor 220 to retrieve a unified format code "5" indicating a desired vehicle operation (e.g., volume—associated with a speaker in the vehicle entertainment system 62), and sends the unified format code to the vehicle protocol adapter module 108.

When the second joystick sensor 202 has the third operational mode (e.g., left position), the microprocessor 220 accesses a record 278 in the function table 240 that is stored in the microprocessor 220 to retrieve a unified format code "7" indicating a desired vehicle operation (e.g., previous song associated with the vehicle entertainment system 62), and sends the unified format code to the vehicle protocol adapter module 108.

When the second joystick sensor 202 has the fourth operational mode (e.g., right position), the microprocessor 220 accesses a record 279 in the function table 240 that is stored in the microprocessor 220 to retrieve a unified format code "8" indicating a desired vehicle operation (e.g., next song associated with the vehicle entertainment system 62), and sends the unified format code to the vehicle protocol adapter module 108.

When the second joystick sensor 202 has the fifth operational mode (e.g., clockwise rotation), the microprocessor 220 accesses a record 280 in the function table 240 that is stored in the microprocessor 220 to retrieve a unified format code "4" indicating a desired vehicle operation (e.g., volume+associated with a speaker in the vehicle entertainment system 62), and sends the unified format code to the vehicle protocol adapter module 108.

When the second joystick sensor 202 has the sixth operational mode (e.g., counterclockwise rotation), the microprocessor 220 accesses a record 281 in the function table 240 that is stored in the microprocessor 220 to retrieve a unified format code "5" indicating a desired vehicle operation (e.g., volume–associated with a speaker in the vehicle entertainment system 62), and sends the unified format code to the vehicle protocol adapter module 108.

When the second joystick sensor 202 has the seventh operational mode (e.g., pressed position), the microprocessor 220 accesses a record 282 in the function table 240 that is stored in the microprocessor 220 to retrieve a unified format code "12" indicating a desired vehicle operation (e.g., source selection associated with the vehicle entertainment system 62), and sends the unified format code to the vehicle protocol adapter module 108.

Figure 9:
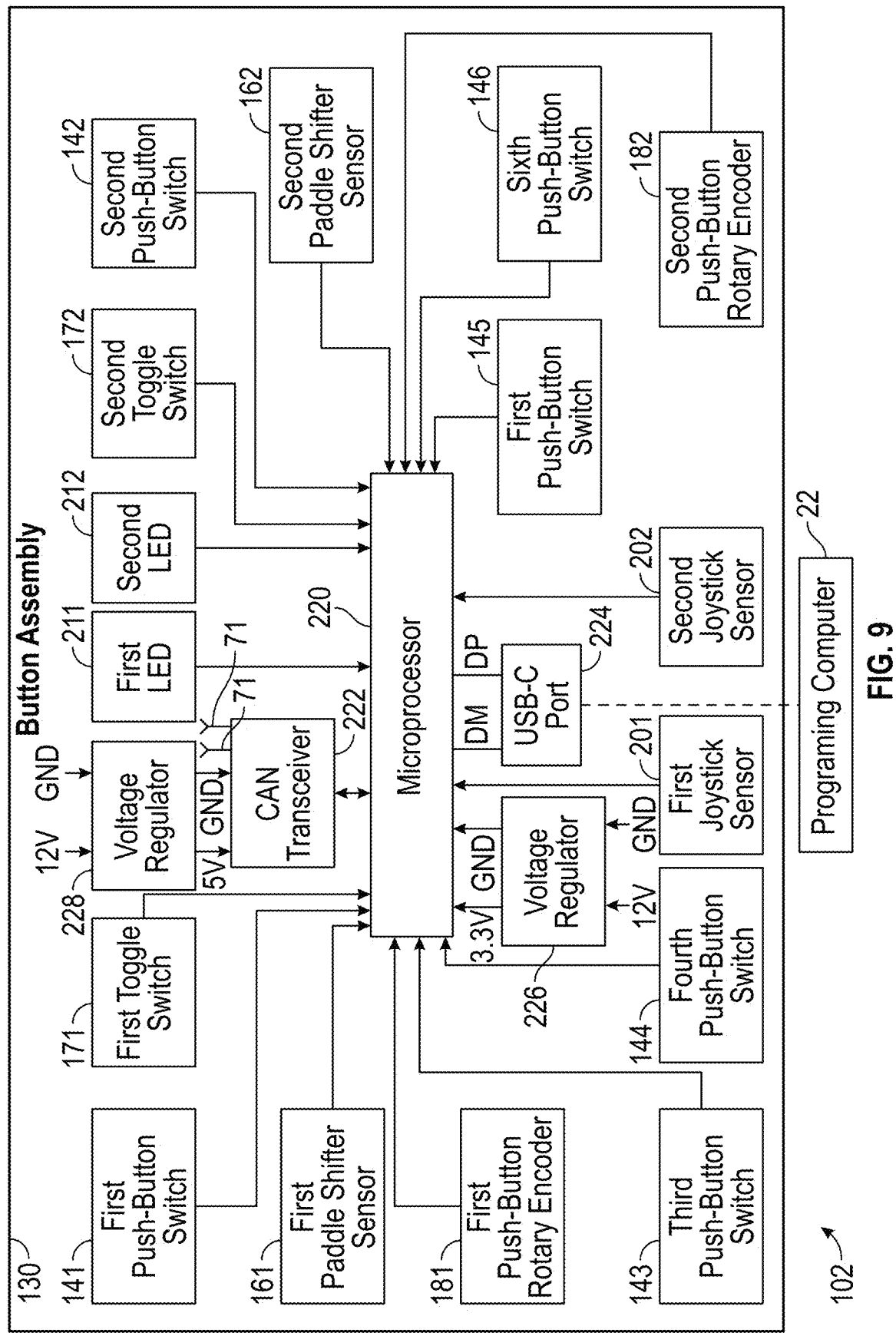
FIG. 9 is a block diagram of a button assembly utilized in the steering wheel instrument assembly of FIG. 6, and a programming computer.

Referring to FIG. 9, the first and second LEDs 211, 212 are coupled to the housing 130 and operably coupled to the microprocessor 220. The microprocessor 220 generates control signals to turn on the LEDs 211, 212.

CAN Transceiver

Figure 39:
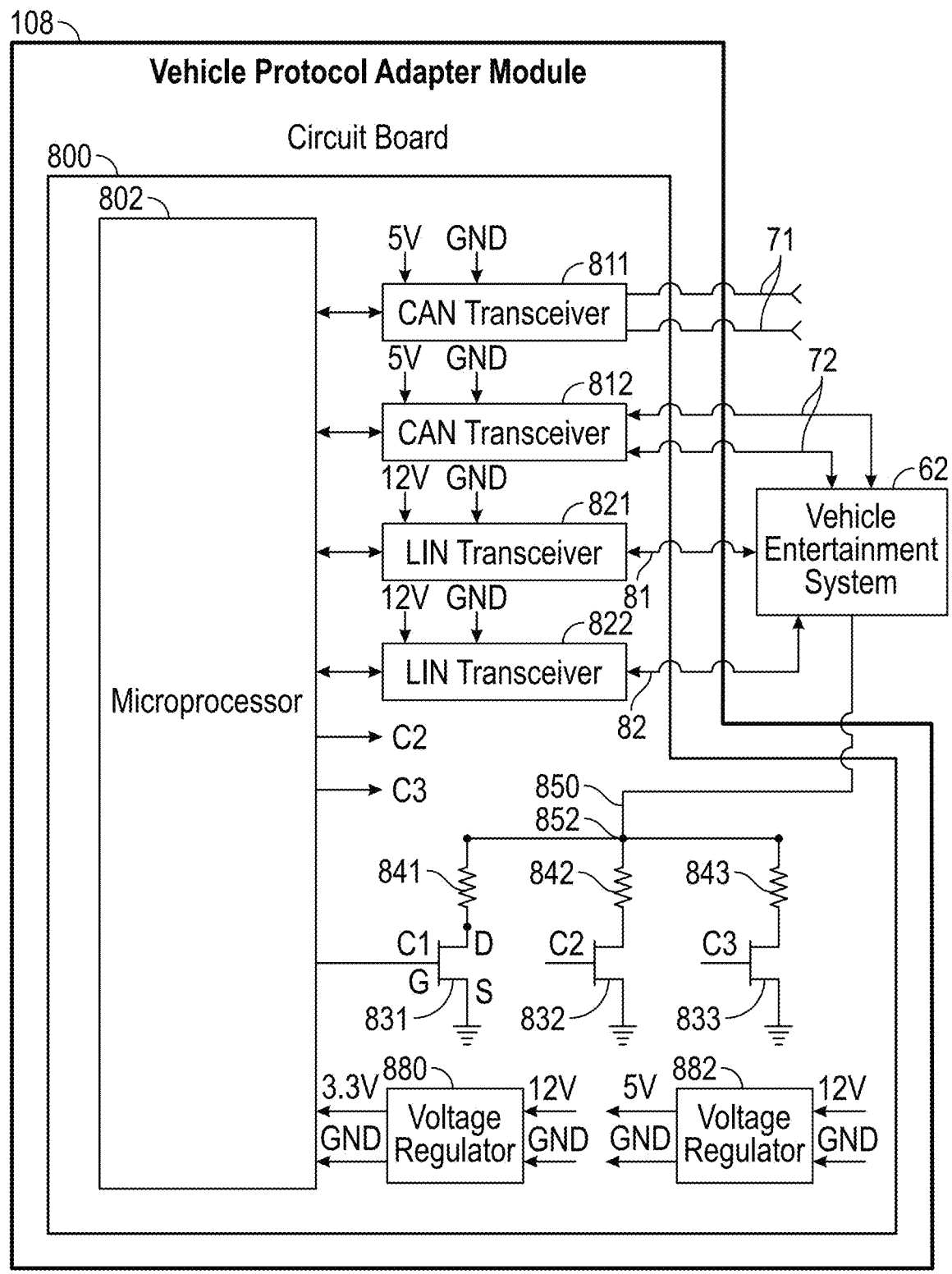
FIG. 39 is a block diagram of the vehicle protocol adapter module of FIG. 37 operably coupled to a vehicle entertainment system.
Figure 42:
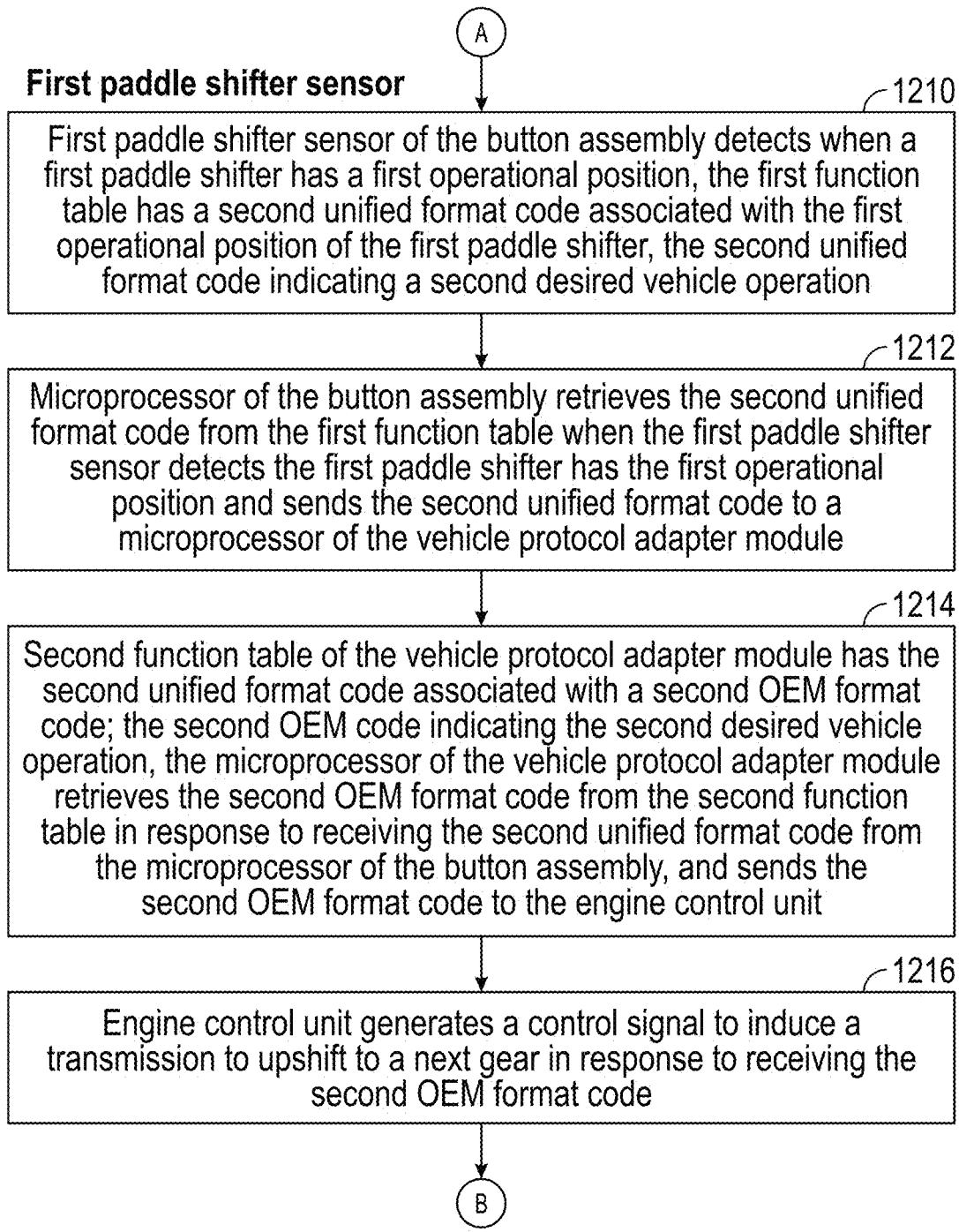
Figure 43:
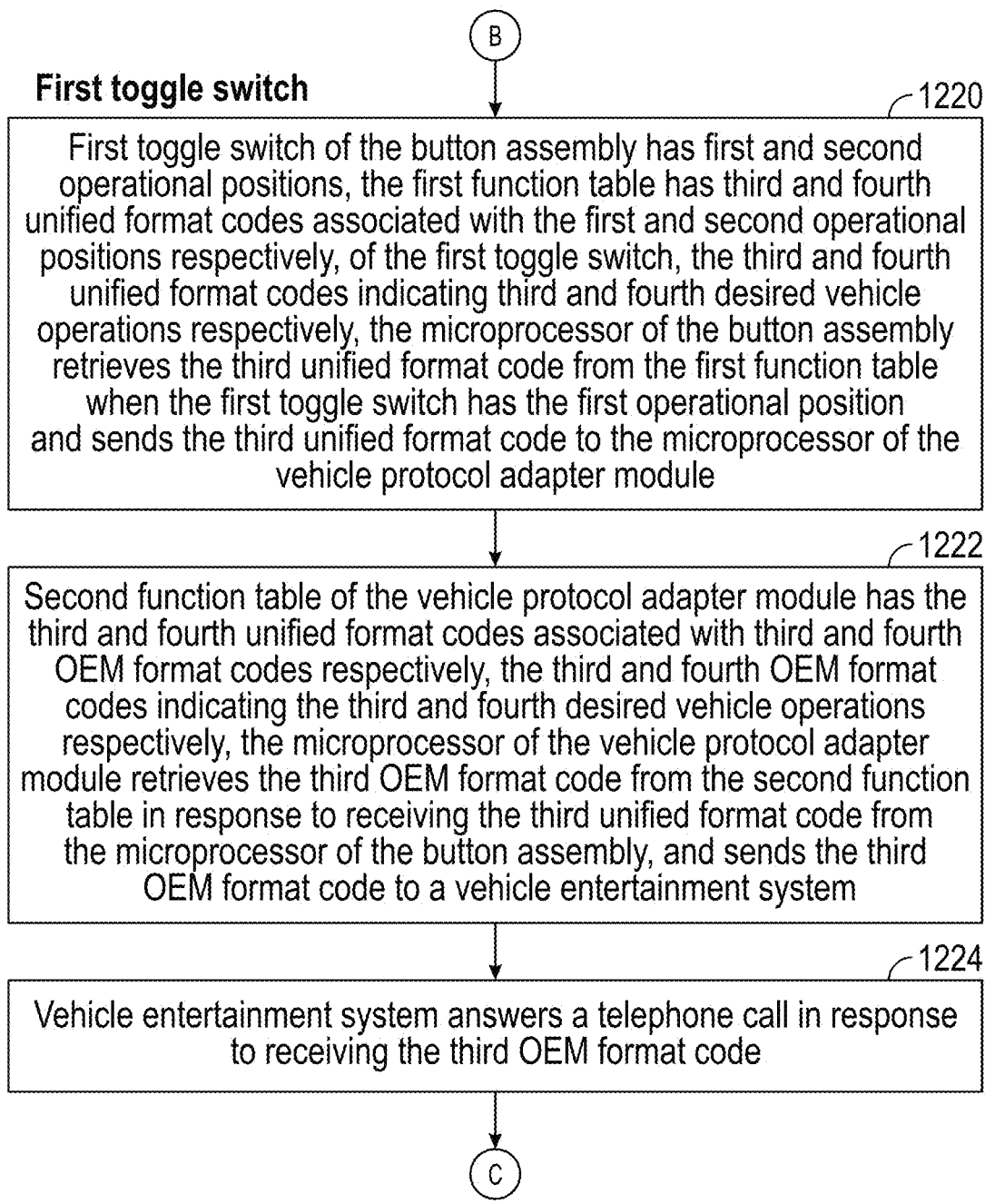
Figure 44:
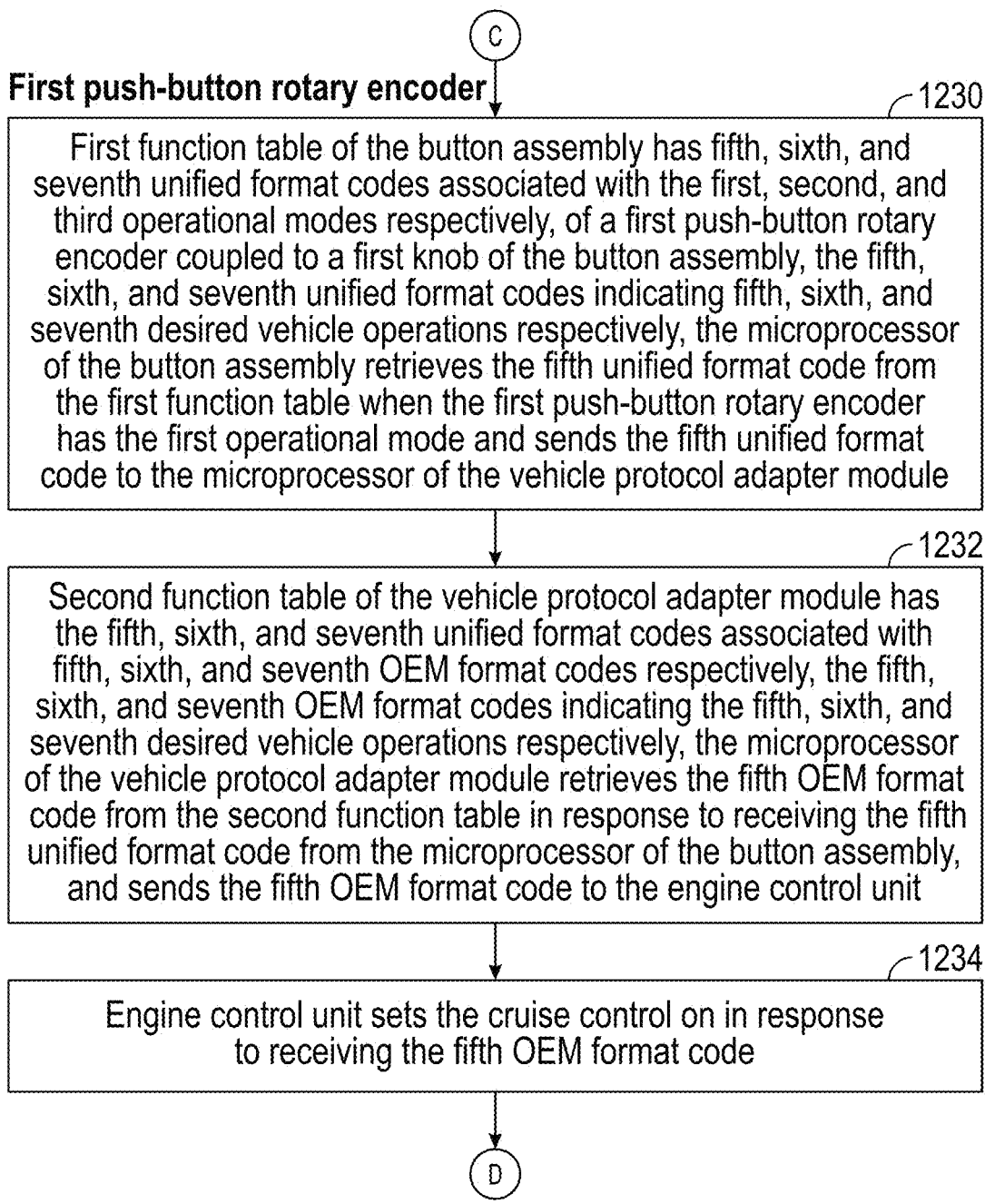
Figure 45:
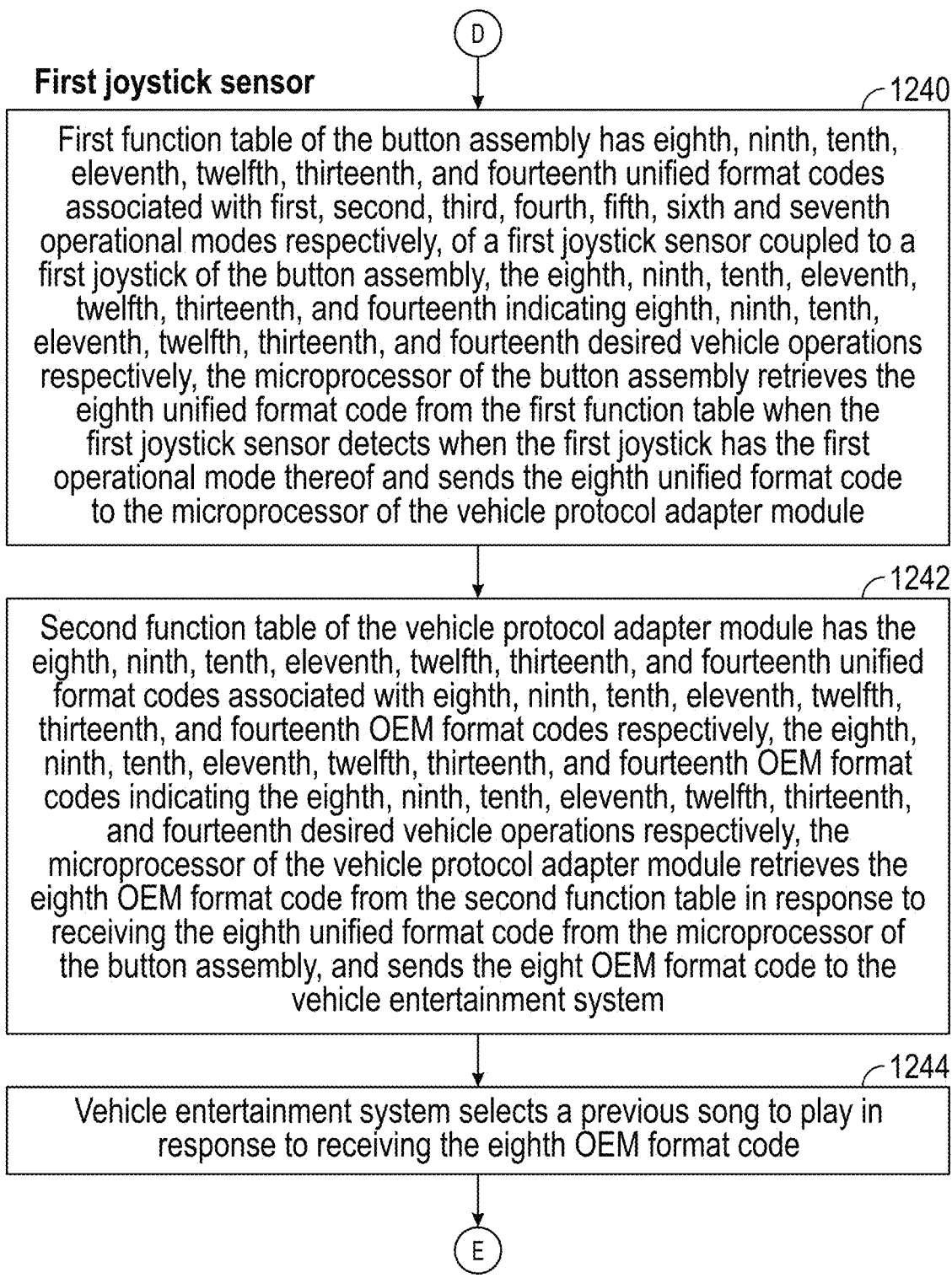
Figure 46:
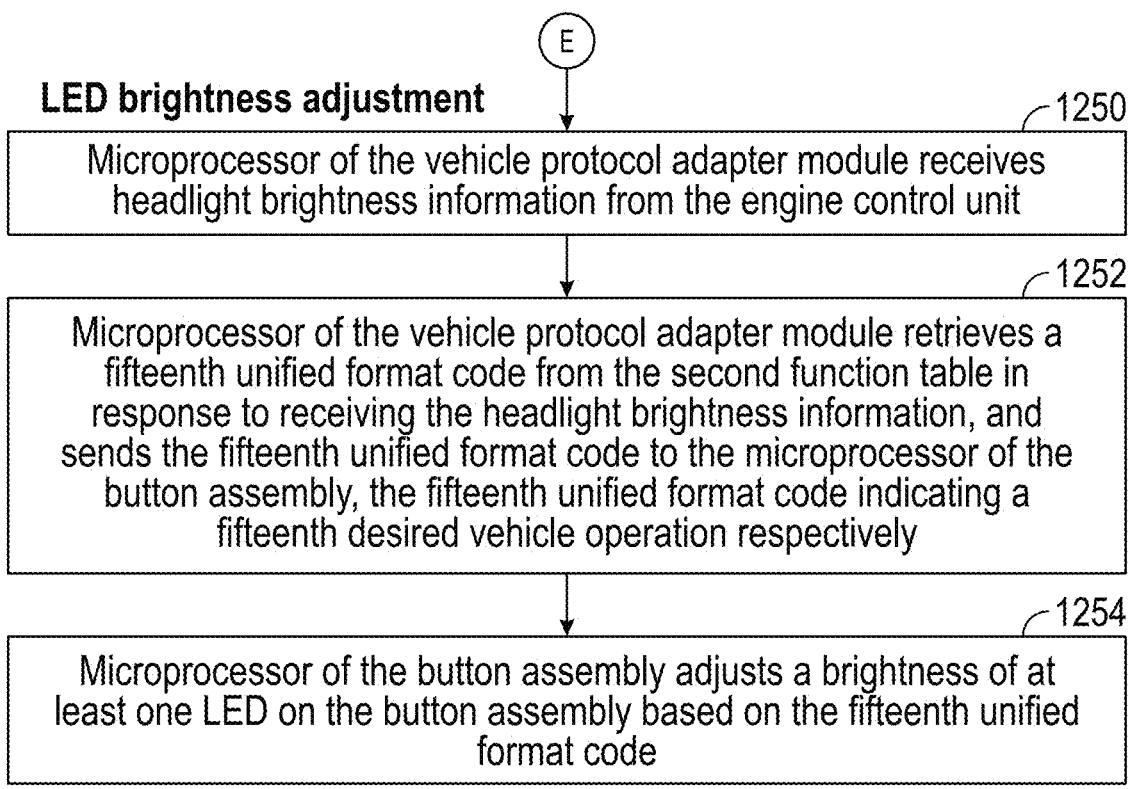
Figure 48:
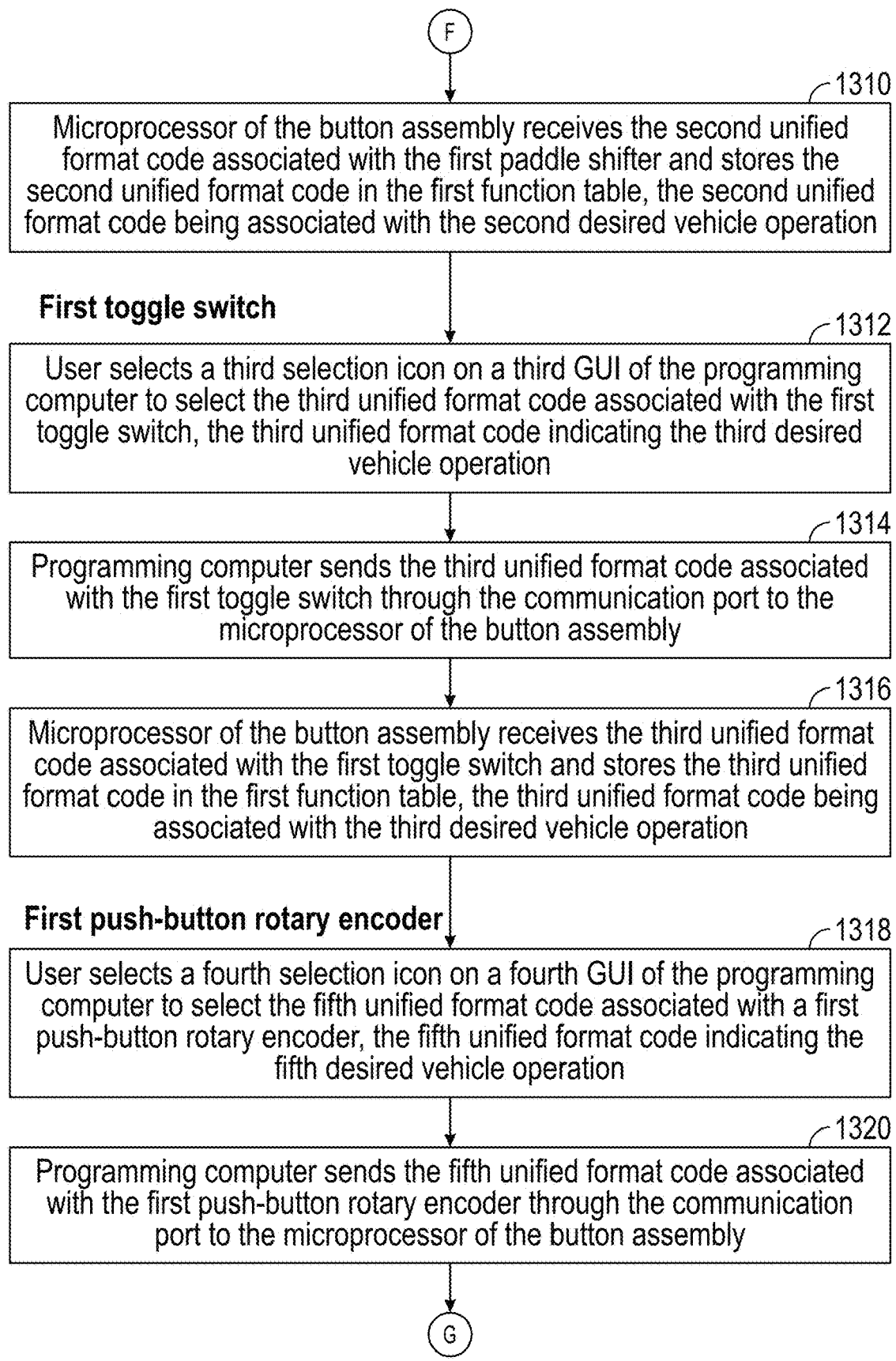
Figure 49:
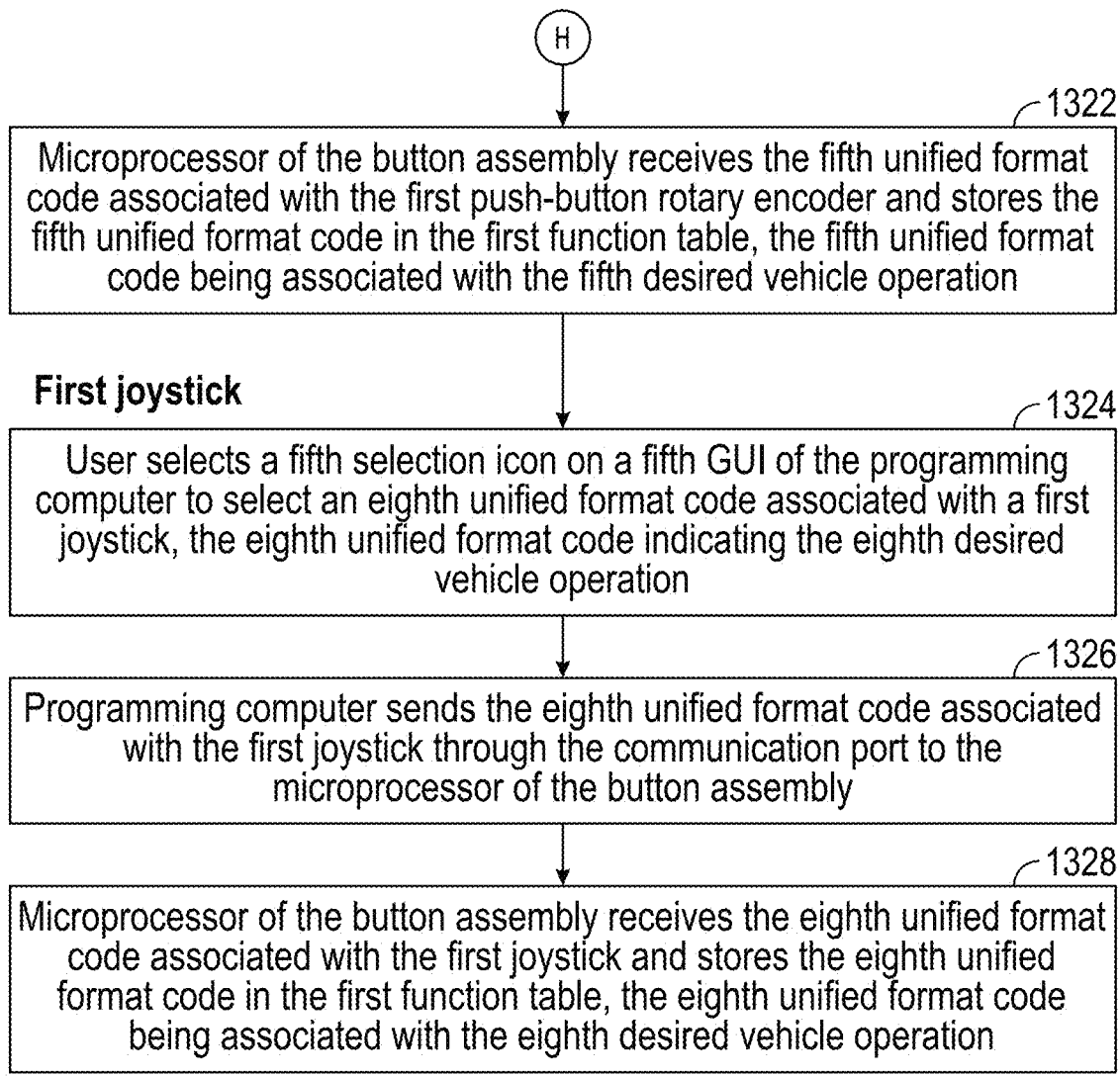

Referring to FIGS. 9 and 39, the CAN transceiver 222 is operably coupled to the microprocessor 220. The CAN transceiver 222 is provided to communicate with the CAN transceiver 811 of the vehicle protocol adapter module 108 via the CAN bus 71. The CAN transceiver 222 receives 5 volts (i.e., 5V) and a ground level voltage (i.e., GND) from the voltage regulator 228.

USB-C Port

Referring to FIG. 9, the USB-C port 224 is operably coupled to the microprocessor 220 and the programming computer 22. The USB-C port 224 is provided to allow communication between the microprocessor 220 and the programming computer 22. The USB-C port 224 operably communicates through a DM line and a DP line with the microprocessor 220. Further, referring to FIGS. 9, 28, 30, and 39, the USB-C port 224 is provided to allow communication between the programming computer 22 and the microprocessor 802 of the vehicle protocol adapter module 108 utilizing the pogo pins 601, 602 (i.e., DM and DP pogo pins shown in FIG. 28) that are removably coupled to associated pins 711, 712 respectively on the electrical connector 654 (shown in FIG. 35) of the quick release male assembly 106 which are further electrically coupled to the microprocessor 802.

Microprocessor

The microprocessor 220 is provided to control the operation of the button assembly 130 as explained herein. The microprocessor 220 is electrically coupled to the first, second, third, fourth, fifth, sixth push-button switches 141, 142, 143, 144, 145, 146, the first paddle shifter sensor 161, the second paddle shifter sensor 162, the first toggle switch 171, the second toggle switch 172, the first push-button rotary encoder 181, the second push-button rotary encoder 182, the first joystick sensor 201, the second joystick sensor 202, the first LED 211, the second LED 212, the CAN transceiver 222, and the USB-C port 224. As discussed above, the microprocessor 220 stores the first function table 240 having records 251-282 therein. The microprocessor 220 receives 3.3 volts (i.e., 3.3V) and a ground level voltage (i.e., GND) from the voltage regulator 226.

The voltage regulator 226 receives 12 volts (i.e., 12V) and a ground level voltage (i.e. GND) from the vehicle protocol adapter module 108, and outputs 3.3 volts (i.e., 3.3V) and a ground level voltage (i.e., GND).

The voltage regulator 228 receives 12 volts (i.e., 12V) and a ground level voltage (i.e. GND) from the vehicle protocol adapter module 108, and outputs 5 volts (i.e., 5V) and a ground level voltage (i.e., GND).

Quick Release Female Assembly

Referring to FIGS. 2 and 11-31, the quick release female assembly 104 is coupled to button assembly 102. The quick release female assembly 104 is provided to be removably coupled to the quick release male assembly 106. The quick release female assembly 104 includes a female base member 350 (shown in FIG. 19), a movable release member 352 (shown in FIG. 22), first and second rods 361, 362 (shown in FIG. 17), and first, second, third, and fourth springs 371, 372, 373, 374, an electrical connector 380 (shown in FIG. 28), and an open region 382 (shown in FIG. 11).

Female Base Member

Referring to FIGS. 17-21, the female base member 350 is provided to receive the shaft member 652 (shown in FIG. 32) of the quick release male assembly 106 therein. The female base member 350 includes a bottom wall 410, first, second, third, and fourth side walls 421, 422, 423, 424, and first, second, third, and fourth spring receiving tubes 431, 432, 433, 434.

Figure 21:
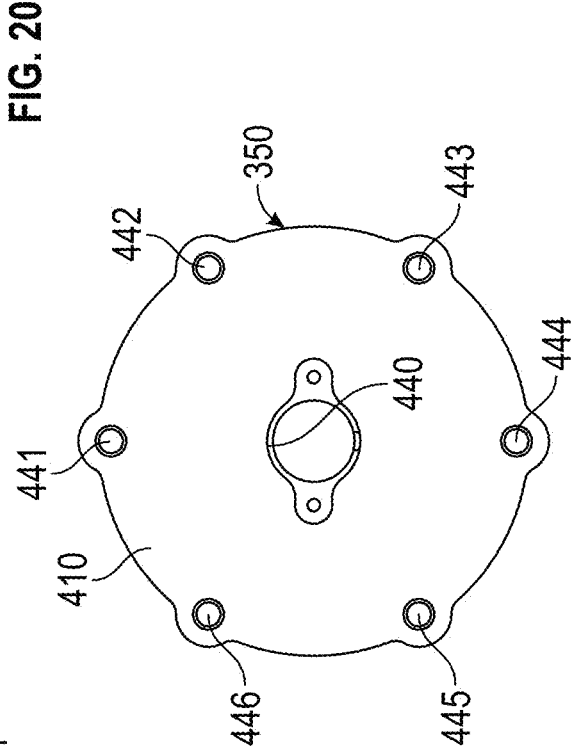
FIG. 21 is a bottom view of the female base member of FIG. 19.
Figure 19:
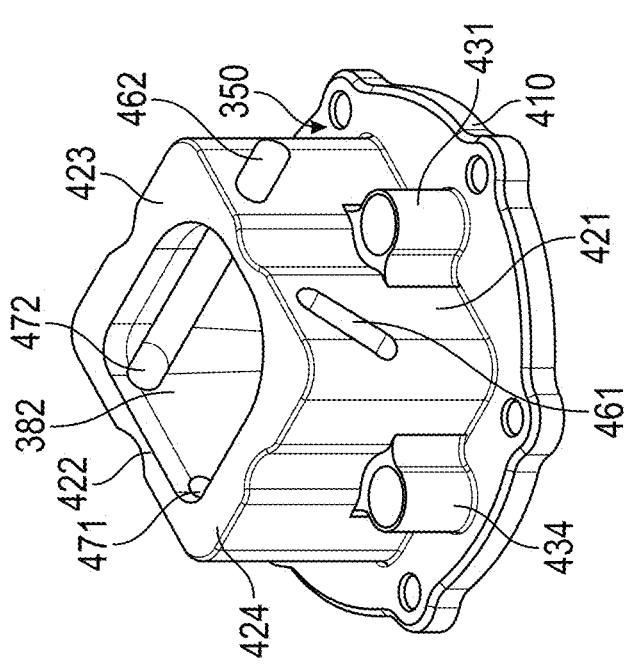
FIG. 19 is an isometric view of a female base member utilized in the quick release female assembly of FIG. 13.
Figure 23:
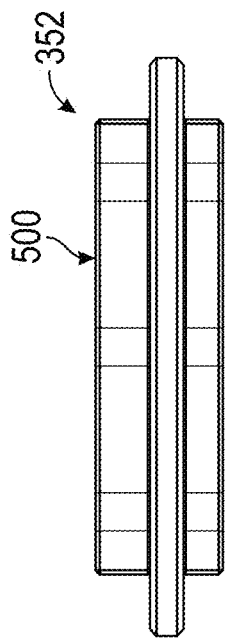
FIG. 23 is a side view of the movable rod holding member of FIG. 22.
Figure 28:
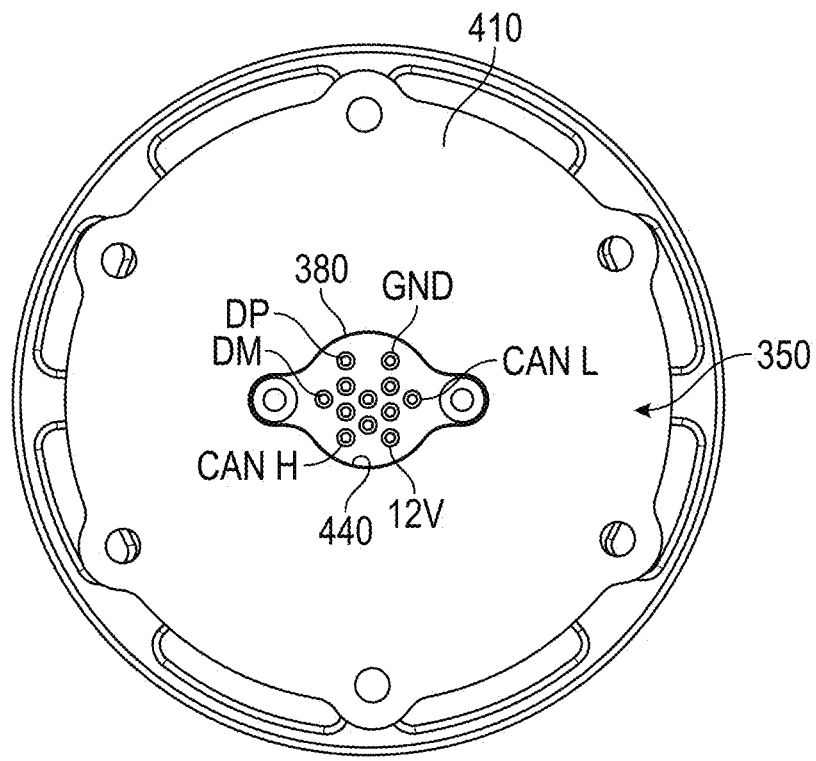
FIG. 28 is a bottom view of the quick release female assembly of FIG. 13.
Figure 29:
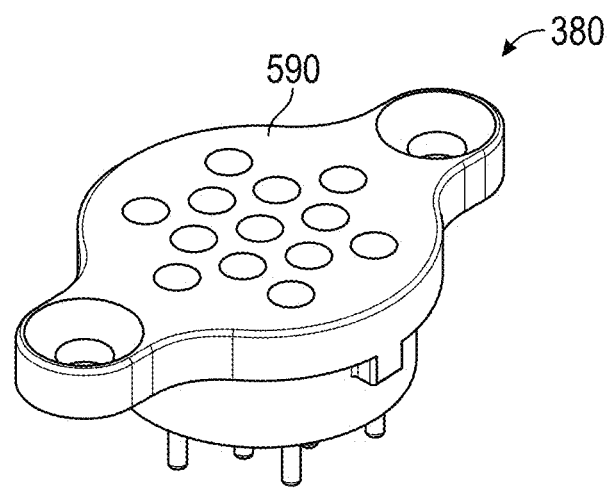
FIG. 29 is an isometric view of an electrical connector utilized in the quick release female assembly of FIG. 28.

Referring to FIGS. 19, 21 and 28, the bottom wall 410 includes a central aperture 440 that communicates with the open region 382. The central aperture 440 is sized and shaped to receive the electrical connector 380 therein. The bottom wall 410 further includes mounting apertures 441, 442, 443, 444, 445, 446 extending therethrough. The mounting apertures 441, 442, 443, 444, 445, 446 receive bolts therethrough that are coupled to the housing 130 of the button assembly 102.

The first, second, third, and fourth side walls 421, 422, 423, 424 are coupled to and extend upwardly from the bottom wall 410. The first, second, third, and fourth side walls 421, 422, 423, 424 define an open region 382 therebetween.

Figure 20:
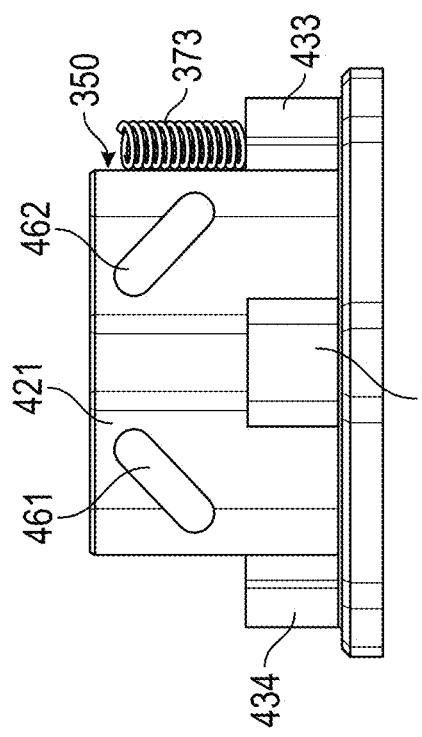
FIG. 20 is a side view of the female base member of FIG. 19.

Referring to FIGS. 19 and 20, the first side wall 421 has first and second elongated apertures 461, 462 extending therethrough.

The second side wall 422 has first and second elongated apertures 471, 472 extending therethrough that are axially aligned with the first and second elongated apertures 461, 462 respectively of the first wall 421.

The first, second, third, and fourth spring receiving tubes 431, 432, 433, 434 are coupled to and extend upwardly from the bottom wall 410. The first, second, third, and fourth spring receiving tubes 431, 432, 433, 434 are disposed adjacent to the first, second, third, and fourth side walls 421, 422, 423, 424 respectively, and hold the first, second, third, and fourth springs 371, 372, 373, 374 respectively therein.

Movable Release Member

Figure 13:
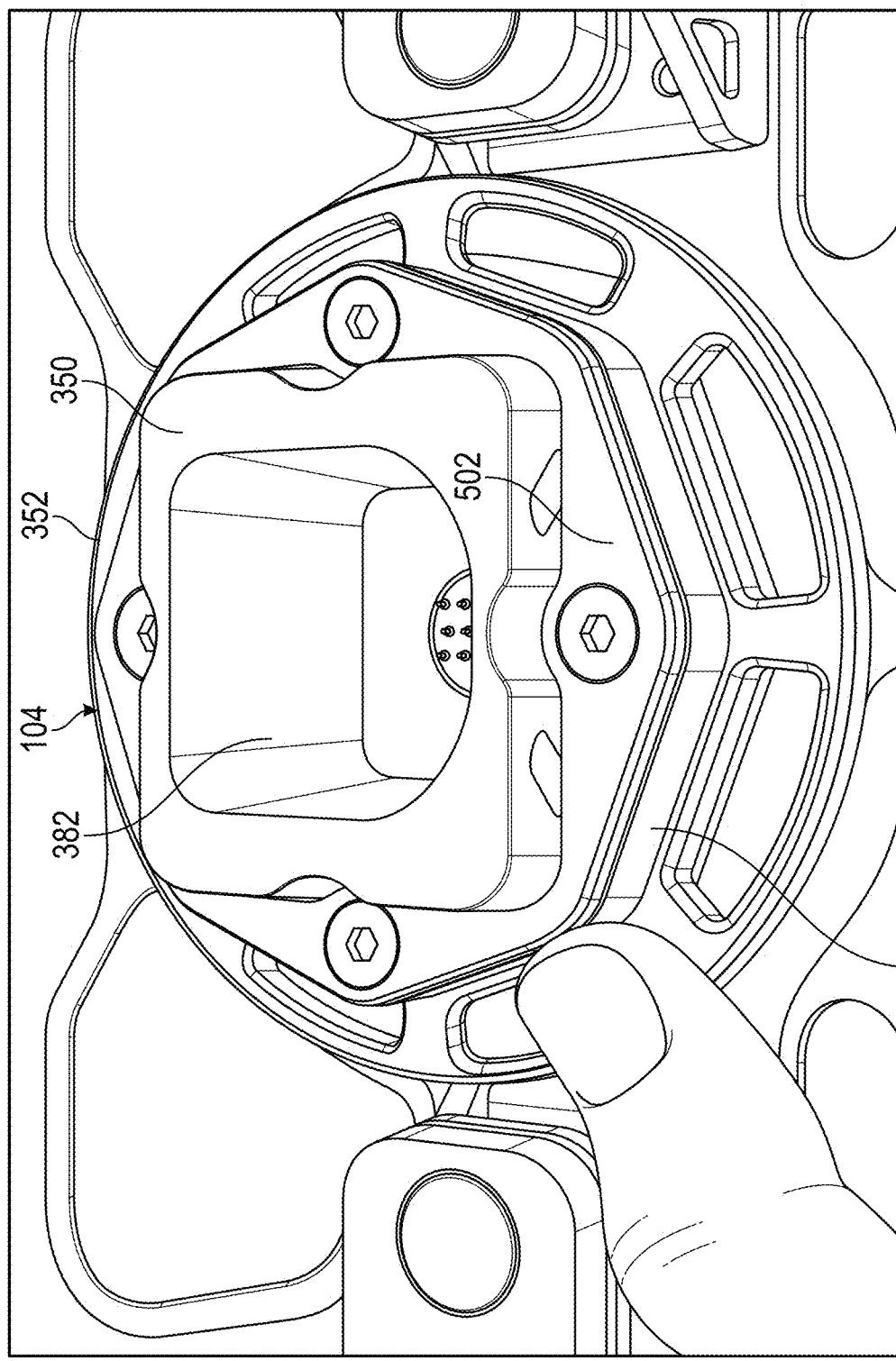
FIG. 13 is another view of the quick release female assembly of FIG. 11 having a depressed operational position for receiving a quick release male assembly therein.
Figure 14:
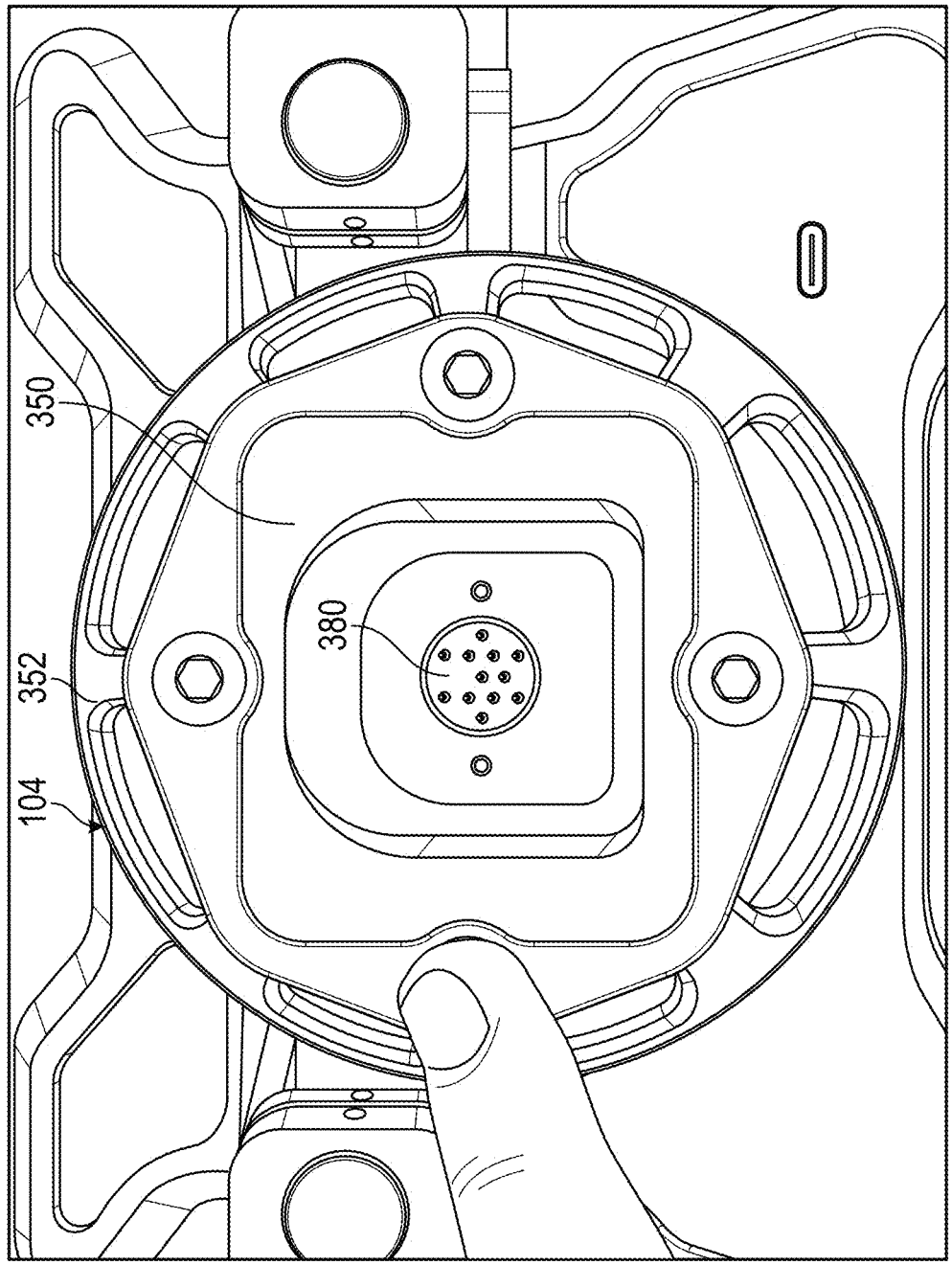
FIG. 14 is a top view of the quick release female assembly of FIG. 13.
Figure 15:
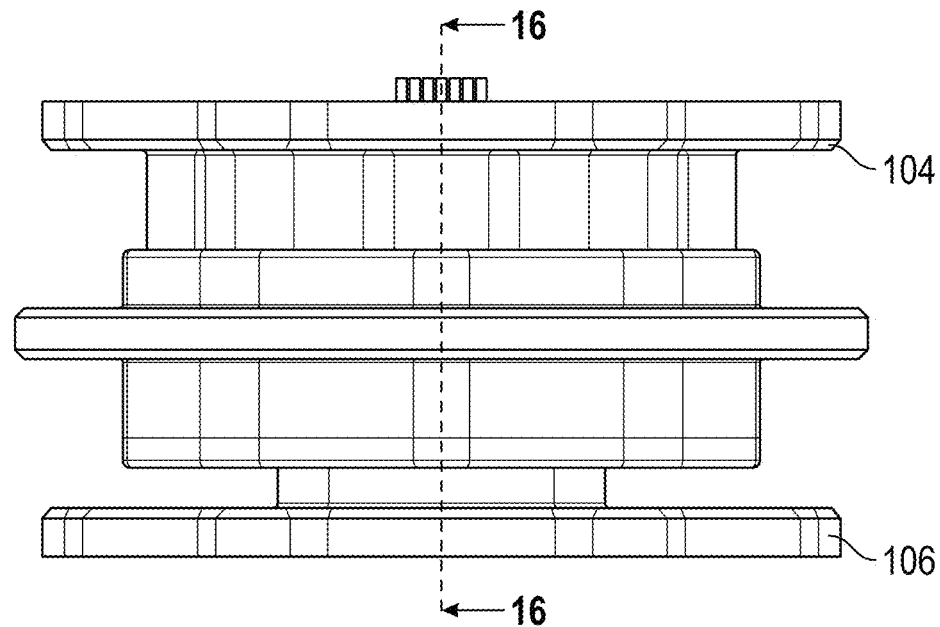
FIG. 15 is a side view of the quick release female assembly of FIG. 11 coupled to a quick release male assembly.

Referring to FIGS. 11, 13 and 22-24, the movable release member 352 is provided to move the first and second rods 361, 362 between a first operational position (shown in FIG. 11) and a second operational position (shown in FIG. 13). The movable release member 352 includes a movable rod holding member 500 and a top plate 502.

Movable Rod Holding Member

Figure 24:
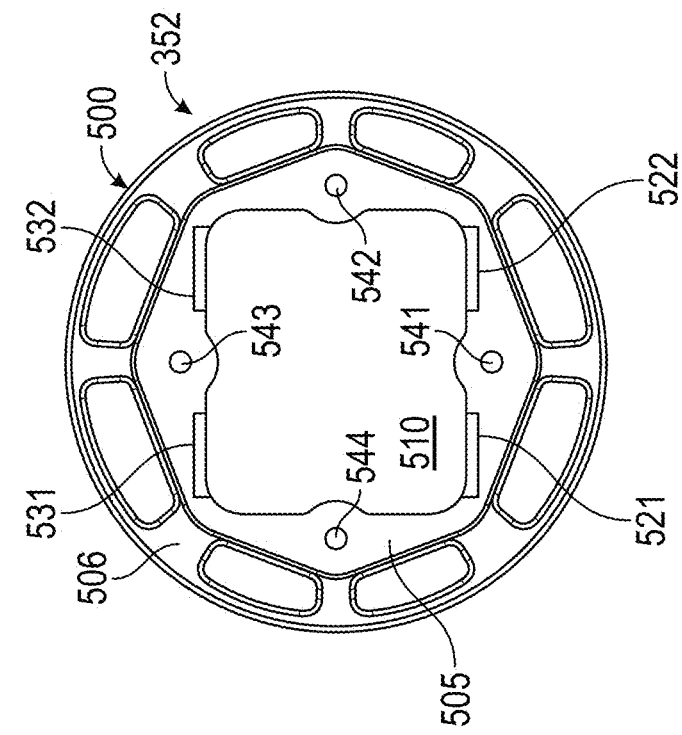
FIG. 24 is a top view of the movable rod holding member of FIG. 22.
Figure 22:
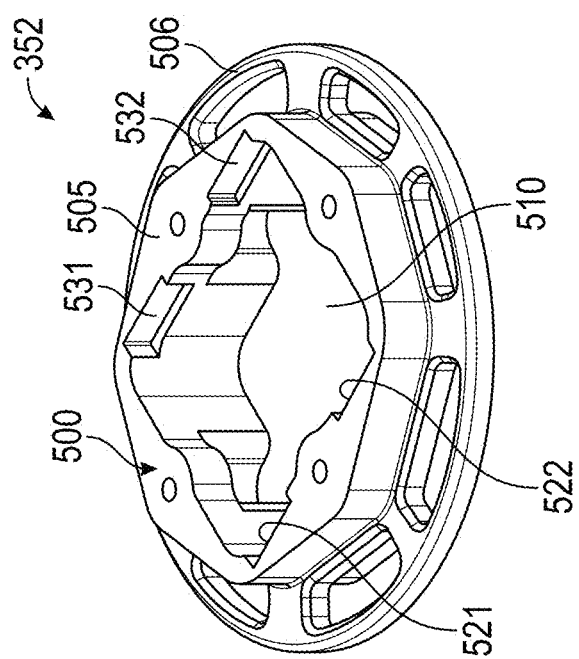
FIG. 22 is an isometric view of a movable rod holding member utilized in the quick release female assembly of FIG. 13.
Figure 27:
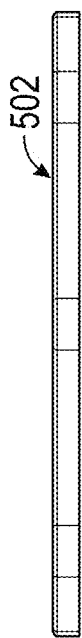
FIG. 27 is a side view of a top plate of FIG. 25.
Figure 26:
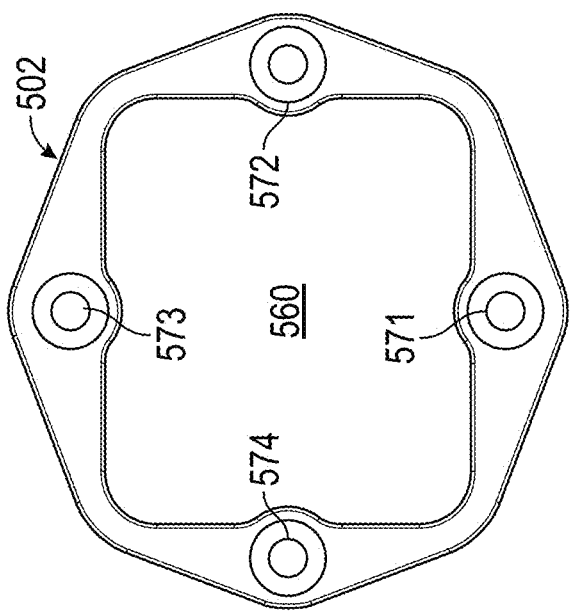
FIG. 26 is a top view of a top plate of FIG. 25.
Figure 25:
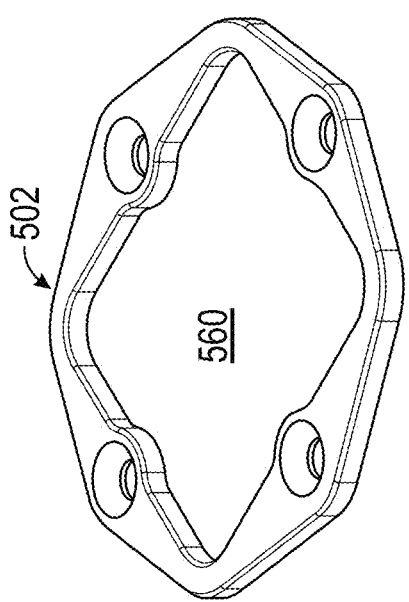
FIG. 25 is an isometric view of a top plate utilized in the quick release female assembly of FIG. 13.

The movable rod holding member 352 includes a central body 505 and a ring-shaped member 506 coupled to and surrounding the central body 505. Referring to FIGS. 22 and 24, the central body 505 has a central aperture 510 extending therethrough. Further, the central body 505 has first, second, third, and fourth grooves 521, 522, 531, 532 extending from a top surface thereof into the central body 505. Further, the central body 505 has first, second, third, and fourth mounting apertures 541, 542, 543, 544 extending from a top surface thereof into the central body 505 for coupling the movable rod holding member 352 to the top plate 502.

Figure 11:
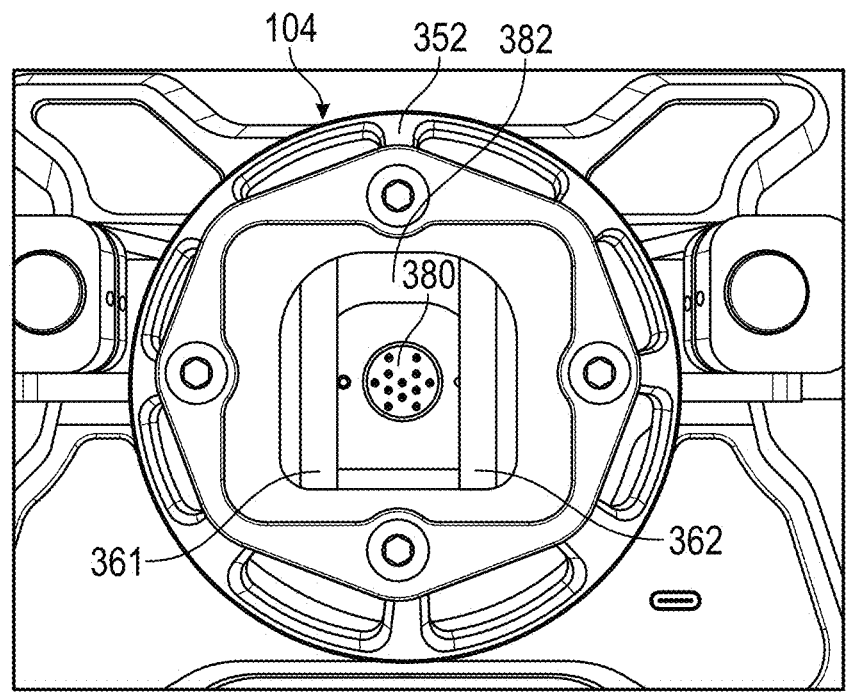
FIG. 11 is a bottom view of a portion of the button assembly of FIG. 6 having a quick release female assembly attached thereto.
Figure 12:
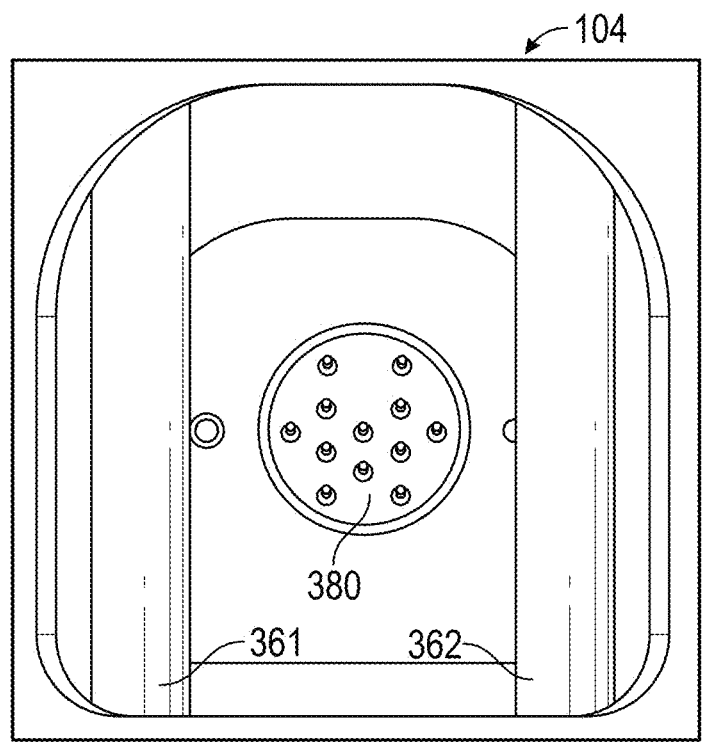
FIG. 12 is an enlarged view of a portion of the quick release female assembly of FIG. 11.

Referring to FIGS. 11, 19 and 22, the central body 505 of the moveable rod holding member 400 is disposed around and slidably contacts the first, second, third, and fourth side walls 421, 422, 423, 424 of the female base member 350. The central body 505 holds the first rod 361 in the grooves 521, 531. Further, the central body 505 holds the second rod 362 in the grooves 522, 532. The top plate 502 is coupled to the central body 505 and holds the first and second rods 361, 362 in the central body 505.

Further, the central body 505 of the moveable rod holding member 400 holds the first rod 361 such that the first rod 361 is disposed in the first elongated aperture 461 of the first side wall 421 of the female base member 350 and the first elongated aperture 471 of the second side wall 422 of the central body 505.

Further, the central body 505 of the moveable rod holding member 400 holds the second rod 362 such that the second rod 362 is disposed in the second elongated aperture 462 of the first side wall 421 of the female base member 350 and the second elongated aperture 472 of the second side wall 422 of the central body 505.

Figure 17:
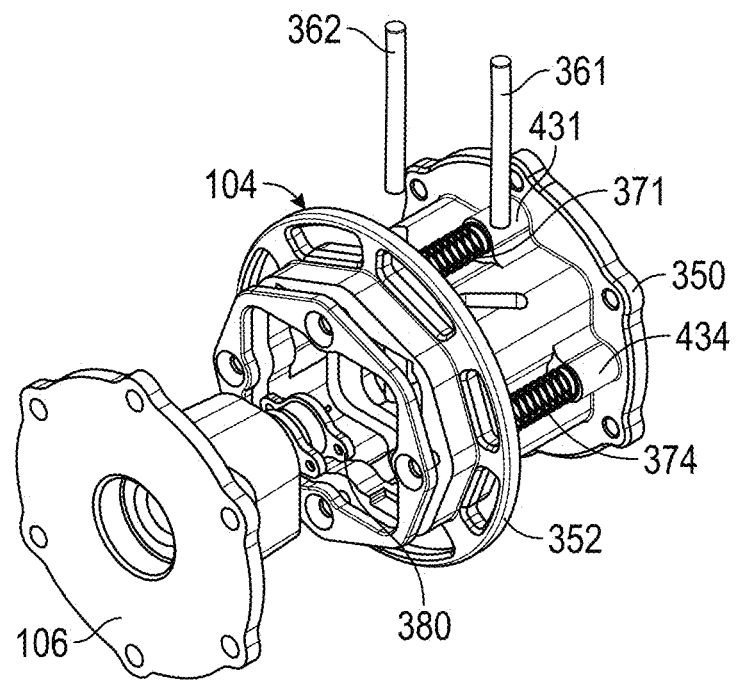
FIG. 17 is an exploded view of the quick release female assembly and the quick release male assembly of FIG. 15.
Figure 18:
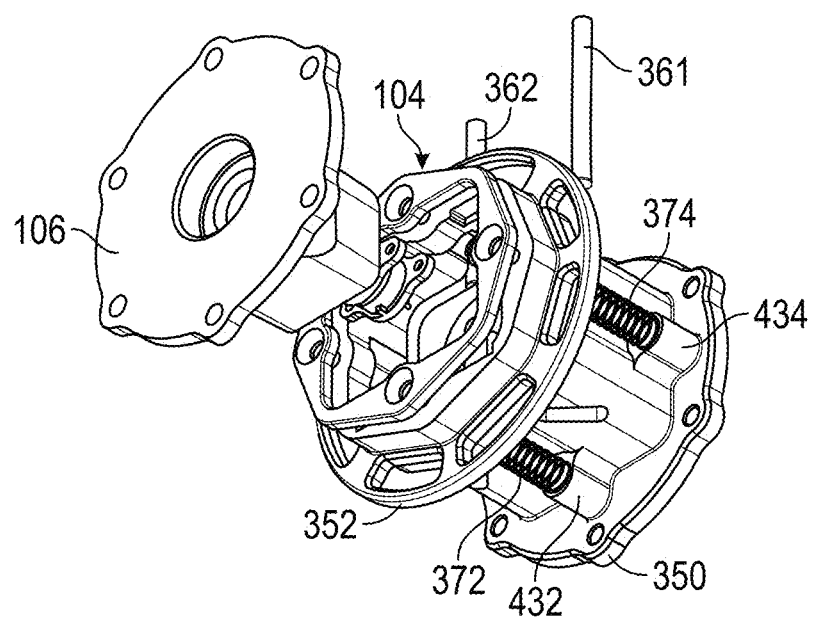
FIG. 18 is another exploded view of the quick release female assembly and the quick release male assembly of FIG. 17.

Referring to FIGS. 17, 18 and 20, the first, second, third, and fourth springs 371, 372, 373, 374 bias the movable release member 352 outwardly from the female base member 350 in a first direction.

Top Plate

Referring to FIGS. 13 and 25-27, the top plate 502 has the central aperture 560 extending therethrough that communicates with the central aperture 510 (shown in FIG. 22) of the central body 505 of the movable rod holding member 500. The top plate 502 further includes first, second, third, and fourth mounting apertures 571, 572, 573, 574 that align with the first, second, third, and fourth mounting apertures 541, 542, 543, 544 (shown in FIG. 24) respectively of the central body 505 for receiving respective bolts therethrough for coupling the top plate 52 to the movable rod holding member 500.

Figure 16:
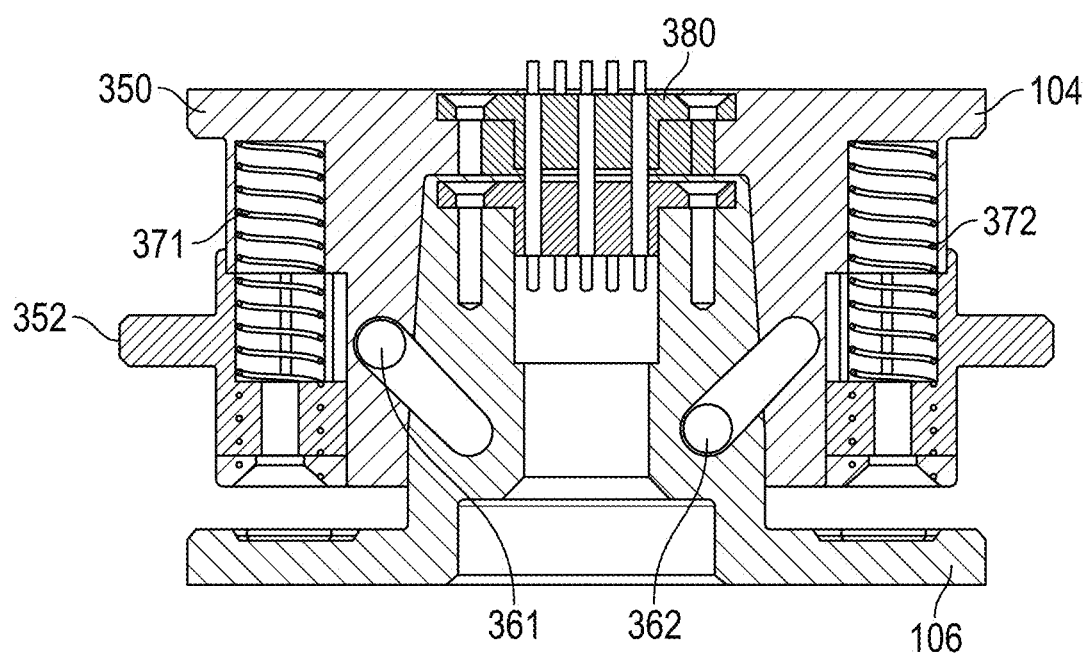
FIG. 16 is a cross-sectional view of the quick release female assembly and the quick release of male assembly of FIG. 15 taken along lines 16-16 in FIG. 15.

Referring to FIGS. 11 and 16, the movable release member 352 has a non-depressed operational position such that the first and second rods 361, 362 extend across the open region 382 for locking the quick release male assembly 106 (shown in FIG. 16) to the quick release female assembly 104 when the quick release male assembly 106 is disposed in the open region 382. Also, referring to FIG. 13, the movable release member 352 has a depressed operational position such that the first and second rods 361, 362 are moved out of the open region 382 such that the quick release male assembly 352 is received in the open region 382 of the quick release female assembly 104 or removed from the open region 382.

Electrical Connector

Referring to FIGS. 28-31, the electrical connector 380 is coupled to the bottom wall 410 of the female base member 350 and communicates with the central aperture 440 thereof. The electrical connector 380 includes a connector housing 950 and pogo pins 601, 602, 603, 604, 605, 606, 607, 608, 609, 610, 611, 612, 613 coupled to the housing 950.

Figure 30:
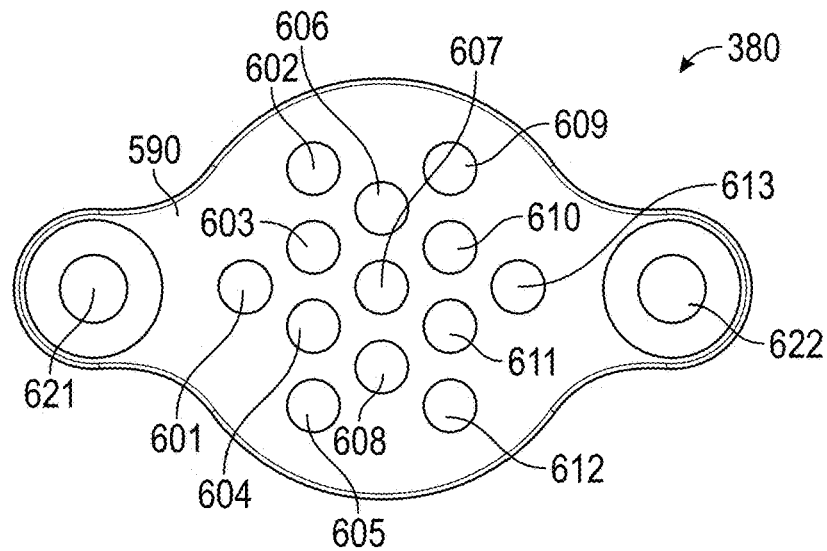
FIG. 30 is a top view of the electrical connector of FIG. 29.
Figure 31:
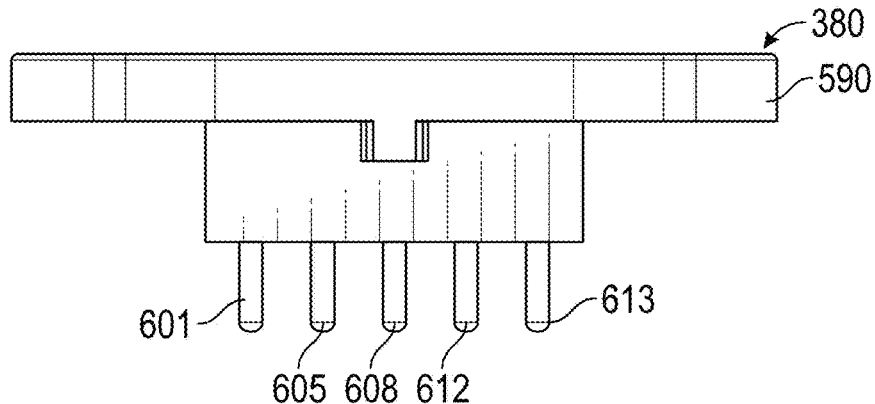
FIG. 31 is a side view of the electrical connector of FIG. 29.
Figure 35:
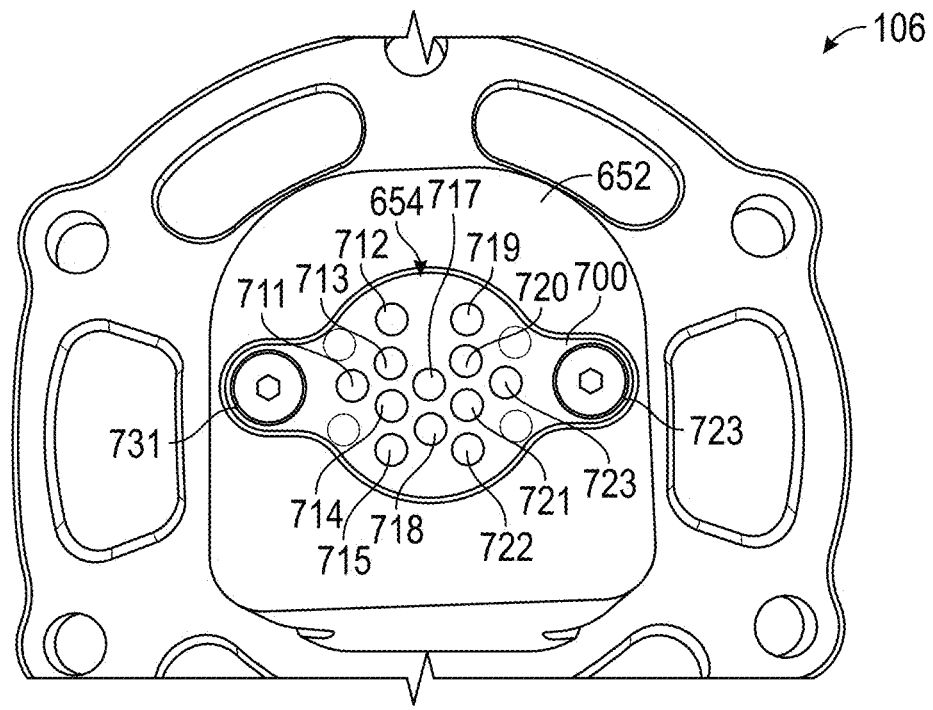
FIG. 35 is an enlarged top view of the quick release male assembly of FIG. 32.
Figure 36:
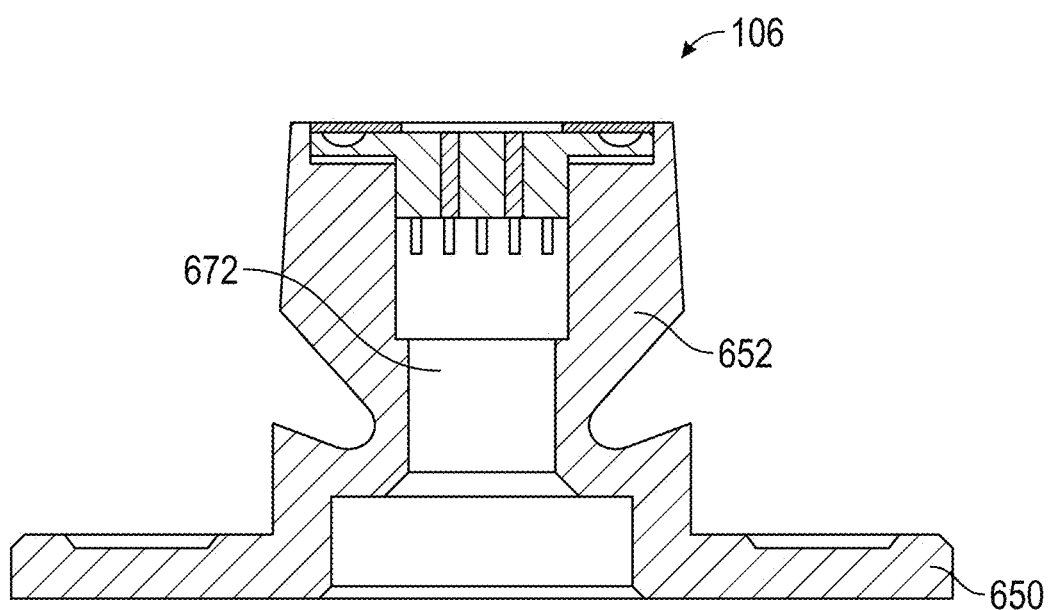
FIG. 36 is a cross-sectional view of the quick release male assembly of FIG. 32 taken along lines 36-36 of FIG. 32.

Referring to FIGS. 28, 30 and 35, the pogo pin 612 is removably coupled to the pin 722 of the quick release male assembly 106 when the quick release male assembly 106 is coupled to the quick release female assembly 104. The pins 612, 722 route a voltage (12V) from the vehicle 20 to the button assembly 102 for powering the microprocessor 220 and the CAN transceiver 222 therein.

The pogo pin 609 is removably coupled to the pin 719 of the quick release male assembly 106 when the quick release male assembly 106 is coupled to the quick release female assembly 104. The pins 609, 719 route an electrical ground (GND) from the vehicle 20 to the button assembly 102 for the microprocessor 220 and the CAN transceiver 222 therein.

The pogo pins 613, 605 are CAN communication pins and are removably coupled to the pins 723, 715 of the quick release male assembly 106 and to the CAN transceiver 222 in the button assembly 102 when the quick release male assembly 106 is coupled to the quick release female assembly 104.

An advantage of the pogo pins 601-613 is that the pogo pins 601-613 provide a reliable electrical connection to corresponding pins 711-723 respectively in the quick release male assembly 106.

Quick Release Male Assembly

Referring to FIGS. 17, 18 and 32-36, the quick release male assembly 106 is removably coupled to quick release female assembly 104. The quick release male assembly 106 includes a base plate 650, a shaft member 652, an electrical connector 654, ribbon cables 656, an electrical connector 670, and a central aperture 672 (shown in FIG. 36).

Base Plate

Figure 32:
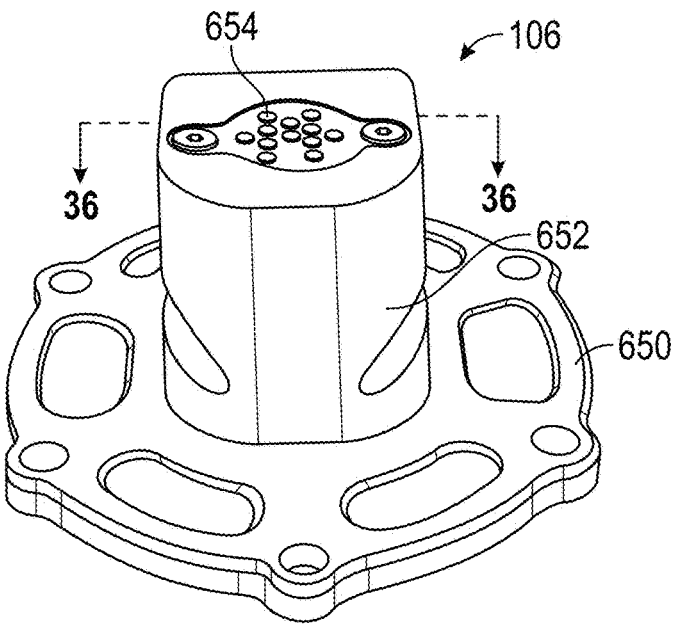
FIG. 32 is an isometric view of a quick release male assembly of FIG. 15.
Figure 33:
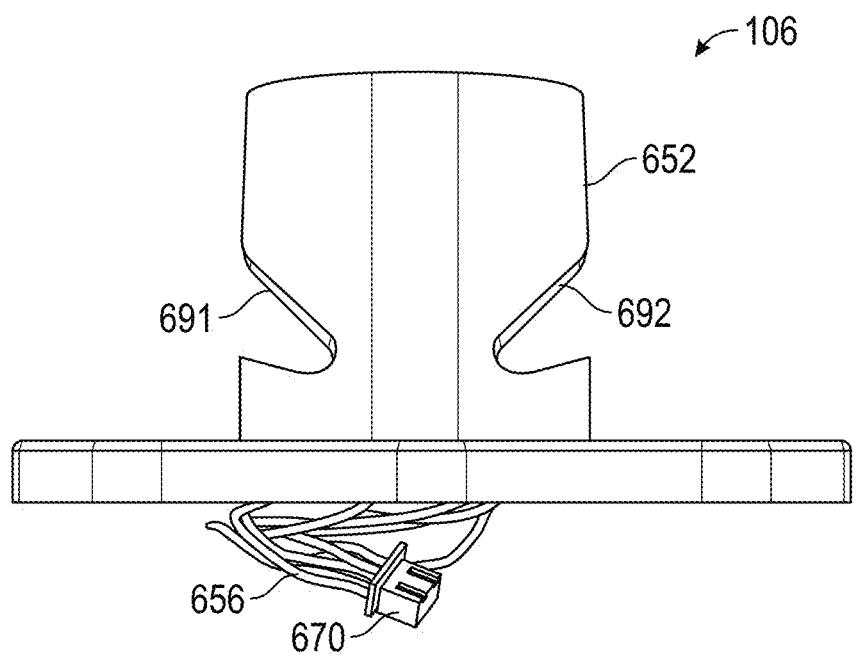
FIG. 33 is a side view of the quick release male assembly of FIG. 32.
Figure 34:
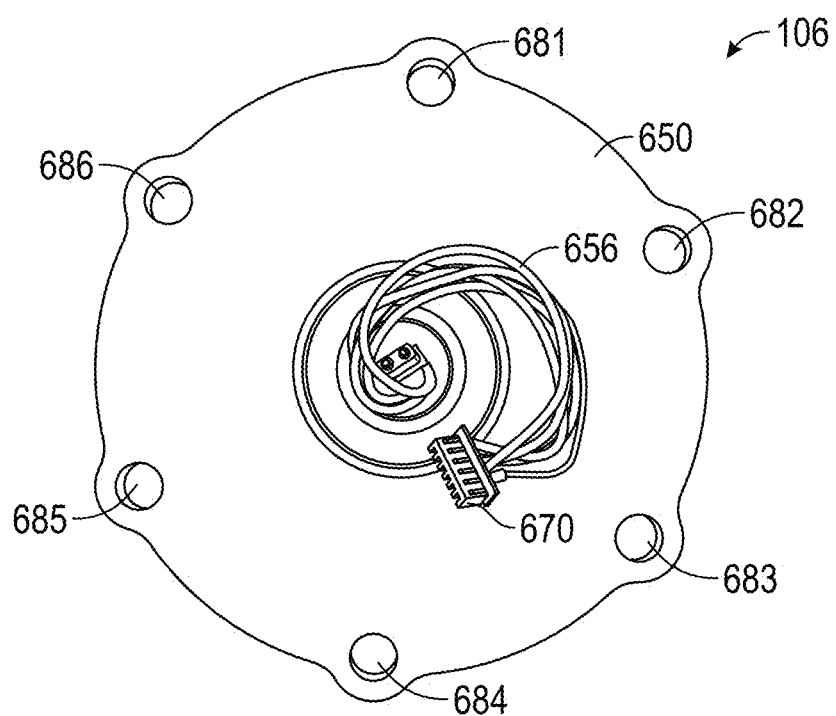
FIG. 34 is a bottom view of the quick release male assembly of FIG. 32.

Referring to FIGS. 2, 32 and 34, the base plate 650 is provided to support the shaft member 652. The base plate 650 has the central aperture 672 extending therethrough. Further, the base plate 650 has mounting aperture 681, 682, 683, 684, 685, 686 extending therethrough for coupling the base plate 650 to the vehicle protocol adapter module 108.

Shaft Member

Referring to FIGS. 11, 32, 33 and 36, the shaft member 652 is coupled to and extends upwardly from the base plate 650. The shaft member 652 has first and second grooves 691, 692 extending therein. The first and second grooves 691, 692 are sized and shaped to receive the first and second rods 361, 362 respectively therein. The shaft member 652 has the central aperture 672 extending therethrough.

Electrical Connector

Referring to FIGS. 32 and 35, the electrical connector 654 is coupled to a top portion of the shaft member 652 and communicates with the central aperture 672 thereof. The electrical connector 652 includes a connector housing 700 and pins 711, 712, 713, 714, 715, 716, 717, 718, 719, 720, 721, 722, 723 coupled to the housing 700.

Referring to FIGS. 28, 30 and 35, the pin 722 is removably coupled to the pogo pin 612 when the quick release male assembly 106 is coupled to the quick release female assembly 104. The pin 722 receives a voltage (12V) from the vehicle 20 via the electrical connector 670 (shown in FIG. 34) and the ribbon cable 656, and the pins 722, 612 route the voltage to the button assembly 102 for powering the microprocessor 220 and the CAN transceiver 222 therein.

The pin 719 is removably coupled to the pogo pin 609 when the quick release male assembly 106 is coupled to the quick release female assembly 104. The pins 719, 609 route an electrical ground (GND) from the vehicle 20 to the button assembly 102 for the microprocessor 220 and the CAN transceiver 222 therein.

The pins 723, 715 are CAN communication pins and are removably coupled to the pogo pins 613, 605 respectively when the quick release male assembly 106 is coupled to the quick release female assembly 104. The pins 723, 715 route CAN bus high signals and CAN bus low signals respectively between the CAN transceiver 222 in the button assembly 102 and the CAN transceiver 811 (shown in FIG. 39) in the vehicle protocol adapter module 108.

Vehicle Protocol Adapter Module

Referring to FIGS. 5 and 37-39, the vehicle protocol adapter module 108 is provided to communicate with the microprocessor 220 of the button assembly 102, an engine control unit 36 (shown in FIG. 5), and a vehicle entertainment system 62. Further, the vehicle protocol adapter module 108 is provided to receive unified format codes from the microprocessor 220 of the button assembly 102 indicating desired vehicle operations, and to select corresponding OEM format codes and to send the EOM format codes to the engine control unit 36 and the vehicle entertainment system 62. Still further the vehicle protocol adapter module 108 is provided to receive headlight brightness information from the engine control unit 36 and to send the headlight brightness information to the microprocessor 220 of the button assembly 102 for adjusting a brightness of the LEDs 211, 212.

The vehicle protocol adapter module 108 includes a circuit board 800, a microprocessor 802, a CAN transceiver 811, a CAN transceiver 812, a LIN transceiver 821, a LIN transceiver 822, transistors 831, 832, 833, resistors 841, 842, 843, electrical line 850, CAN connector 861, and LIN connector 871. The CAN connector 861 is used to transmit messages from the CAN transceivers 811, 812. The LIN connector 871 is used to transmit messages from the LIN transceivers 821, 822.

Circuit Board

The circuit board 800 holds the other components of the vehicle protocol adapter module 108 thereon. The circuit board 800 includes mounting apertures 891, 892, 893, 894, 895, 896 extending therethrough that align with the mounting apertures 681, 682, 683, 684, 685, 686 (shown in FIG. 34) respectively of the quick release male assembly 106 for receiving respective bolts therethrough for mounting the circuit board 800 to the assembly 106.

Microprocessor

The microprocessor 802 controls the operation of the vehicle protocol adapter module 108 and is coupled to the circuit board 800. The microprocessor 802 is electrically coupled to the CAN transceiver 811, the CAN transceiver 812, the LIN transceiver 821, the LIN transceiver 822, the transistors 831, 832, 833. The microprocessor 802 receives 3.3 volts (i.e., 3.3V) and a ground level voltage (i.e., GND) from the voltage regulator 880.

The voltage regulator 880 receives 12 volts (i.e., 12V) and a ground level voltage (i.e. GND) from a vehicle electrical system, and outputs 3.3 volts (i.e., 3.3V) and a ground level voltage (i.e., GND).

The voltage regulator 882 receives 12 volts (i.e., 12V) and a ground level voltage (i.e. GND) from a vehicle electrical system, and outputs 5 volts (i.e., 5V) and a ground level voltage (i.e., GND).

Figure 5:
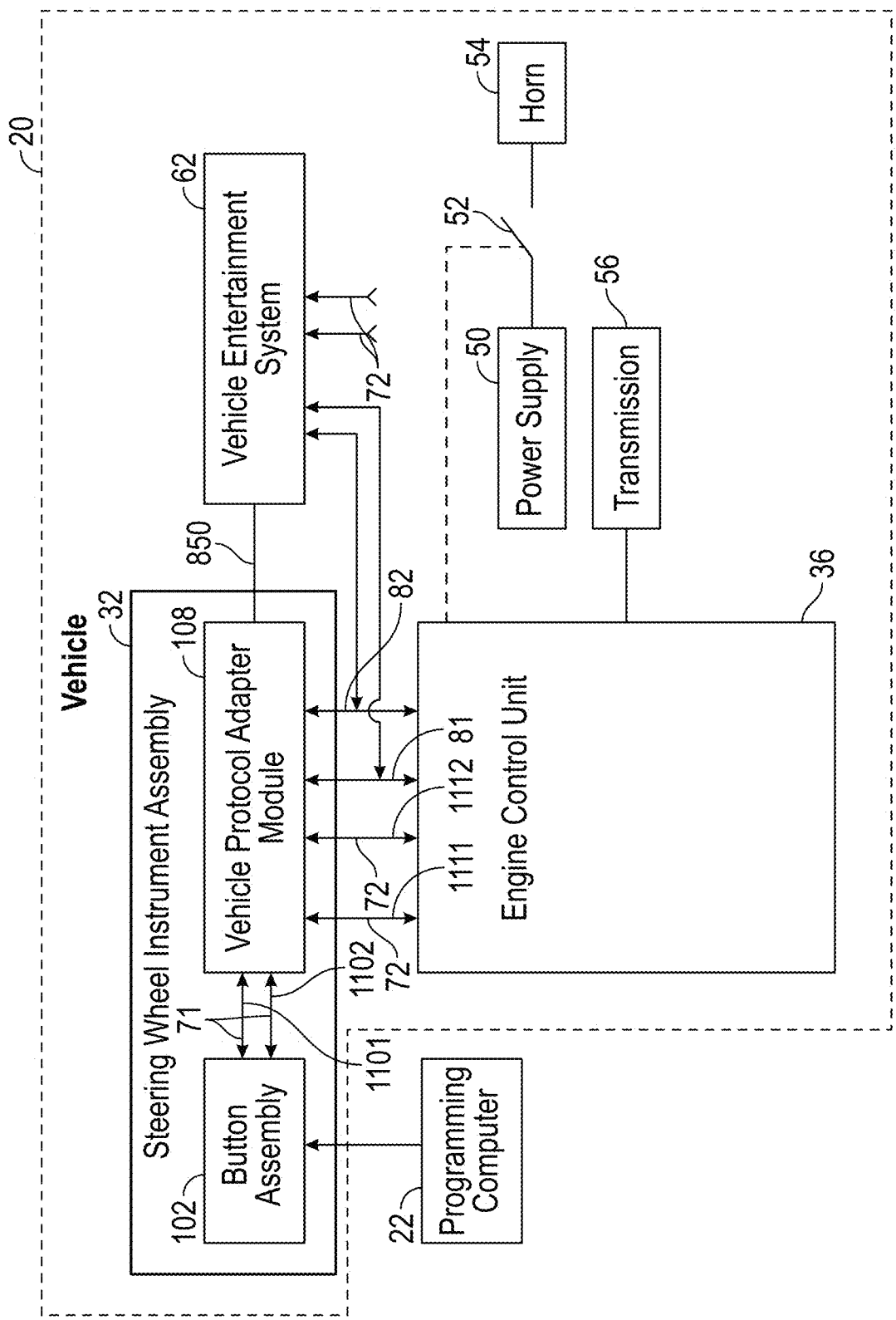
FIG. 5 is a block diagram of a vehicle having the steering wheel instrument assembly of FIG. 1, which is operably coupled to a programming computer.
Figure 6:
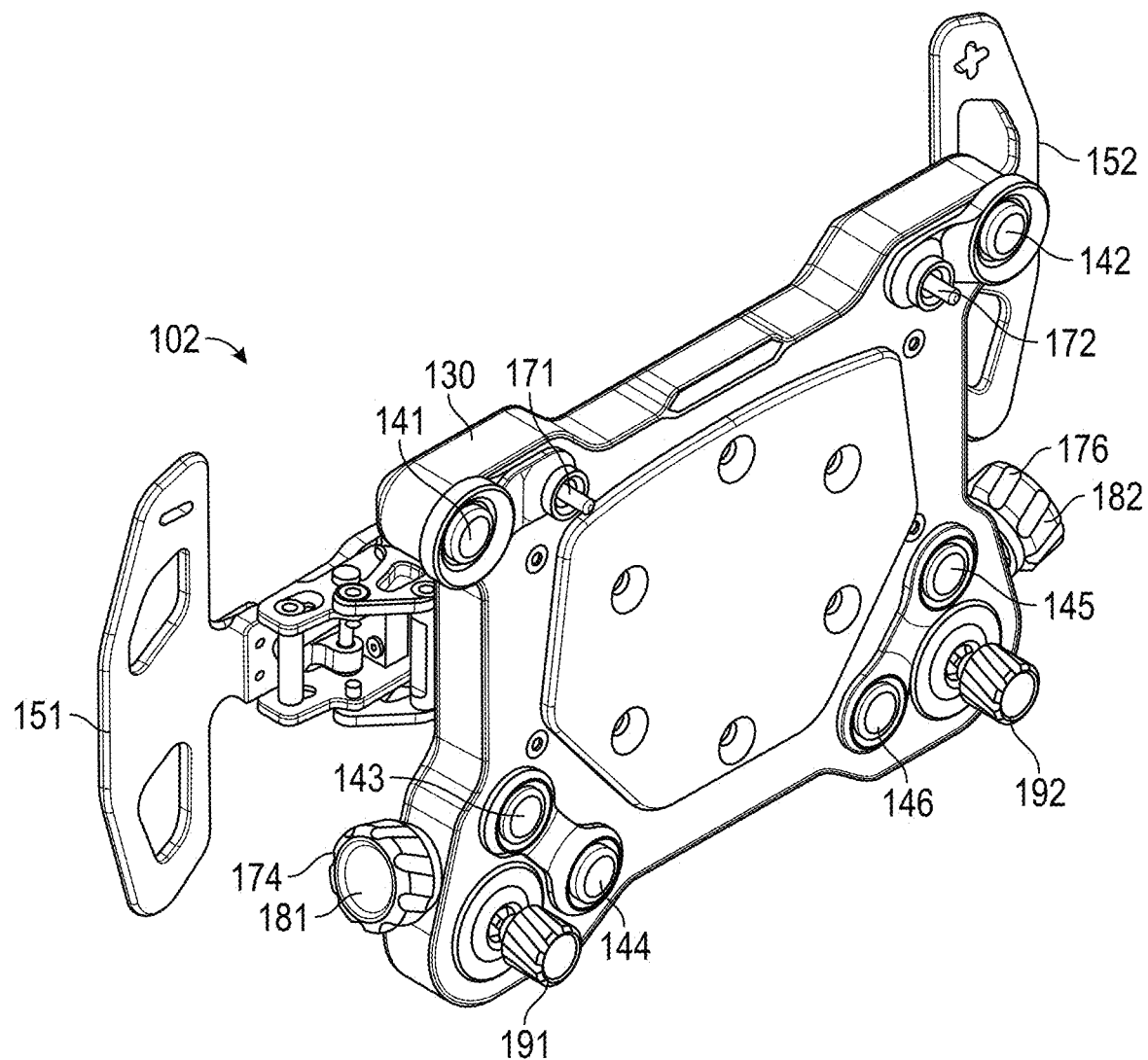
FIG. 6 is an isometric view of the steering wheel instrument assembly of FIG. 1.
Figure 7:
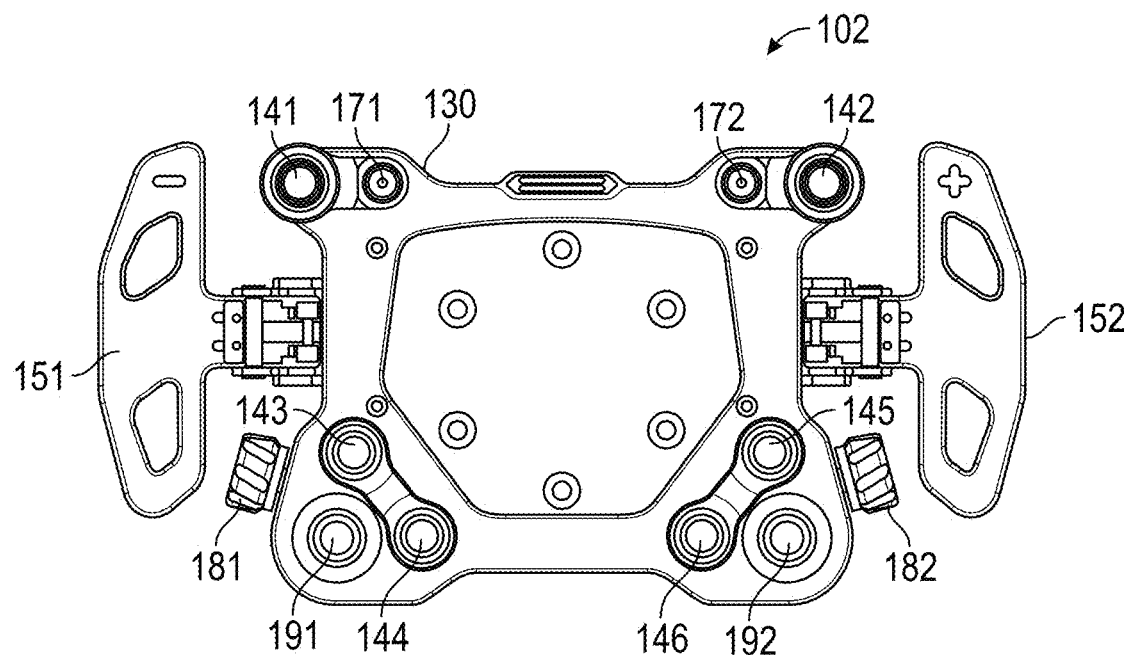
FIG. 7 is a top view of the steering wheel assembly of FIG. 6.
Figure 8:
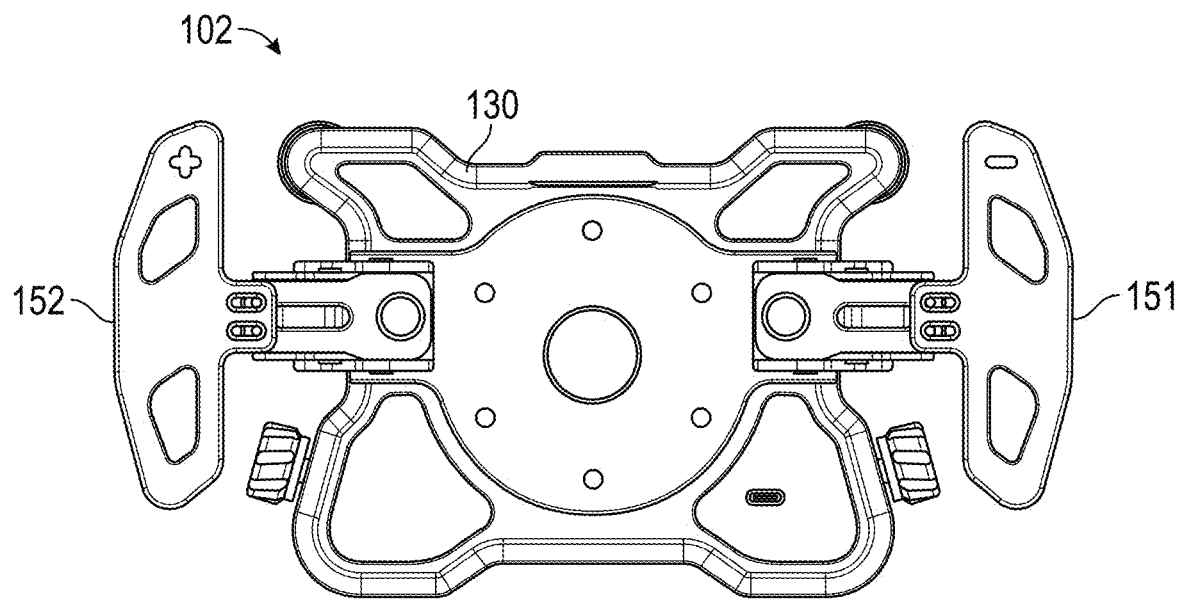
FIG. 8 is a bottom view of the steering wheel assembly of FIG. 6.

Referring to FIGS. 5, 39 and 40, the microprocessor 802 stores a second function table 920 therein. When the microprocessor 802 receives a unified format code "1" from the button assembly 102, the microprocessor 802 accesses a record 1001 in the function table 920 to retrieve an OEM format code "000001" hex indicating a desired vehicle operation (e.g., horn activation), and sends the OEM format code to the engine control unit 36 utilizing the LIN transceiver 821 (aka LINA). In response, the engine control unit 36 generates a control signal to induce the relay 52 to have a closed operational position such that a power supply 50 supplies a voltage to the horn 54 to activate the horn 54.

When the microprocessor 802 receives a unified format code "2" from the button assembly 102, the microprocessor 802 accesses a record 1002 in the function table 920 to retrieve an OEM format code "000004" hex indicating a desired vehicle operation (e.g., gear up), and sends the OEM format code to the engine control unit 36 utilizing the LIN transceiver 821 (aka LINA). In response, the engine control unit 36 (shown in FIG. 5) generates a control signal to induce the transmission 56 to perform the desired vehicle operation (e.g., gear up).

When the microprocessor 802 receives a unified format code "3" from the button assembly 102, the microprocessor 802 accesses a record 1003 in the function table 920 to retrieve an OEM format code "000008" hex indicating a desired vehicle operation (e.g., gear down), and sends the OEM format code to the engine control unit 36 utilizing the LIN transceiver 821 (aka LINA). In response, the engine control unit 36 (shown in FIG. 5) generates a control signal to induce the transmission 56 to perform the desired vehicle operation (e.g., gear down).

When the microprocessor 802 receives a unified format code "4" from the button assembly 102, the microprocessor 802 accesses a record 1004 in the function table 920 indicating a desired vehicle operation (e.g., volume+), and generates control signal C1 (shown in FIG. 39) to induce the transistor 831 to turn on such that the vehicle entertainment system 62 measures a resistance of 3000 ohms of the resistor 841. In response, the vehicle entertainment system 62 performs the desired vehicle operation (e.g., volume+).

When the microprocessor 802 receives a unified format code "5" from the button assembly 102, the microprocessor 802 accesses a record 1005 in the function table 920 indicating a desired vehicle operation (e.g., volume –), and generates control signal C2 (shown in FIG. 39) to induce the transistor 832 to turn on such that the vehicle entertainment system 62 measures a resistance of 1000 ohms of the resistor 842. In response, the vehicle entertainment system 62 performs the desired vehicle operation (e.g., volume –).

When the microprocessor 802 receives a unified format code "6" from the button assembly 102, the microprocessor 802 accesses a record 1006 in the function table 920 to retrieve an OEM format code "000100" hex indicating a desired vehicle operation (e.g., play/pause), and sends the OEM format code to the vehicle entertainment system 62 utilizing the LIN transceiver 821 (aka LINA). In response, the vehicle entertainment system 62 (shown in FIG. 5) performs the desired vehicle operation (e.g., play/pause).

When the microprocessor 802 receives a unified format code "7" from the button assembly 102, the microprocessor 802 accesses a record 1007 in the function table 920 to retrieve an OEM format code "000200" hex indicating a desired vehicle operation (e.g., previous song), and sends the OEM format code to the vehicle entertainment system 62 utilizing the LIN transceiver 821 (aka LINA). In response, the vehicle entertainment system 62 (shown in FIG. 5) performs the desired vehicle operation (e.g., previous song).

When the microprocessor 802 receives a unified format code "8" from the button assembly 102, the microprocessor 802 accesses a record 1008 in the function table 920 to retrieve an OEM format code "000800" hex indicating a desired vehicle operation (e.g., next song), and sends the OEM format code to the vehicle entertainment system 62 utilizing the LIN transceiver 821 (aka LINA). In response, the vehicle entertainment system 62 (shown in FIG. 5) performs the desired vehicle operation (e.g., next song song).

When the microprocessor 802 receives a unified format code "9" from the button assembly 102, the microprocessor 802 accesses a record 1009 in the function table 920 to retrieve an OEM format code "000400" hex indicating a desired vehicle operation (e.g., talk), and sends the OEM format code to the vehicle entertainment system 62 utilizing the LIN transceiver 821 (aka LINA). In response, the vehicle entertainment system 62 (shown in FIG. 5) performs the desired vehicle operation (e.g., talk).

When the microprocessor 802 receives a unified format code "10" from the button assembly 102, the microprocessor 802 accesses a record 1010 in the function table 920 to retrieve an OEM format code "000A00" hex indicating a desired vehicle operation (e.g., answer the phone), and sends the OEM format code to the vehicle entertainment system 62 utilizing the LIN transceiver 821 (aka LINA). In response, the vehicle entertainment system 62 (shown in FIG. 5) performs the desired vehicle operation (e.g., answer the phone).

When the microprocessor 802 receives a unified format code "11" from the button assembly 102, the microprocessor 802 accesses a record 1011 in the function table 920 to retrieve an OEM format code "000E00" hex indicating a desired vehicle operation (e.g., hang up), and sends the OEM format code to the vehicle entertainment system 62 utilizing the LIN transceiver 821 (aka LINA). In response, the vehicle entertainment system 62 (shown in FIG. 5) performs the desired vehicle operation (e.g., hang up).

When the microprocessor 802 receives a unified format code "12" from the button assembly 102, the microprocessor 802 accesses a record 1012 in the function table 920 to retrieve an OEM format code "001000" hex indicating a desired vehicle operation (e.g., source), and sends the OEM format code to the vehicle entertainment system 62 utilizing the LIN transceiver 821 (aka LINA). In response, the vehicle entertainment system 62 (shown in FIG. 5) performs the desired vehicle operation (e.g., source).

When the microprocessor 802 receives a unified format code "13" from the button assembly 102, the microprocessor 802 accesses a record 1013 in the function table 920 to retrieve an OEM format code "000001" hex indicating a desired vehicle operation (e.g., NAV UP), and sends the OEM format code to the vehicle entertainment system 62 utilizing the LIN transceiver 822 (aka LINB). In response, the vehicle entertainment system 62 (shown in FIG. 5) performs the desired vehicle operation (e.g., NAV UP).

When the microprocessor 802 receives a unified format code "14" from the button assembly 102, the microprocessor 802 accesses a record 1014 in the function table 920 to retrieve an OEM format code "000002" hex indicating a desired vehicle operation (e.g., NAV DOWN), and sends the OEM format code to the vehicle entertainment system 62 utilizing the LIN transceiver 822 (aka LINB). In response, the vehicle entertainment system 62 (shown in FIG. 5) performs the desired vehicle operation (e.g., NAV DOWN).

When the microprocessor 802 receives a unified format code "15" from the button assembly 102, the microprocessor 802 accesses a record 1015 in the function table 920 to retrieve an OEM format code "000004" hex indicating a desired vehicle operation (e.g., NAV LEFT), and sends the OEM format code to the vehicle entertainment system 62 utilizing the LIN transceiver 822 (aka LINB). In response, the vehicle entertainment system 62 (shown in FIG. 5) performs the desired vehicle operation (e.g., NAV LEFT).

When the microprocessor 802 receives a unified format code "16" from the button assembly 102, the microprocessor 802 accesses a record 1016 in the function table 920 to retrieve an OEM format code "000008" hex indicating a desired vehicle operation (e.g., NAV RIGHT), and sends the OEM format code to the vehicle entertainment system 62 utilizing the LIN transceiver 822 (aka LINB). In response, the vehicle entertainment system 62 (shown in FIG. 5) performs the desired vehicle operation (e.g., NAV RIGHT).

When the microprocessor 802 receives a unified format code "17" from the button assembly 102, the microprocessor 802 accesses a record 1017 in the function table 920 to retrieve an OEM format code "OOOOOA" hex indicating a desired vehicle operation (e.g., NAV OK), and sends the OEM format code to the vehicle entertainment system 62 utilizing the LIN transceiver 822 (aka LINB). In response, the vehicle entertainment system 62 (shown in FIG. 5) performs the desired vehicle operation (e.g., NAV OK).

When the microprocessor 802 receives a unified format code "18" from the button assembly 102, the microprocessor 802 accesses a record 1018 in the function table 920 to retrieve an OEM format code "000010" hex indicating a desired vehicle operation (e.g., NAV BACK), and sends the OEM format code to the vehicle entertainment system 62 utilizing the LIN transceiver 822 (aka LINB). In response, the vehicle entertainment system 62 (shown in FIG. 5) performs the desired vehicle operation (e.g., NAV BACK).

When the microprocessor 802 receives a unified format code "19" from the button assembly 102, the microprocessor 802 accesses a record 1019 in the function table 920 to retrieve an OEM format code "000100000000000" hex indicating a desired vehicle operation (e.g., HOME), and sends the OEM format code to the vehicle entertainment system 62 utilizing the CAN transceiver 812 (aka CANB). In response, the vehicle entertainment system 62 (shown in FIG. 5) performs the desired vehicle operation (e.g., HOME).

When the microprocessor 802 receives a unified format code "20" from the button assembly 102, the microprocessor 802 accesses a record 1020 in the function table 920 to retrieve an OEM format code "000200000000000" hex indicating a desired vehicle operation (e.g., MENU), and sends the OEM format code to the vehicle entertainment system 62 utilizing the CAN transceiver 812 (aka CANB). In response, the vehicle entertainment system 62 (shown in FIG. 5) performs the desired vehicle operation (e.g., MENU).

When the microprocessor 802 receives a unified format code "21" from the button assembly 102, the microprocessor 802 accesses a record 1021 in the function table 920 to retrieve an OEM format code "000800000000000" hex indicating a desired vehicle operation (e.g., VIEW), and sends the OEM format code to the vehicle entertainment system 62 utilizing the CAN transceiver 812 (aka CANB). In response, the vehicle entertainment system 62 (shown in FIG. 5) performs the desired vehicle operation (e.g., VIEW).

When the microprocessor 802 receives a unified format code "22" from the button assembly 102, the microprocessor 802 accesses a record 1022 in the function table 920 to retrieve an OEM format code "00040000000000" hex indicating a desired vehicle operation (e.g., FAVORITES), and sends the OEM format code to the vehicle entertainment system 62 utilizing the CAN transceiver 812 (aka CANB). In response, the vehicle entertainment system 62 (shown in FIG. 5) performs the desired vehicle operation (e.g., FAVORITES).

When the microprocessor 802 receives a unified format code "23" from the button assembly 102, the microprocessor 802 accesses a record 1023 in the function table 920 indicating a desired vehicle operation (e.g., mute), and generates control signal C3 (shown in FIG. 39) to induce the transistor 833 to turn on such that the vehicle entertainment system 62 measures a resistance of 330 ohms of the resistor 843. In response, the vehicle entertainment system 62 performs the desired vehicle operation (e.g., mute).

When the microprocessor 802 receives a unified format code "24" from the button assembly 102, the microprocessor 802 accesses a record 1024 in the function table 920 to retrieve an OEM format code "000E0000000000" hex indicating a desired vehicle operation (e.g., UP), and sends the OEM format code to the vehicle entertainment system 62 utilizing the CAN transceiver 812 (aka CANB). In response, the vehicle entertainment system 62 (shown in FIG. 5) performs the desired vehicle operation (e.g., UP).

When the microprocessor 802 receives a unified format code "25" from the button assembly 102, the microprocessor 802 accesses a record 1025 in the function table 920 to retrieve an OEM format code "00100000000000" hex indicating a desired vehicle operation (e.g., DOWN), and sends the OEM format code to the vehicle entertainment system 62 utilizing the CAN transceiver 812 (aka CANB). In response, the vehicle entertainment system 62 (shown in FIG. 5) performs the desired vehicle operation (e.g., DOWN).

When the microprocessor 802 receives a unified format code "26" from the button assembly 102, the microprocessor 802 accesses a record 1026 in the function table 920 to retrieve an OEM format code "00200000000000" hex indicating a desired vehicle operation (e.g., LEFT), and sends the OEM format code to the vehicle entertainment system 62 utilizing the CAN transceiver 812 (aka CANB). In response, the vehicle entertainment system 62 (shown in FIG. 5) performs the desired vehicle operation (e.g., LEFT).

When the microprocessor 802 receives a unified format code "27" from the button assembly 102, the microprocessor 802 accesses a record 1027 in the function table 920 to retrieve an OEM format code "00200000000000" hex indicating a desired vehicle operation (e.g., RIGHT), and sends the OEM format code to the vehicle entertainment system 62 utilizing the CAN transceiver 812 (aka CANB). In response, the vehicle entertainment system 62 (shown in FIG. 5) performs the desired vehicle operation (e.g., RIGHT).

When the microprocessor 802 receives a unified format code "28" from the button assembly 102, the microprocessor 802 accesses a record 1028 in the function table 920 to retrieve an OEM format code "00400000000000" hex indicating a desired vehicle operation (e.g., OK), and sends the OEM format code to the vehicle entertainment system 62 utilizing the CAN transceiver 812 (aka CANB). In response, the vehicle entertainment system 62 (shown in FIG. 5) performs the desired vehicle operation (e.g., OK).

When the microprocessor 802 receives a unified format code "29" from the button assembly 102, the microprocessor 802 accesses a record 1029 in the function table 920 to retrieve an OEM format code "00800000000000" hex indicating a desired vehicle operation (e.g., RETURN), and sends the OEM format code to the vehicle entertainment system 62 utilizing the CAN transceiver 812 (aka CANB). In response, the vehicle entertainment system 62 (shown in FIG. 5) performs the desired vehicle operation (e.g., RETURN).

When the microprocessor 802 receives a unified format code "30" from the button assembly 102, the microprocessor 802 accesses a record 1030 in the function table 920 to retrieve an OEM format code "00A00000000000" hex indicating a desired vehicle operation (e.g., HOME), and sends the OEM format code to the vehicle entertainment system 62 utilizing the CAN transceiver 812 (aka CANB). In response, the vehicle entertainment system 62 (shown in FIG. 5) performs the desired vehicle operation (e.g., HOME).

When the microprocessor 802 receives a unified format code "31" from the button assembly 102, the microprocessor 802 accesses a record 1031 in the function table 920 to retrieve an OEM format code "01000000000000" hex indicating a desired vehicle operation (e.g., MENU), and sends the OEM format code to the vehicle entertainment system 62 utilizing the CAN transceiver 812 (aka CANB). In response, the vehicle entertainment system 62 (shown in FIG. 5) performs the desired vehicle operation (e.g., MENU).

When the microprocessor 802 receives a unified format code "32" from the button assembly 102, the microprocessor 802 accesses a record 1032 in the function table 920 to retrieve an OEM format code "02000000000000" hex indicating a desired vehicle operation (e.g., cruise main), and sends the OEM format code to the engine control unit 36 utilizing the CAN transceiver 812 (aka CANB). In response, the engine control unit 36 (shown in FIG. 5) performs the desired vehicle operation (e.g., cruise main).

When the microprocessor 802 receives a unified format code "33" from the button assembly 102, the microprocessor 802 accesses a record 1033 in the function table 920 to retrieve an OEM format code "04000000000000" hex indicating a desired vehicle operation (e.g., cruise control cancel), and sends the OEM format code to the engine control unit 36 utilizing the CAN transceiver 812 (aka CANB). In response, the engine control unit 36 (shown in FIG. 5) performs the desired vehicle operation (e.g., cruise control cancel).

When the microprocessor 802 receives a unified format code "34" from the button assembly 102, the microprocessor 802 accesses a record 1034 in the function table 920 to retrieve an OEM format code "08000000000000" hex indicating a desired vehicle operation (e.g., LIM), and sends the OEM format code to the engine control unit 36 utilizing the CAN transceiver 812 (aka CANB). In response, the engine control unit 36 (shown in FIG. 5) performs the desired vehicle operation (e.g., LIM).

When the microprocessor 802 receives a unified format code "35" from the button assembly 102, the microprocessor 802 accesses a record 1035 in the function table 920 to retrieve an OEM format code "0A000000000000" hex indicating a desired vehicle operation (e.g., cruise+1 km/h), and sends the OEM format code to the engine control unit 36 utilizing the CAN transceiver 812 (aka CANB). In response, the engine control unit 36 (shown in FIG. 5) performs the desired vehicle operation (e.g., cruise+1 km/h).

When the microprocessor 802 receives a unified format code "36" from the button assembly 102, the microprocessor 802 accesses a record 1036 in the function table 920 to retrieve an OEM format code "10000000000000" hex indicating a desired vehicle operation (e.g., cruise −1 km/h), and sends the OEM format code to the engine control unit 36 utilizing the CAN transceiver 812 (aka CANB). In response, the engine control unit 36 (shown in FIG. 5) performs the desired vehicle operation (e.g., cruise −1 km/h).

When the microprocessor 802 receives a unified format code "37" from the button assembly 102, the microprocessor 802 accesses a record 1037 in the function table 920 to retrieve an OEM format code "20000000000000" hex indicating a desired vehicle operation (e.g., RESUME CANCEL), and sends the OEM format code to the engine control unit 36 utilizing the CAN transceiver 812 (aka CANB). In response, the engine control unit 36 (shown in FIG. 5) performs the desired vehicle operation (e.g., RESUME CANCEL).

When the microprocessor 802 receives a unified format code "38" from the button assembly 102, the microprocessor 802 accesses a record 1038 in the function table 920 to retrieve an OEM format code "40000000000000" hex indicating a desired vehicle operation (e.g., RESUME), and sends the OEM format code to the engine control unit 36 utilizing the CAN transceiver 812 (aka CANB). In response, the engine control unit 36 (shown in FIG. 5) performs the desired vehicle operation (e.g., RESUME).

When the microprocessor 802 receives a unified format code "39" from the button assembly 102, the microprocessor 802 accesses a record 1039 in the function table 920 to retrieve an OEM format code "80000000000000" hex indicating a desired vehicle operation (e.g., SET), and sends the OEM format code to the engine control unit 36 utilizing the CAN transceiver 812 (aka CANB). In response, the engine control unit 36 (shown in FIG. 5) performs the desired vehicle operation (e.g., SET).

When the microprocessor 802 receives a unified format code "40" from the button assembly 102, the microprocessor 802 accesses a record 1040 in the function table 920 to retrieve an OEM format code "A0000000000000" hex indicating a desired vehicle operation (e.g., SET−), and sends the OEM format code to the engine control unit 36 utilizing the CAN transceiver 812 (aka CANB). In response, the engine control unit 36 (shown in FIG. 5) performs the desired vehicle operation (e.g., SET−).

When the microprocessor 802 receives a unified format code "41" from the button assembly 102, the microprocessor 802 accesses a record 1041 in the function table 920 to retrieve an OEM format code "00000100000000" hex indicating a desired vehicle operation (e.g., Cruise+10 km/h), and sends the OEM format code to the engine control unit 36 utilizing the CAN transceiver 812 (aka CANB). In response, the engine control unit 36 (shown in FIG. 5) performs the desired vehicle operation (e.g., Cruise+10 km/h).

When the microprocessor 802 receives a unified format code "42" from the button assembly 102, the microprocessor 802 accesses a record 1042 in the function table 920 to retrieve an OEM format code "00000200000000" hex indicating a desired vehicle operation (e.g., Cruise −10 km/h), and sends the OEM format code to the engine control unit 36 utilizing the CAN transceiver 812 (aka CANB). In response, the engine control unit 36 (shown in FIG. 5) performs the desired vehicle operation (e.g., Cruise −10 km/h).

When the microprocessor 802 receives a unified format code "43" from the button assembly 102, the microprocessor 802 accesses a record 1043 in the function table 920 to retrieve an OEM format code "00000400000000" hex indicating a desired vehicle operation (e.g., DISTANCE), and sends the OEM format code to the engine control unit 36 utilizing the CAN transceiver 812 (aka CANB). In response, the engine control unit 36 (shown in FIG. 5) performs the desired vehicle operation (e.g., DISTANCE).

When the microprocessor 802 receives a unified format code "44" from the button assembly 102, the microprocessor 802 accesses a record 1044 in the function table 920 to retrieve an OEM format code "00000800000000" hex indicating a desired vehicle operation (e.g., Line Keep Assist), and sends the OEM format code to the engine control unit 36 utilizing the CAN transceiver 812 (aka CANB). In response, the engine control unit 36 (shown in FIG. 5) performs the desired vehicle operation (e.g., Line Keep Assist).

When the microprocessor 802 receives a unified format code "45" from the button assembly 102, the microprocessor 802 accesses a record 1045 in the function table 920 to retrieve an OEM format code "000100" hex indicating a desired vehicle operation (e.g., ACC+), and sends the OEM format code to the engine control unit 36 utilizing the LIN transceiver 822 (aka LINB). In response, the engine control unit 36 (shown in FIG. 5) performs the desired vehicle operation (e.g., ACC+).

When the microprocessor 802 receives a unified format code "46" from the button assembly 102, the microprocessor 802 accesses a record 1046 in the function table 920 to retrieve an OEM format code "000200" hex indicating a desired vehicle operation (e.g., ACC−), and sends the OEM format code to the engine control unit 36 utilizing the LIN transceiver 822 (aka LINB). In response, the engine control unit 36 (shown in FIG. 5) performs the desired vehicle operation (e.g., ACC−).

When the microprocessor 802 receives a unified format code "47" from the button assembly 102, the microprocessor 802 accesses a record 1047 in the function table 920 to retrieve an OEM format code "000800" hex indicating a desired vehicle operation (e.g., Drive Mode (other 1)), and sends the OEM format code to the engine control unit 36 utilizing the LIN transceiver 822 (aka LINB). In response, the engine control unit 36 (shown in FIG. 5) performs the desired vehicle operation (e.g., Drive Mode (other 1)).

Referring to FIG. 39, the transistor 831 has a gate, a drain, and a source. The gate of transistor 831 is electrically coupled to the microprocessor 802. The source of the transistor 831 is electrically coupled to electrical ground. The drain of the transistor 831 is coupled to a first end of the resistor 841. A second end of the resistor 841 is coupled to an electrical node 852 which is further coupled to an electrical line 850 that is coupled to the vehicle entertainment system 62. As discussed above, the microprocessor 802 turns on the transistor 831 such that the vehicle entertainment system 62 measures a resistance of 3000 ohms of the resistor 841. In response, the vehicle entertainment system 62 performs the desired vehicle operation (e.g., volume+).

The transistor 832 has a gate, a drain, and a source. The gate of transistor 832 is electrically coupled to the microprocessor 802. The source of the transistor 832 is electrically coupled to electrical ground. The drain of the transistor 832 is coupled to a first end of the resistor 842. A second end of the resistor 842 is coupled to the electrical node 852 which is further coupled to the electrical line 850 that is coupled to the vehicle entertainment system 62. As discussed above, the microprocessor 802 turns on the transistor 832 such that the vehicle entertainment system 62 measures a resistance of 1000 ohms of the resistor 842. In response, the vehicle entertainment system 62 performs the desired vehicle operation (e.g., volume −).

The transistor 833 has a gate, a drain, and a source. The gate of transistor 833 is electrically coupled to the microprocessor 802. The source of the transistor 833 is electrically coupled to electrical ground. The drain of the transistor 833 is coupled to a first end of the resistor 843. A second end of the resistor 843 is coupled to the electrical node 852 which is further coupled to the electrical line 850 that is coupled to the vehicle entertainment system 62. As discussed above, the microprocessor 802 turns on the transistor 833 such that the vehicle entertainment system 62 measures a resistance of 330 ohms of the resistor 843. In response, the vehicle entertainment system 62 performs the desired vehicle operation (e.g., mute).

Figure 38:
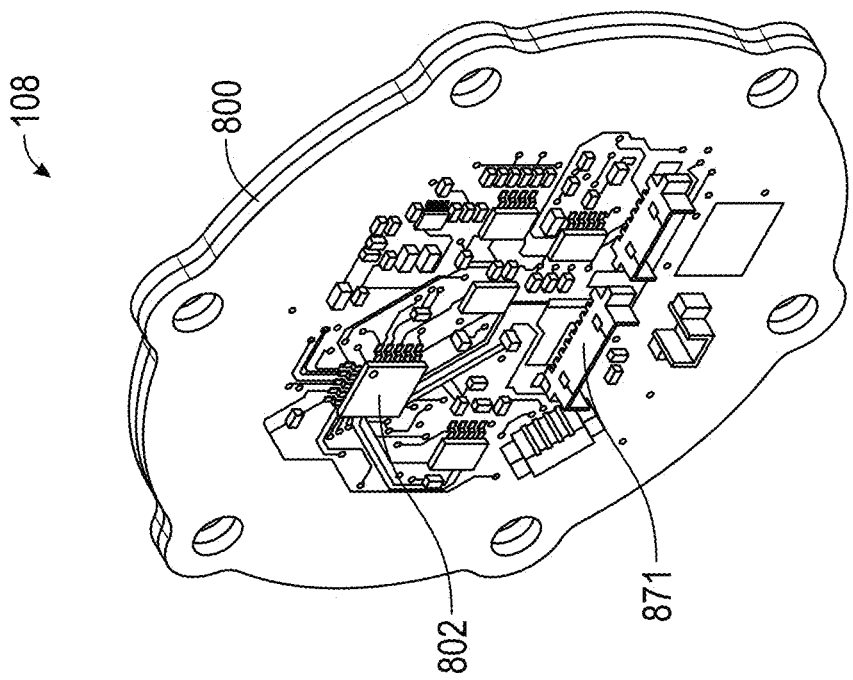
FIG. 38 is another isometric view of the vehicle protocol adapter module of FIG. 37.
Figure 37:
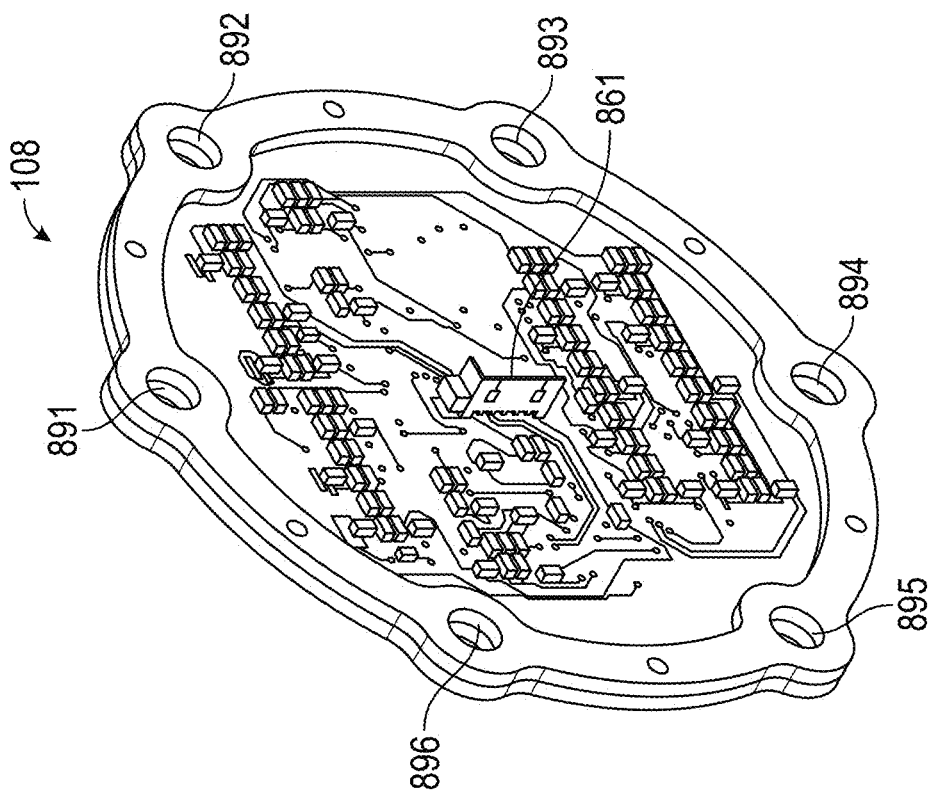
FIG. 37 is an isometric view of a vehicle protocol adapter module utilized in the steering wheel instrument assembly of FIG. 6.

Referring to FIGS. 37-39, the CAN connector 861 is operably coupled to the CAN transceiver 811. Further, the CAN connector 862 is operably coupled to the CAN transceiver 812. Also, the LIN connector 871 is operably coupled to the LIN transceiver 821. Further, the LIN connector 872 is operably coupled to the LIN transceiver 822.

Referring to FIG. 2, the quick release male assembly 106 and the circuit board 108 of the vehicle protocol adapter module 108 are coupled to the steering wheel hub adapter 34 utilizing a plurality of bolts 85.

Referring again to FIG. 5, the engine control unit 36 is provided to control the relay 52 and the transmission 56. The engine control unit 36 operably communicates with the vehicle protocol adapter module 108 utilizing the CAN bus 71 (having two voltage lines), the LIN bus 81, and the LIN bus 82.

The vehicle entertainment system 62 enables radio, navigation, cellular phone, and multimedia and Internet based applications to be controlled therein. The vehicle entertainment system 62 operably communicates with the vehicle protocol adapter module 108 utilizing the electrical line 850 and the CAN bus 72.

The relay 52 is electrically coupled between the power supply 50 and the horn 54. When the relay 52 receives a control signal from the engine control unit 36, the relay 52 has a closed operational position such that a voltage from the power supply 50 energizes the horn 54.

The transmission 56 is operably coupled to the engine control unit 36 and the transition 56 and shifts gears therein in response to control signals from the engine control unit 36.

The CAN bus 71 includes two electrical lines 1101, 1102 that transmit a CAN bus high signal and the CAN bus low signal respectively for transmitting information thereon. Also, the CAN bus 72 includes two electrical lines 1111, 1112 that transmit a CAN bus high signal and the CAN bus low signal respectively for transmitting information thereon.

The CAN transceiver 811 receives 5 volts (i.e., 5V) and a ground level voltage (i.e., GND) from the voltage regulator 882. The CAN transceiver 812 receives 5 volts (i.e., 5V) and a ground level voltage (i.e., GND) from the voltage regulator 882. The LIN transceiver 821 receives 12 volts (i.e., 12V) and a ground level voltage (i.e., GND) from a vehicle electrical system. The LIN transceiver 822 receives 12 volts (i.e., 12V) and a ground level voltage (i.e., GND) from the vehicle electrical system.

Flowchart

Referring to FIGS. 5, 9 and 39-46, a flowchart of a method for operating the steering wheel instrument assembly 32 with each type of switch, sensor, and push-button rotary encoder will now be explained.

At step 1200, the first push-button switch 141 of the button assembly 102 is activated when the first push-button switch 141 has a first operational position thereof. The microprocessor 220 of the button assembly 102 has a first function table 240 with a first unified format code (e.g., 1) associated with the first operational position of the first push-button switch 141. The first unified format code indicates a first desired vehicle operation. After step 1200, the method advances to step 1202.

At step 1202, the microprocessor 220 of the button assembly 102 retrieves the first unified format code from the first function table 240 when the first push-button switch 141 has the first operational position and sends the first unified format code to the microprocessor 802 of the vehicle protocol adapter module 108. After step 1202, the method advances to step 1204.

At step 1204, the microprocessor 802 of the vehicle protocol adapter module 108 has a second function table 920 having the first unified format code associated with a first OEM format code (e.g., 000001 hex). The first OEM format code indicates the first desired vehicle operation. The microprocessor 802 of the vehicle protocol adapter module 108 retrieves the first OEM format code from the second function table 920 in response to receiving the first unified format code from the microprocessor 220 of the button assembly 102, and sends the first OEM format code to an engine control unit 36. After step 1204, the method advances to step 1206.

At step 1206, the engine control unit 36 generates a control signal to close a relay 52 to induce a vehicle horn 54 to emit sound in response to receiving the first OEM format code. After step 1206, the method advances to step 1210.

At step 1210, the first paddle shifter sensor 161 of the button assembly 102 detects when a first paddle shifter 151 has a first operational position. The first function table 240 has a second unified format code associated with the first operational position of the first paddle shifter 151. The second unified format code indicates a second desired vehicle operation (e.g., gear up). After step 1210, the method advances to step 1212.

At step 1212, the microprocessor 220 of the button assembly 102 retrieves the second unified format code from the first function table 240 when the first paddle shifter sensor 161 detects the first paddle shifter 151 has the first operational position and sends the second unified format code to a microprocessor 802 of the vehicle protocol adapter module 108. After step 1212, the method advances to step 1214.

At step 1214, the second function table 920 of the vehicle protocol adapter module 108 has the second unified format code associated with a second OEM format code (e.g., 000004 hex). The second OEM code indicates the second desired vehicle operation (e.g., gear up). The microprocessor 802 of the vehicle protocol adapter module 108 retrieves the second OEM format code from the second function table 920 in response to receiving the second unified format code from the microprocessor 220 of the button assembly 102, and sends the second OEM format code to the engine control unit 36. After step 1214, the method advances to step 1216.

At step 1216, the engine control unit 36 generates a control signal to induce a transmission 56 (shown in FIG. 5) to upshift to a next gear in response to receiving the second OEM format code. After step 1216, the method advances to step 1220.

At step 1220, the first toggle switch 171 of the button assembly 102 has first and second operational positions. The first function table 240 has third and fourth unified format codes associated with the first and second operational positions respectively, of the first toggle switch 171. The third and fourth unified format codes indicate third and fourth desired vehicle operations respectively. The microprocessor 220 of the button assembly 102 retrieves the third unified format code (e.g., 10) from the first function table 240 when the first toggle switch 171 has the first operational position and sends the third unified format code to the microprocessor 802 of the vehicle protocol adapter module 108. After step 1220, the method advances to step 1222.

At step 1222, the second function table 920 of the vehicle protocol adapter module 108 has the third and fourth unified format codes associated with third and fourth OEM format codes respectively. The third and fourth OEM format codes indicate the third and fourth desired vehicle operations respectively. The microprocessor 802 of the vehicle protocol adapter module 108 retrieves the third OEM format code (e.g., 00A00 hex) from the second function table 920 in response to receiving the third unified format code from the microprocessor 220 of the button assembly 102, and sends the third OEM format code to a vehicle entertainment system 62. After step 1222, the method advances to step 1224.

At step 1224, the vehicle entertainment system 62 answers a telephone call in response to receiving the third OEM format code. After step 1224, the method advances to step 1230.

At step 1230, the first function table 240 of the button assembly 102 has fifth, sixth, and seventh unified format codes associated with the first, second, and third operational modes respectively, of a first push-button rotary encoder 181 coupled to a first knob of the button assembly 102. The fifth, sixth, and seventh unified format codes indicate fifth, sixth, and seventh desired vehicle operations respectively. The microprocessor 220 of the button assembly 102 retrieves the fifth unified format code (e.g., 32) from the first function table 240 when the first push-button rotary encoder 181 has the first operational mode and sends the fifth unified format code to the microprocessor 802 of the vehicle protocol adapter module 108. After step 1230, the method advances to step 1232.

At step 1232, the second function table 920 of the vehicle protocol adapter module 108 has the fifth, sixth, and seventh unified format codes associated with fifth, sixth, and seventh OEM format codes respectively. The fifth, sixth, and seventh OEM format codes indicate the fifth, sixth, and seventh desired vehicle operations respectively. The microprocessor 802 of the vehicle protocol adapter module 108 retrieves the fifth OEM format code (e.g., 02000000000000 hex) from the second function table 920 in response to receiving the fifth unified format code from the microprocessor 220 of the button assembly 102, and sends the fifth OEM format code to the engine control unit 36. After step 1232, the method advances to step 1234.

At step 1234, the vehicle entertainment system 62 sets the cruise control on in response to receiving the fifth OEM format code. After step 1234, the method advances to step 1240.

At step 1240, the first function table 240 of the button assembly 102 has eighth, ninth, tenth, eleventh, twelfth, thirteenth, and fourteenth unified format codes associated with first, second, third, fourth, fifth, sixth and seventh operational modes respectively, of a first joystick sensor 201 coupled to a first joystick 191 of the button assembly 102. The eighth, ninth, tenth, eleventh, twelfth, thirteenth, and fourteenth indicate eighth, ninth, tenth, eleventh, twelfth, thirteenth, and fourteenth desired vehicle operations respectively. The microprocessor 220 of the button assembly 102 retrieves the eighth unified format code (e.g., 7) from the first function table 240 when the first joystick sensor 201 detects when the first joystick 191 has the first operational mode thereof and sends the eighth unified format code to the microprocessor 802 of the vehicle protocol adapter module 108. After step 1240, the method advances to step 1242.

At step 1242, the second function table 920 of the vehicle protocol adapter module 108 has the eighth, ninth, tenth, eleventh, twelfth, thirteenth, and fourteenth unified format codes associated with eighth, ninth, tenth, eleventh, twelfth, thirteenth, and fourteenth OEM format codes respectively. The eighth, ninth, tenth, eleventh, twelfth, thirteenth, and fourteenth OEM format codes indicate the eighth, ninth, tenth, eleventh, twelfth, thirteenth, and fourteenth desired vehicle operations respectively. The microprocessor 802 of the vehicle protocol adapter module 108 retrieves the eighth OEM format code (e.g., 000200 hex) from the second function table 920 in response to receiving the eighth unified format code from the microprocessor 220 of the button assembly 102, and sends the eighth OEM format code to the vehicle entertainment system 62. After step 1242, the method advances to step 1244.

At step 1244, the vehicle entertainment system 62 selects a previous song to play in response to receiving the eighth OEM format code. After step 1244, the method advances to step 1250.

At step 1250, the microprocessor 802 of the vehicle protocol adapter module 108 receives headlight brightness information from the engine control unit 36. After step 1250, the method advances to step 1252.

At step 1252, the microprocessor 802 of the vehicle protocol adapter module 108 retrieves a fifteenth unified format code from the second function table 920 in response to receiving the headlight brightness information, and sends the fifteenth unified format code to the microprocessor 220 of the button assembly 102. The fifteenth unified format code indicates a fifteenth desired vehicle operation respectively. After step 1252, the method advances to step 1254.

At step 1254, the microprocessor 220 of the button assembly 102 adjusts a brightness of at least one LED 211 on the button assembly 102 based on the fifteenth unified format code.

Flowchart

Referring to FIGS. 9, 10 and 47-49, a flowchart of a method for programming the button assembly 102 in the steering wheel instrument assembly 32 to create a portion of the first function table 240 will now be explained.

Figure 50:
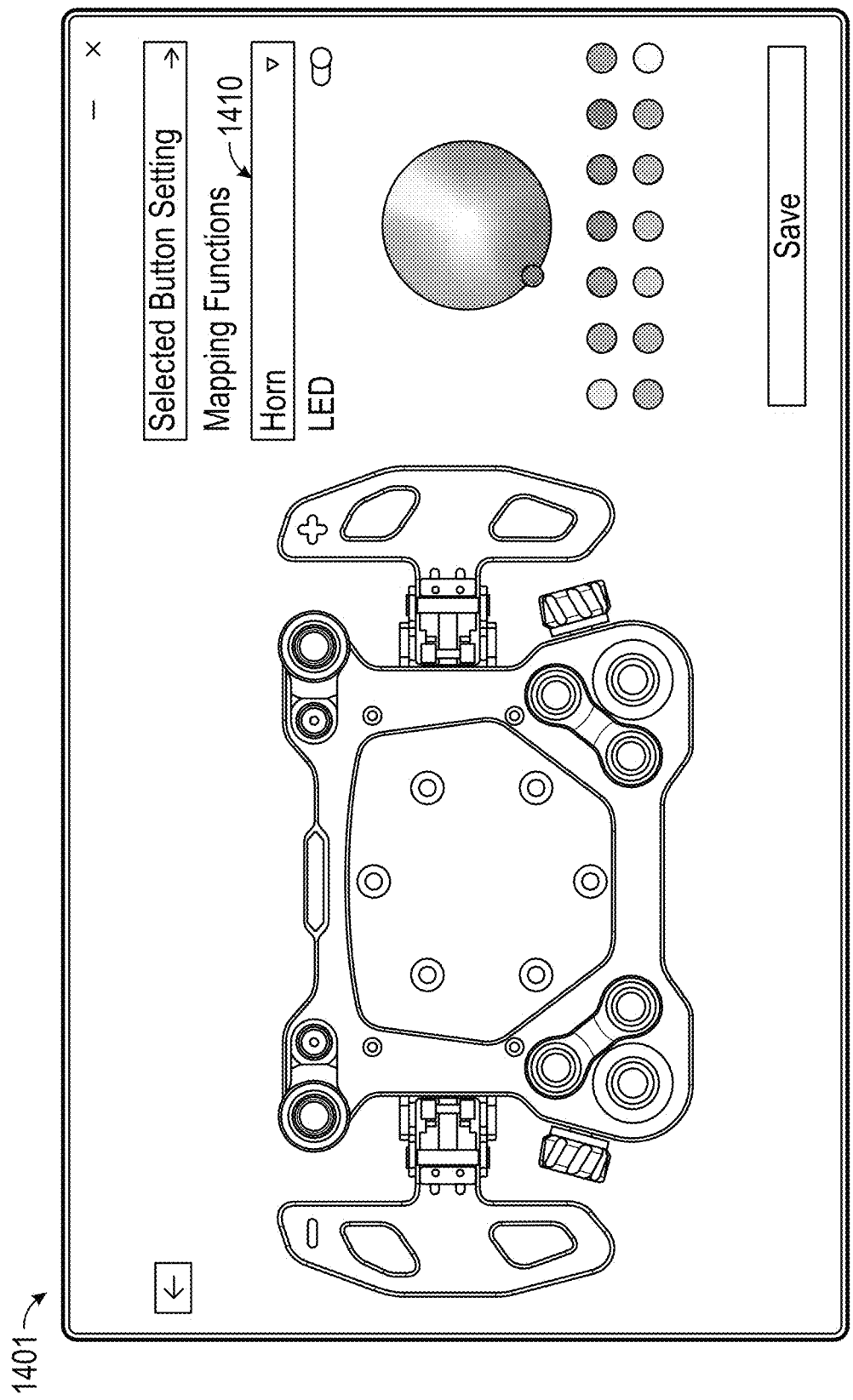
FIG. 50 is a schematic of a first GUI of a programming computer utilized to select a unified format code associated with a push-button switch in the button assembly and further associated with a horn activation of the vehicle wherein the unified format code is stored in the first function table.

At step 1300, the user selects a first selection icon 1410 (shown in FIG. 50) on a first GUI 1401 of a programming computer 22 (shown in FIG. 9) to select the first unified format code (e.g., 1) associated with the first push-button switch 141. The first unified format code indicates the first desired vehicle operation. After step 1300, the method advances to step 1302.

At step 1302, the programming computer 22 sends the first unified format code associated with the first push-button switch 141 through the communication port 224 to the microprocessor 220 of the button assembly 102. After step 1302, the method advances to step 1304.

At step 1304, the microprocessor 220 of the button assembly 102 receives the first unified format code associated with the first push-button switch 141 and stores the first unified format code (e.g., 1) in the first function table 240. The first unified format code is associated with the first desired vehicle operation (e.g., horn activation). After step 1304, the method advances to step 1306.

Figure 51:
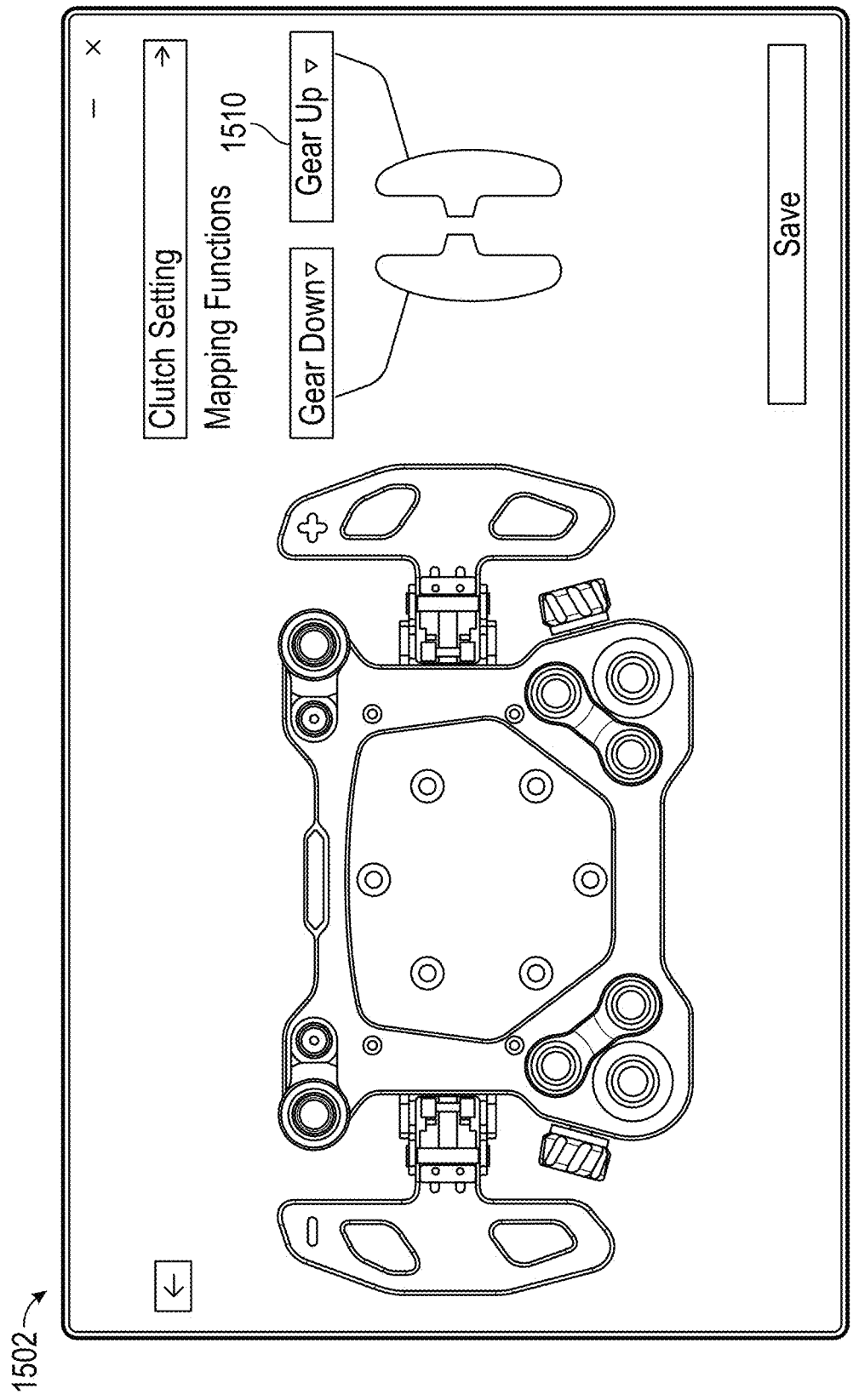
FIG. 51 is a schematic of a second GUI of the programming computer utilized to select a unified format code associated with a paddle shifter in the button assembly and further associated with a gear up operation of the vehicle wherein the unified format code is stored in the first function table.

At step 1306, the user selects a second selection icon 1510 (shown in FIG. 51) on a second GUI 1502 of the programming computer 22 to select the second unified format code (e.g., 2) associated with the first paddle shifter 151. The second unified format code indicates the second desired vehicle operation (e.g., gear up). After step 1306, the method advances to step 1308.

At step 1308, the programming computer 22 sends the second unified format code associated with the first paddle shifter 151 through the communication port 224 to the microprocessor 220 of the button assembly 102. After step 1308, the method advances to step 1310.

At step 1310, the microprocessor 220 of the button assembly 102 receives the second unified format code associated with the first paddle shifter 151 and stores the second unified format code (e.g., 2) in the first function table 240. The second unified format code is associated with the second desired vehicle operation. After step 1310, the method advances to step 1312.

Figure 52:
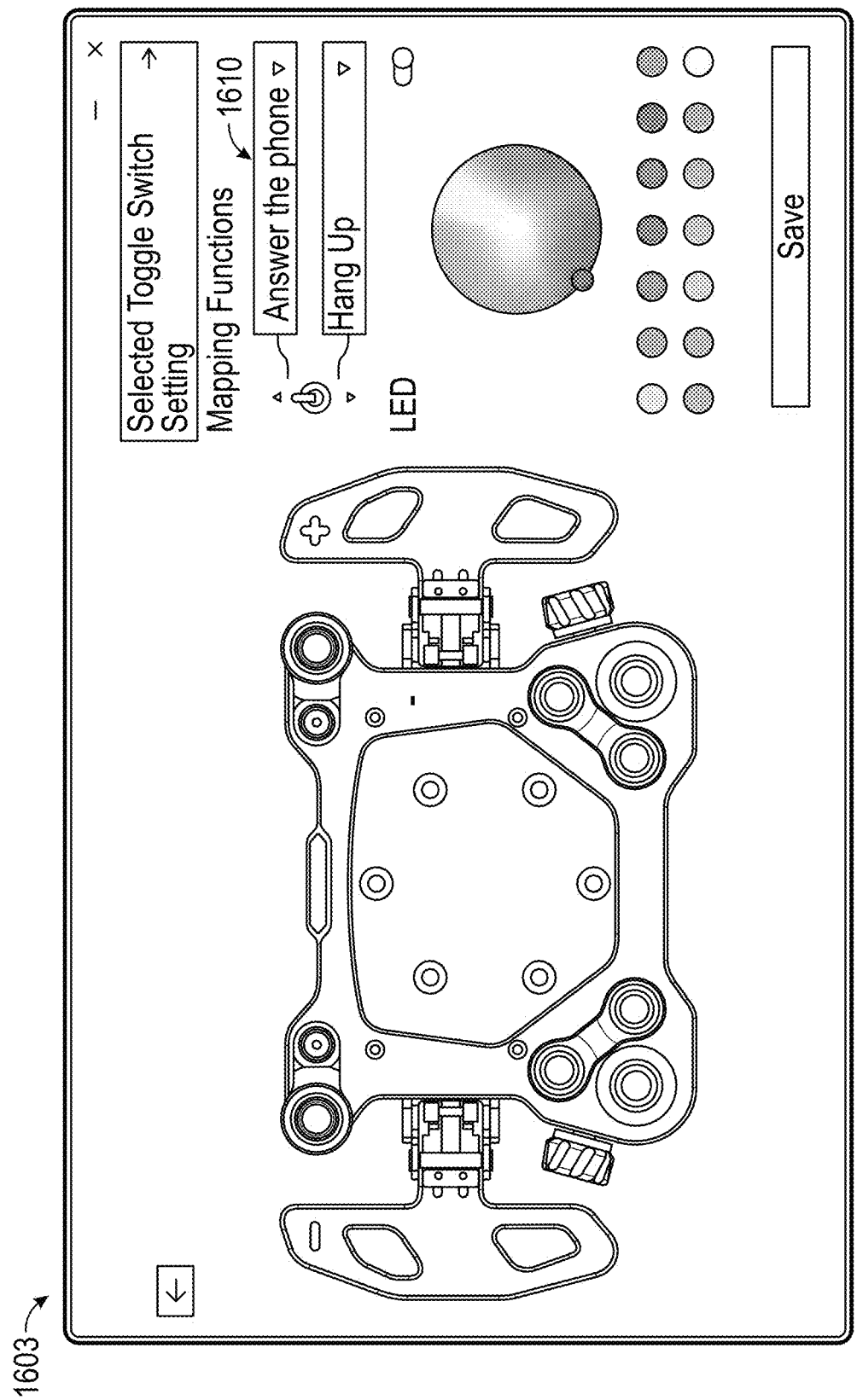
FIG. 52 is a schematic of a third GUI of the programming computer utilized to select a unified format code associated with a toggle switch in the button assembly and further associated with an answer the phone operation of the vehicle wherein the unified format code is stored in the first function table.

At step 1312, the user selects a third selection icon 1610 (shown in FIG. 52) on a third GUI 1603 of the programming computer 22 to select the third unified format code (e.g., 10) associated with the first toggle switch 171. The third unified format code indicates the third desired vehicle operation (e.g., answer the phone). After step 1312, the method advances to step 1314.

At step 1314, the programming computer 22 sends the third unified format code associated with the first toggle switch 171 through the communication port 224 to the microprocessor 220 of the button assembly 102. After step 1314, the method advances to step 1316.

At step 1316, the microprocessor 220 of the button assembly 102 receives the third unified format code associated with the first toggle switch 171 and stores the third unified format code (e.g., 10) in the first function table 240. The third unified format code is associated with the third desired vehicle operation. After step 1316, the method advances to step 1318.

Figure 53:
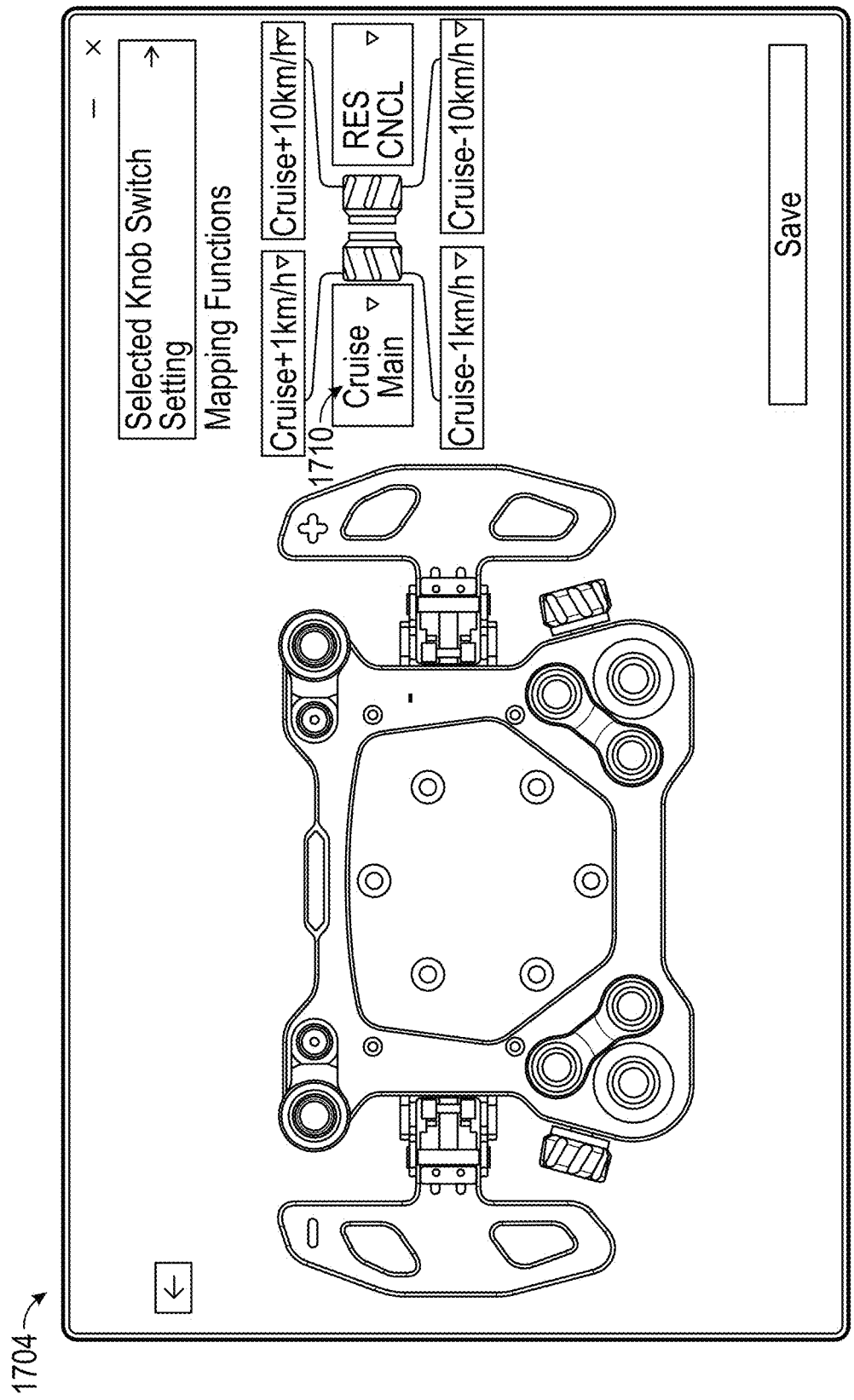
FIG. 53 is a schematic of a fourth GUI of the programming computer utilized to select a unified format code associated with a push-button rotary encoder in the button assembly and further associated with a cruise control on operation of the vehicle wherein the unified format code is stored in the first function table.

At step 1318, the user selects a fourth selection icon 1710 (shown in FIG. 53) on a fourth GUI 1704 of the programming computer 22 to select the fifth unified format code (e.g., 32) associated with a first push-button rotary encoder 181. The fifth unified format code indicates the fifth desired vehicle operation (e.g., cruise control on). After step 1318, the method advances to step 1320.

At step 1320, the programming computer 22 sends the fifth unified format code associated with the first push-button rotary encoder 181 through the communication port to the microprocessor 220 of the button assembly 102. After step 1320, the method advances to step 1322.

At step 1322, the microprocessor 220 of the button assembly 102 receives the fifth unified format code associated with the first push-button rotary encoder 181 and stores the fifth unified format code (e.g., 32) in the first function table 240. The fifth unified format code being associated with the fifth desired vehicle operation (e.g., cruise control on). After step 1322, the method advances to step 1324.

Figure 54:
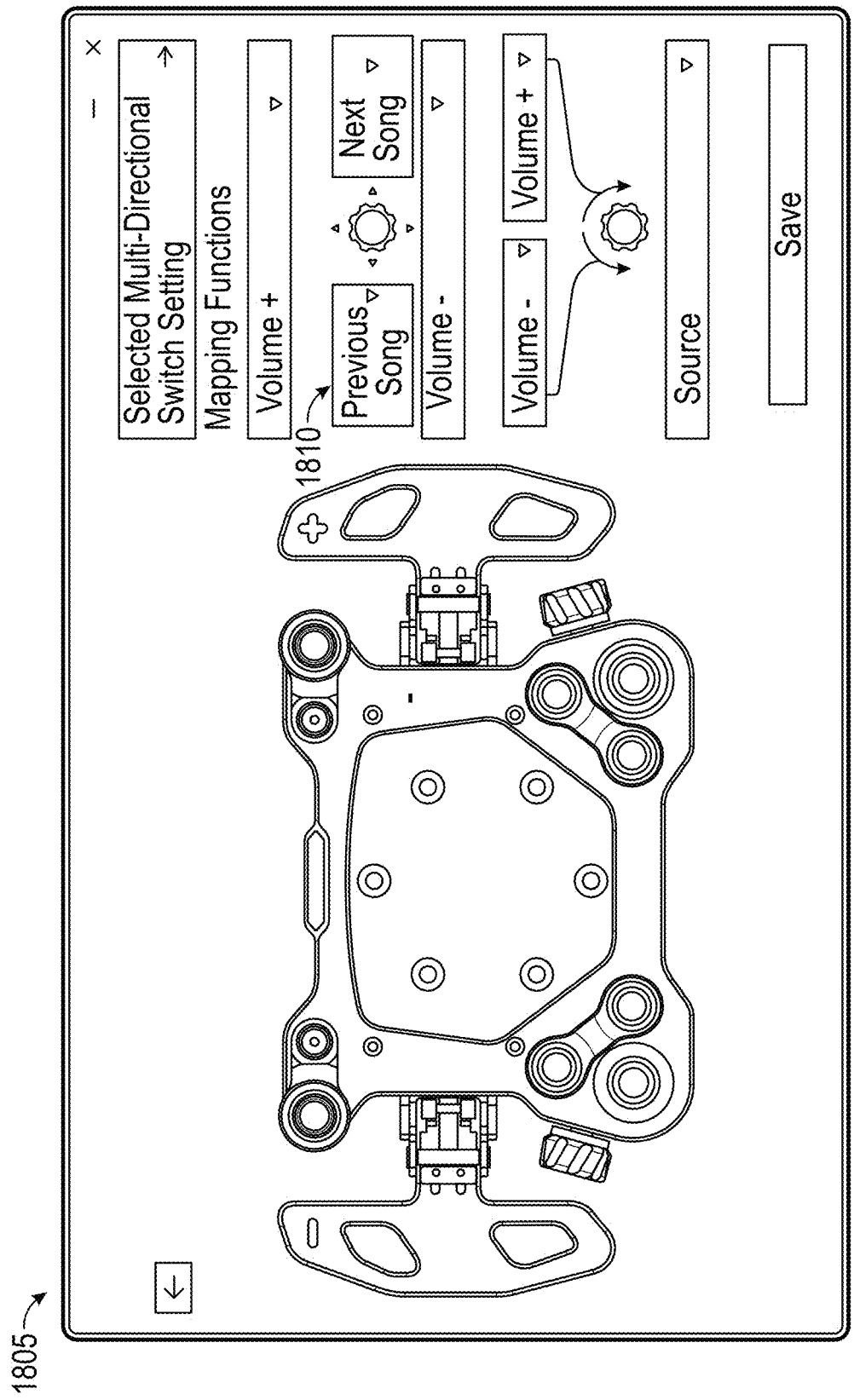
FIG. 54 is a schematic of a fifth GUI of the programming computer utilized to select a unified format code associated with a joystick sensor in the button assembly and further associated with a select previous song operation of the vehicle wherein the unified format code is stored in the first function table.

At step 1324, the user selects a fifth selection icon 1810 on a fifth GUI 1805 (shown in FIG. 54) of the programming computer 22 to select an eighth unified format code (e.g., 7) associated with a first joystick 191. The eighth unified format code indicates the eighth desired vehicle operation (e.g., previous song). After step 1324, the method advances to step 1326.

At step 1326, the programming computer 22 sends the eighth unified format code associated with the first joystick 191 through the communication port 224 to the microprocessor 220 of the button assembly 102. After step 1326, the method advances to step 1328.

At step 1328, the microprocessor 220 of the button assembly 102 receives the eighth unified format code associated with the first joystick 191 and stores the eighth unified format code (e.g., 7) in the first function table 240. The eighth unified format code is associated with the eighth desired vehicle operation (e.g., previous song).

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A steering wheel instrument assembly, comprising:

a button assembly having a microprocessor and a first push-button switch operably coupled to the microprocessor thereof; the first push-button switch being activated when the first push-button switch has a first operational position thereof, the first function table having a first unified format code associated with the first operational position of the first push-button switch and indicating a first desired vehicle operation;

a quick release female assembly being coupled to the button assembly; the quick release female assembly having a first electrical connector with first pogo pin, the first electrical connector being electrically coupled to the button assembly;

a quick release male assembly being removably coupled to the quick release female assembly, the quick release male assembly having a second electrical connector with a first pin, the first pin contacting the first pogo pin when the quick release male assembly is coupled to the quick release female assembly, the first pogo pin and the first pin routing an operational voltage to the button assembly;

a vehicle protocol adapter module being coupled to the quick release male assembly; the vehicle protocol adapter having a microprocessor with a second function table, the second function table having the first unified format code associated with a first OEM format code, the first OEM format code indicating the first desired vehicle operation; and the microprocessor of the button assembly retrieving the first unified format code from the first function table when the first push-button switch is activated and sending the first unified format code through the first and second electrical connectors to the microprocessor of the vehicle protocol adapter module; and the microprocessor of the vehicle protocol adapter module retrieving the first OEM format code from the second function table in response to receiving the first unified format code and sending the first OEM format code to an engine control unit.

2. The steering wheel instrument assembly of claim 1, wherein:
the button assembly having a housing, the microprocessor of the button assembly being disposed in the housing, the first push-button switch being operably coupled to the housing.

3. The steering wheel instrument assembly of claim 1, wherein:
the button assembly having a first paddle shifter sensor and a first paddle shifter, the first paddle shifter sensor detecting when the first paddle shifter has a first operational position thereof, the first function table having a second unified format code associated with the first operational position of the first paddle shifter and indicating a second desired vehicle operation;
the second function table having the second unified format code associated with a second OEM format code, the second OEM format code indicating the second desired vehicle operation;
the microprocessor of the button assembly retrieving the second unified format code from the first function table when the first paddle shifter sensor detects the first paddle shifter has the first operational position thereof and sending the second unified format code to the microprocessor of the vehicle protocol adapter module; and
the microprocessor of the vehicle protocol adapter module retrieving the second OEM format code from the second function table in response to receiving the second unified format code and sending the second OEM format code to the engine control unit.

4. The steering wheel instrument assembly of claim 3, wherein:
the first paddle shifter sensor and the first paddle shifter being operably coupled to the housing.

5. The steering wheel instrument assembly of claim 1, wherein:
the button assembly having a first toggle switch being operably coupled to the microprocessor of the button assembly, the first toggle switch having first and second operational positions, the first function table having second and third unified format codes associated with the first and second operational positions respectively, of the first toggle switch and indicating second and third desired vehicle operations respectively;
the second function table having the second and third unified format codes associated with second and third OEM format codes respectively, the second and third OEM format codes indicating the second and third desired vehicle operations respectively;
the microprocessor of the button assembly retrieving the second unified format code from the first function table when the first toggle switch has the first operational position and sending the second unified format code to the microprocessor of the vehicle protocol adapter module; and
the microprocessor of the vehicle protocol adapter module retrieving the second OEM format code from the second function table in response to receiving the second unified format code and sending the second OEM format code to a vehicle entertainment system.

6. The steering wheel instrument assembly of claim 1, wherein:
the button assembly having a first knob operably coupled to a first push-button rotary encoder, the first push-button rotary encoder being operably coupled to the microprocessor of the button assembly, the first push-button rotary encoder having first, second, and third operational modes, the first function table having second, third, and fourth unified format codes associated with the first, second, and third operational modes respectively of the first push-button rotary encoder and indicating, second, third, and fourth desired vehicle operations respectively;
the second function table having the second, third, and fourth unified format codes associated with second, third, and fourth OEM format codes respectively, the second, third, and fourth OEM format codes indicating the second, third, and fourth desired vehicle operations respectively;
the microprocessor of the button assembly retrieving the second unified format code from the first function table when the first push-button rotary encoder has the first operational mode and sending the second unified format code to the microprocessor of the vehicle protocol adapter module; and
the microprocessor of the vehicle protocol adapter module retrieving the second OEM format code from the second function table in response to receiving the second unified format code and sending the second OEM format code to the engine control unit.

7. The steering wheel instrument assembly of claim 1, wherein:
the button assembly having a first joystick sensor and a first joystick; the first joystick sensor being operably coupled to the first joystick and the microprocessor of the button assembly, the first joystick sensor having first, second, third, fourth, fifth, sixth, and seventh operational modes, the first function table having second, third, fourth, fifth, sixth, seventh, and eighth unified format codes associated with the first, second, third, fourth, fifth, sixth, and seventh operational modes respectively of the first joystick sensor indicating second, third, fourth, fifth, sixth, seventh, and eighth desired vehicle operations respectively;
the second function table having the second, third, fourth, fifth, sixth, seventh, and eighth unified format codes associated with second, third, fourth, fifth, sixth, seventh, and eighth OEM format codes respectively; the second, third, fourth, fifth, sixth, seventh, and eighth OEM format codes indicating the second, third, fourth, fifth, sixth, seventh, and eighth desired vehicle operations respectively;
the microprocessor of the button assembly retrieving the second unified format code from the first function table when the first joystick sensor detects when the first joystick sensor has the first operational mode and sending the second unified format code to the microprocessor of the vehicle protocol adapter module; and
the microprocessor of the vehicle protocol adapter module retrieving the second OEM format code from the second function table in response to receiving the second unified format code and sending the second OEM format code to a vehicle entertainment system.

8. The steering wheel instrument assembly of claim 1, wherein:
the first electrical connector of the quick release female assembly further includes a second pogo pin; and
the second electrical connector of the quick release male assembly further includes a second pin; the second pin contacting the second pogo pin when the quick release male assembly is coupled to the quick release female assembly, the second pogo pin and the second pin routing an electrical ground to the button assembly.

9. The steering wheel instrument assembly of claim 8, wherein:
the button assembly further includes a CAN transceiver operably communicating with the microprocessor of the button assembly;
the first electrical connector of the quick release female assembly further includes third and fourth pogo pins;
the second electrical connector of the quick release male assembly further includes third and fourth pins; the third and fourth pins contacting the third and fourth pogo pins respectively when the quick release male assembly is coupled to the quick release female assembly, the third pin and the third pogo pin routing a CAN bus high signal to the CAN transceiver, and the fourth pin and the fourth pogo pin routing a CAN bus low signal to the CAN transceiver, the CAN bus high signal and the CAN bus low signal having the first unified format code therein; and
the CAN transceiver sending the first unified format code to the microprocessor of the vehicle protocol adapter module.

10. The steering wheel instrument assembly of claim 1, wherein:
the quick release female assembly having a female base member, a movable release member, first and second rods, and first, second, third, and fourth springs;
the female base member having a bottom wall and first, second, third, and fourth side walls being coupled to and extending outwardly from the bottom wall, the first, second, third, and fourth side walls defining an open region therebetween; the bottom wall having an aperture extending therethrough for receiving the first electrical connector therethrough;
the first wall having first and second elongated apertures extending therethrough;
the second wall having first and second elongated apertures extending therethrough that are axially aligned with the first and second elongated apertures respectively of the first wall;
the movable release member being disposed around and contacting the first, second, third, and fourth walls of the female base member; the movable release member holding the first and second rods such that the first rod is disposed in the first elongated aperture of the first wall and the first elongated aperture of the second wall, and the second rod is disposed in the second elongated aperture of the first wall and the second elongated aperture of the second wall;
the first, second, third, and fourth springs biasing the movable release member outwardly from the female base member in a first direction; and
the movable release member having a non-depressed operational position such that the first and second rods extend across the open region for locking the quick release male assembly to the quick release female assembly; the movable release member having a depressed operational position such that the first and second rods are moved out of the open region such that the quick release male assembly is received in the open region of the quick release female assembly.

11. The steering wheel instrument assembly of claim 10, wherein:
the first electrical connector having a connector housing and at least the first pogo pin extending from the connector housing thereof.

12. The steering wheel instrument assembly of claim 10, wherein:
the quick release male assembly having a base plate, a shaft member, and the second electrical connector; the base plate and shaft member having an aperture extending longitudinally therethrough;
the shaft member being coupled to and extending outwardly from the base plate; the shaft member having first and second grooves extending into first and second sides, respectively, of the shaft member; and
the second electrical connector being coupled to a top portion of the shaft member and communicating with the aperture.

13. The steering wheel instrument assembly of claim 12, wherein:
the second electrical connector having a connector housing and at least the first pin coupled to the connector housing thereof.

14. The steering wheel instrument assembly of claim 12, wherein:
when the movable release member has the depressed operational position such that the first and second rods are moved out of the open region, the shaft member of the quick release male assembly is disposed in the open region of the quick release female assembly such that the second electrical connector is electrically coupled to the first electrical connector; and
thereafter, when the movable release member has the non-depressed operational position, the first and second rods extend into the first and second grooves respectively of the shaft member of the quick release male assembly to couple the quick release male assembly to the quick release female assembly.

15. The steering wheel instrument assembly of claim 1, wherein:
a vehicle protocol adapter module having a circuit board and the microprocessor thereof; the microprocessor of the vehicle protocol adapter module being operably coupled to the circuit board.

16. The steering wheel instrument assembly of claim 15, wherein:
the microprocessor of the vehicle protocol adapter module receiving headlight brightness information from the engine control unit;
the microprocessor of the vehicle protocol adapter module retrieving a second unified format code from the second function table in response to receiving the headlight brightness information, and sending the second unified format code to the microprocessor of the button assembly; and
the microprocessor of the button assembly adjusting a brightness of at least one LED on the button assembly based on the second unified format code.

17. The steering wheel instrument assembly of claim 1, wherein:
the button assembly having a communication port electrically coupled to the microprocessor of the button assembly;
the microprocessor of the button assembly receiving the first unified format code from a programming computer in response to a first selection icon being selected on a first GUI of the programming computer, the programming computer being operably coupled to the communication port, the first unified code being associated with the first operational position of the first push-button switch and indicating the first desired vehicle operation; and
the microprocessor of the button assembly storing the first unified format code in the first function table.

18. The steering wheel instrument assembly of claim 17, wherein:
- the microprocessor of the button assembly operably coupled to a first paddle shifter sensor;
- the microprocessor of the button assembly receiving a second unified format code from the programming computer in response to a second selection icon being selected on a second GUI of the programming computer, the second unified code being associated with the first operational position of the first paddle shifter and indicating a second desired vehicle operation; and
- the microprocessor of the button assembly storing the second unified format code in the first function table.

19. The steering wheel instrument assembly of claim 18, wherein:
- the microprocessor of the button assembly operably coupled to a first paddle shifter sensor;
- the microprocessor of the button assembly receiving a third unified format code from the programming computer in response to a third selection icon being selected on a third GUI of the programming computer, the third unified code being associated with a first operational position of the first toggle switch and indicating a third desired vehicle operation; and
- the microprocessor of the button assembly storing the third unified format code in the first function table.

20. The steering wheel instrument assembly of claim 19, wherein:
- the microprocessor of the button assembly operably coupled to a first push-button rotary encoder and a first joystick;
- the microprocessor of the button assembly receiving a fourth unified format code from the programming computer in response to a fourth selection icon being selected on a fourth GUI of the programming computer, the fourth unified code being associated with a first operational mode of the first push-button rotary encoder and indicating a fourth desired vehicle operation;
- the microprocessor of the button assembly receiving a fifth unified format code from the programming computer in response to a fifth selection icon being selected on a fifth GUI of the programming computer, the fifth unified code being associated with a first operational mode of the first joystick and indicating a fifth desired vehicle operation; and
- the microprocessor of the button assembly storing the fourth and fifth unified format codes in the first function table.

* * * * *